United States Patent
Sun et al.

(10) Patent No.: US 10,256,512 B2
(45) Date of Patent: Apr. 9, 2019

(54) SYSTEMS AND CONTROL DEVICES FOR CHARGING AND DISCHARGING LITHIUM-ION BATTERY, AND RELEVANT METHODS

(71) Applicant: ZHEJIANG GODSEND POWER TECHNOLOGY CO., LTD., Hangzhou (CN)

(72) Inventors: Jianping Sun, Hangzhou (CN); Wenkui Zhang, Hangzhou (CN); Chenlu Song, Hangzhou (CN)

(73) Assignee: ZHEJIANG GODSEND POWER TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 15/873,886

(22) Filed: Jan. 17, 2018

(65) Prior Publication Data

US 2019/0027792 A1    Jan. 24, 2019

(30) Foreign Application Priority Data

Jul. 20, 2017    (CN) .......................... 2017 1 0597855

(51) Int. Cl.
*H02J 7/00* (2006.01)
*H02J 7/04* (2006.01)
(Continued)

(52) U.S. Cl.
CPC ......... *H01M 10/443* (2013.01); *H01M 10/02* (2013.01); *H01M 10/0525* (2013.01);
(Continued)

(58) Field of Classification Search
CPC .................................................. H02J 7/0093
(Continued)

(56) References Cited

U.S. PATENT DOCUMENTS 5,561,360 A * 10/1996 Ayres ..................... H01M 10/44
320/129
5,905,364 A * 5/1999 Ookita ................... H02J 7/0093
320/141
(Continued)

FOREIGN PATENT DOCUMENTS

CN     2135864 Y    6/1993
CN     101051701 A  10/2007
(Continued)

OTHER PUBLICATIONS

Second Office Action dated Mar. 22, 2018 in Chinese Patent Application No. 201710597855.0 of Zhejiang Godsend Power Technology Co., Ltd. 15 pages.
(Continued)

*Primary Examiner* — David V Henze-Gongola
*Assistant Examiner* — Tarikh Kanem Rankine
(74) *Attorney, Agent, or Firm* — Perkins Coie LLP; Yingli Wang

(57) ABSTRACT

Systems and control devices for charging and discharging a lithium-ion battery and relevant methods are provided. A variable frequency triggering oscillation charge-discharge device constructs an oscillation loop with a lithium-ion battery using an inherent impedance characteristic of the lithium-ion battery to charge and/or discharge the lithium-ion battery in the form of an oscillation current generated by the oscillation loop, to avoid direct current (DC) charge-discharge for the lithium-ion battery or battery pack that causes polarization and lithium precipitation of the lithium. Accordingly, the lithium-ion battery has longer battery life, higher charging threshold voltage, higher charge, and controlled internal temperature increase. Thus, the suitable temperature range for the lithium-ion battery is broadened.

10 Claims, 25 Drawing Sheets
(11 of 25 Drawing Sheet(s) Filed in Color)

(51) Int. Cl.
*H01M 10/02* (2006.01)
*H01M 10/42* (2006.01)
*H01M 10/44* (2006.01)
*H01M 10/633* (2014.01)
*H01M 10/635* (2014.01)
*H01M 10/0525* (2010.01)

(52) U.S. Cl.
CPC ....... *H01M 10/425* (2013.01); *H01M 10/633* (2015.04); *H01M 10/635* (2015.04); *H01M 2010/4271* (2013.01); *H01M 2200/10* (2013.01); *H02J 7/007* (2013.01); *H02J 7/0093* (2013.01); *H02J 7/045* (2013.01)

(58) Field of Classification Search
USPC .................................................. 320/129, 139
See application file for complete search history.

(56) References Cited

U.S. PATENT DOCUMENTS

| | | | | |
|---|---|---|---|---|
| 6,229,287 | B1* | 5/2001 | Ferris | H02J 7/0054 320/139 |
| 9,728,996 | B2* | 8/2017 | Jang | H02J 7/0054 |
| 2004/0032237 | A1* | 2/2004 | Dykeman | H02J 7/0093 320/141 |
| 2009/0140697 | A1 | 6/2009 | Hurley et al. | |
| 2011/0101910 | A1* | 5/2011 | Li | H02J 7/0018 320/106 |
| 2011/0285356 | A1* | 11/2011 | Maluf | H02J 7/0052 320/139 |
| 2013/0166235 | A1* | 6/2013 | Oh | G01R 31/3624 702/63 |
| 2013/0181682 | A1* | 7/2013 | Yoshioka | H01G 11/14 320/134 |
| 2015/0372513 | A1* | 12/2015 | Choi | H02J 7/0003 320/125 |

FOREIGN PATENT DOCUMENTS

| | | |
|---|---|---|
| CN | 201805351 U | 4/2011 |
| CN | 102074755 A | 5/2011 |
| CN | 103124097 A | 5/2013 |
| CN | 103500858 A | 1/2014 |
| CN | 203562820 U | 4/2014 |
| CN | 103825060 A | 5/2014 |
| CN | 103825060 A1 | 5/2014 |
| CN | 104604091 A | 9/2015 |
| CN | 104935059 A | 9/2015 |
| CN | 105958569 A | 9/2016 |
| CN | 104849403 B | 12/2016 |
| EP | 2933898 A1 | 10/2015 |
| TW | 201004096 A | 1/2010 |
| WO | 2011/004249 A2 | 1/2011 |

OTHER PUBLICATIONS

Search Report dated Nov. 28, 2017 in Chinese Patent Application No. 201710597855.0 of Zhejiang Godsend Power Technology Co., Ltd. 6 pages.
First Office Action dated Jan. 17, 2018 in Chinese Patent Application No. 201710597855.0 of Zhejiang Godsend Power Technology Co., Ltd. 14 pages.
Wu, T-Z, et al. "Variable frequency pulse fast charging technique for Li-ion batteries based on fuzzy control" Power Sources, 2016, 40(7), pp. 1419-1421, 1428.
European Patent Office, Extended European Search Report, Application 18154225.9, Applicant Zhejian Godsend Power Technology Co., Ltd, Jul. 20, 2018, pp. 1-9.

* cited by examiner

*FIG.4a*  *FIG.4b*
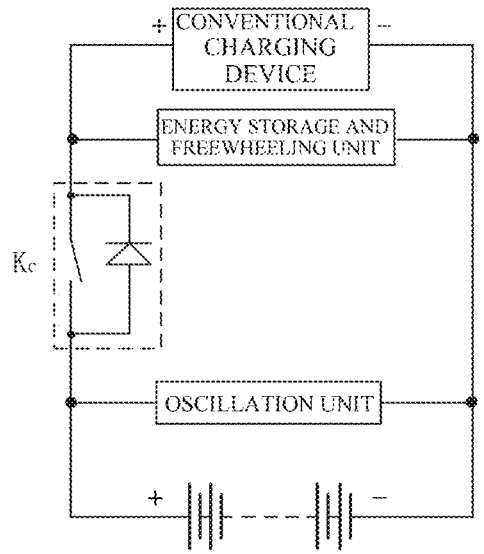 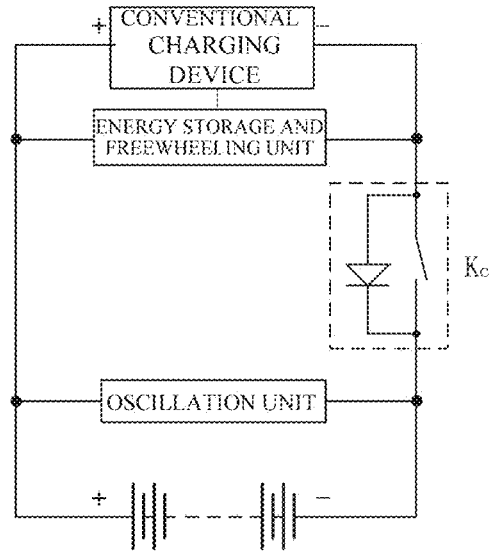
*FIG.5*
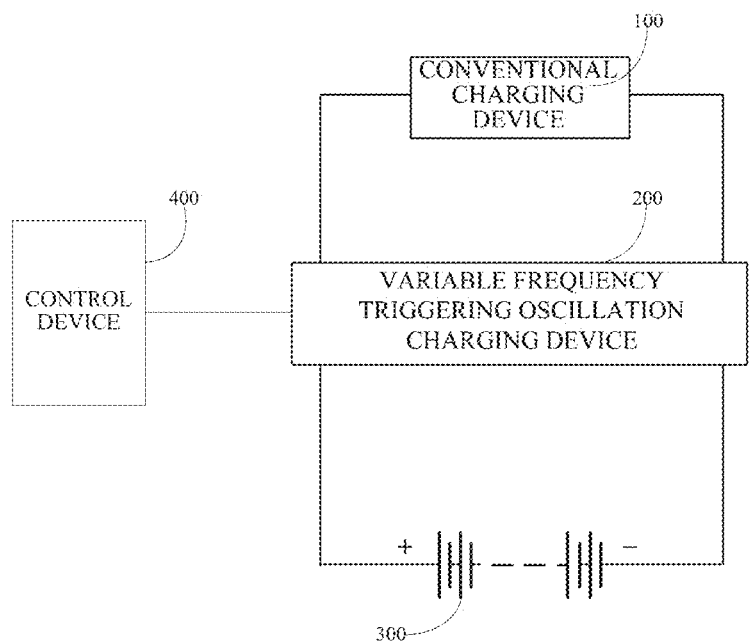

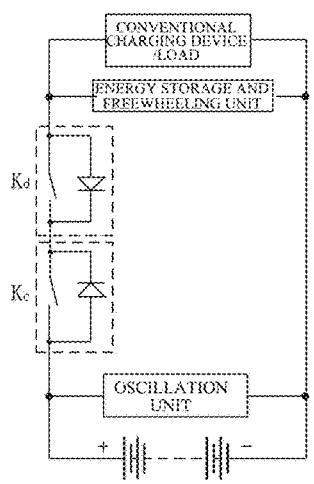
*FIG.14a*
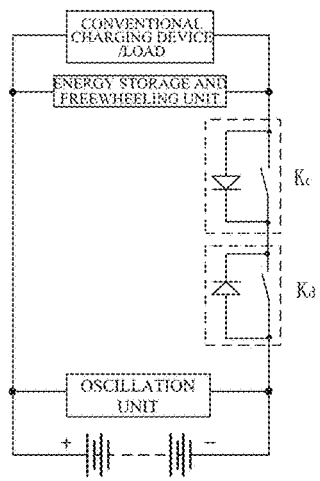
*FIG.14b*
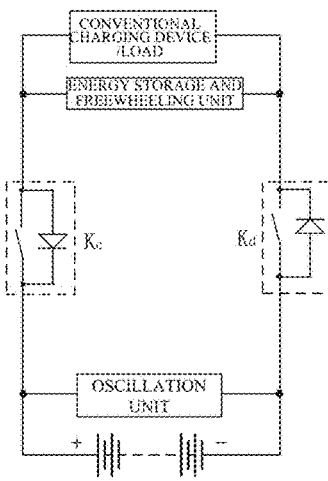
*FIG.14c*
*FIG.15*
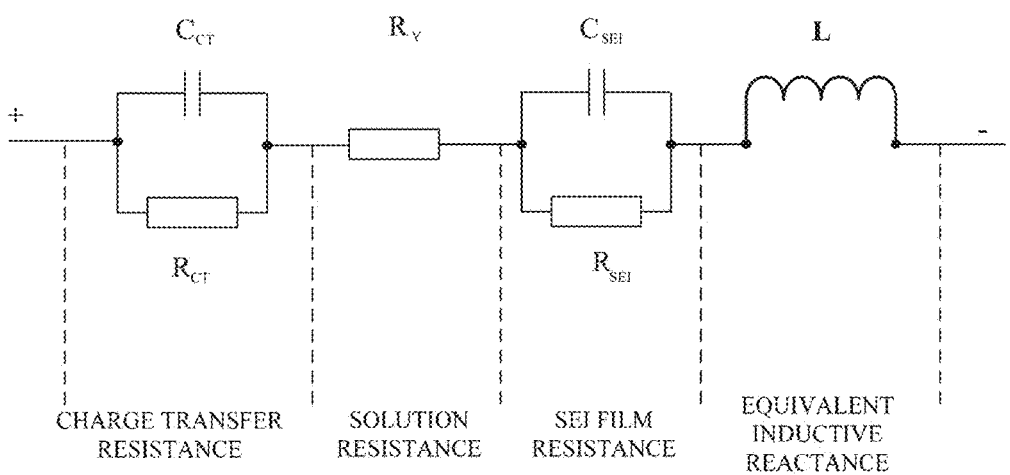

LITHIUM ION BATTERY CELL

LITHIUM ION BATTERY CELL

LITHIUM ION BATTERY CELL

LITHIUM ION BATTERY CELL

SYSTEMS AND CONTROL DEVICES FOR CHARGING AND DISCHARGING LITHIUM-ION BATTERY, AND RELEVANT METHODS

CROSS-REFERENCE TO RELATED APPLICATION(S)

This application claims the benefit of, and priority to, the Chinese Patent Application No. 201710597855.0, filed on Jul. 20, 2017, which is herein incorporated by reference in its entirety.

FIELD OF THE INVENTION

The invention disclosed herein relates to the field of battery charge-discharge. More particularly, it relates to methods and systems for charging and discharging a lithium-ion battery and manufacturing methods thereof, as well as methods and control devices for regulating the charge-discharge of lithium-ion battery.

BACKGROUND OF THE INVENTION

Lithium-ion batteries have attracted growing attention due to their advantages such as high energy density, long cycle life and eco-friendliness. The applications of lithium-ion battery have gradually expanded to the power and energy storage fields such as in electric vehicles from their initial application in the digital technology.

However, direct-current (DC) charge-discharge of a lithium-ion battery may result in polarization and lithium precipitation, which may lower the charge-discharge cycle life of the lithium-ion battery. Battery charging efficiency may be reduced in cold weather, and the battery performance irreversibly deteriorates. In hot weather, battery charge-discharge may raise the battery temperature beyond the highest working temperature and become a safety hazard. An internal temperature management device configured in a lithium-ion battery system tends to increase the size and cost of the battery system, and reduce the system energy density and safety. On the other hand, an external temperature management device may require extra energy, and is likely to cause uneven battery temperature that makes battery management difficult.

A conventional pulse charging method may mitigate the issues such as polarization and lithium precipitation, and improve charging performance at a lower temperature. However, complicated pulse generation devices may increase the cost and size of the battery system with reduced reliability. Therefore, it is difficult to promote the application of the pulse charging method.

SUMMARY OF THE INVENTION

Embodiments described herein provide systems and control devices for charging and discharging a lithium-ion battery, and methods thereof.

As used herein, the terms "lithium-ion battery" and "lithium-ion batteries" mean a lithium-ion battery cell, a lithium-ion battery pack, or the like, which is/are (an) electrical storage device(s) that function(s) by movements of lithium ions between (an) cathode(s) and anode(s).

In a first aspect, provided herein is a method for charging a lithium-ion battery comprising:

generating an oscillation current by an oscillation loop formed based on an inherent impedance characteristic of the lithium-ion battery; and charging the lithium-ion battery with the oscillation current according to one or more status parameters of the lithium-ion battery.

In one embodiment, at least two oscillation currents are used to charge the lithium-ion battery according to one or more status parameters of the lithium-ion battery. Examples of the one or more status parameters include, without limitation, temperature, state of charge (SOC), voltage, internal resistance, dimension size, weight, type, appearance, structure, materials, etc. The at least two oscillation currents may be applied in any suitable order, e.g., by alternating the at least two oscillation currents. One of the at least two oscillation currents has a frequency higher than the other(s). In certain embodiments, the at least two oscillation currents comprise a first oscillation current and a second oscillation current. The first oscillation current has a frequency higher than that of the second oscillation current.

In certain embodiments, charging the lithium-ion battery by the first and the second oscillation currents according to a temperature and SOC of the lithium-ion battery comprises:

determining one or more charging parameters according to the temperature and SOC of the lithium-ion battery, and charging the lithium-ion battery by the first and the second oscillation currents based on the one or more charging parameters, wherein:

determining the one or more charging parameters according to the temperature and SOC of the lithium-ion battery comprises:

determining the one or more charging parameters corresponding to the temperature and SOC of the lithium-ion battery from a set of pre-stored charging parameters under various temperatures and SOCs.

Examples of the one or more charging parameters include, without limitation, frequency range of the second oscillation current, duration of the first oscillation current, and amplitude of the charging current. In an embodiment, the frequency of the first oscillation current is equal to or greater than the upper limit of the frequency range of the second oscillation current.

In an embodiment, the frequency range of the second oscillation current is determined based on the temperature and SOC of the lithium-ion battery. For example, the frequency range of the second oscillation current may be determined by electrochemical impedance spectroscopy (EIS) of the lithium-ion battery in a pre-determined frequency range (e.g., 0 Hz~1,000 kHz, 0.01 Hz~100 kHz) at various temperatures and SOCs. In a set of EIS plots with a first SOC (which can be any value from 0-100%, e.g., 10%), a line parallel to the horizontal axis and through an intersection of the EIS plot at a first temperature (which can be any value from −70° C.~100° C., e.g., 0° C.) and the vertical axis may intersect with the EIS plots at various temperatures to provide intersections in a low frequency region, respectively, and the frequencies corresponding to the intersections in the low frequency region are the lower limits $f_{cd}$ of the frequency ranges of the second oscillation current under the various temperatures, respectively. The intersections of the same parallel line with the EIS plots in a high frequency region are the upper limits $f_g$ of the frequency ranges of the second oscillation current. Therefore, the frequency range of the second oscillation current may comprise or be the range from $f_{cd}$ to $f_g$. In certain embodiments, the first temperature is a working temperature of the lithium-ion battery. In certain embodiments, the first temperature is the optimal working temperature of the lithium-ion battery. In certain embodiments, the first temperature is the lowest working temperature of the lithium-ion battery.

In one embodiment, a duration of the first oscillation current and the upper limit $f_g$ of the frequency range of the second oscillation current satisfy the relation: $T_2=n/f_g$, wherein $T_2$ represents the duration of the first oscillation current and n is an integer equal to or greater than 0. In certain examples, n is defined the same as supra.

For example, charging the lithium-ion battery using the first and the second oscillation currents based on the one or more charging parameters may comprise: adjusting the duration of the first oscillation current according to a surface temperature of the lithium-ion battery, and increasing the amplitude of the charging current; when the surface temperature of the lithium-ion battery is above the first temperature, maintaining the duration of the first oscillation current and increasing the amplitude of the charging current; when the terminal voltage of the lithium-ion battery reaches an upper limit of the charging voltage, decreasing the amplitude of the charging current until the charging process ends.

For example, adjusting the duration of the first oscillation current according to the surface temperature of the lithium-ion battery may comprise: when the lowest surface temperature of the lithium-ion battery is equal to or higher than the first temperature, n in $T_2=n/f_g$ is 0; and when the lowest surface temperature of the lithium-ion battery decreases a pre-determined temperature which may be a temperature range (e.g., 0.01° C. to 50° C., 0.01° C. to 20° C., 1° C. to 40° C., 2° C. to 30° C., 3° C. to 25° C., 4° C. to 20° C., 5° C. to 15° C., 6° C. to 13° C., 7° C. to 12° C., 8° C. to 11° C.) or a specified temperature of the temperature range disclosed supra (e.g., 9° C., 10° C., 14° C., etc.), n in $T_2=n/f_g$ is increased by 1. In certain examples, when the first temperature >the lowest surface temperature of the lithium-ion battery, n=1+INT ((the first temperature−the lowest surface temperature of the lithium-ion battery)/x'), wherein, x' is the pre-determined temperature, and INT is the integer-valued function; and when the first temperature s the lowest surface temperature of the lithium-ion battery, n=0.

In another embodiment, a pulse width of the oscillation triggering signal for triggering the oscillation loop to generate the first and the second oscillation currents and the upper limit $f_g$ of the frequency range of the second oscillation current satisfy the relation: $T_0=k/f_g$, wherein, $T_0$ represents the pulse width of the oscillation triggering signal and k is a real number greater than 0 and less than or equal to 1. Accordingly, the duration $T_2$ of the first oscillation current and the pulse width $T_0$ of the oscillation triggering signal satisfy the relation: $T_2=nT_0/k$, wherein, n is an integer equal to or greater than 0. In certain examples, n is defined the same as supra.

Therefore, adjusting the duration of the first oscillation current according to the surface temperature of the lithium-ion battery comprises: adjusting the duration of the first oscillation current by adjusting the oscillation triggering signal (e.g., adjusting the number of the oscillation triggering signals).

In a second aspect, provided herein is a method for discharging a lithium-ion battery comprising:
generating an oscillation current using an oscillation loop formed based on an inherent impedance characteristic of the lithium-ion battery; and
discharging the lithium-ion battery in the form of the oscillation current according to one or more status parameters of the lithium-ion battery, i.e., providing the oscillation current to a load according to the one or more status parameters of the lithium-ion battery.

That is to say, the lithium-ion battery is discharged in the form of the oscillation current through the oscillation loop formed based on the inherent impedance characteristic of the lithium-ion battery, according to the one or more status parameters of the lithium-ion battery.

In one embodiment, the lithium-ion battery is discharged in the form of at least two oscillation currents (e.g., a first oscillation current and a second oscillation current) according to the one or more status parameters of the lithium-ion battery. Examples of the one or more status parameters of the lithium-ion battery include, without limitation, temperature, SOC, voltage, internal resistance, dimension size, weight, type, appearance, structure, materials, etc. The at least two oscillation currents may be applied in any suitable order, e.g., by alternating the at least two oscillation currents. At least one of the at least two oscillation currents has a frequency higher than that of the other(s). For example, the first oscillation current has a frequency higher than that of the second oscillation current. In certain embodiments, discharging the lithium-ion battery in the form of the first and the second oscillation currents according to a temperature and SOC of the lithium-ion battery comprises: determining one or more discharging parameters according to the temperature and SOC of the lithium-ion battery, and discharging the lithium-ion battery in the form of the first and the second oscillation currents based on the one or more discharging parameters.

In certain embodiments, determining the one or more discharging parameters according to the temperature and SOC of the lithium-ion battery comprises: identifying the one or more discharging parameters corresponding to the temperature and SOC of the lithium-ion battery from a set of pre-stored discharging parameters under various temperatures and SOCs. Examples of the one or more discharging parameters include, without limitation, frequency range of the second oscillation current, and duration of the first oscillation current. Optionally, the frequency of the first oscillation current is equal to or greater than the upper limit of the frequency range of the second oscillation current.

In an embodiment, the frequency range of the second oscillation current is determined according to the temperature and SOC of the lithium-ion battery. In certain examples, in the frequency range of the second oscillation current, the lithium-ion battery has an electrochemical impedance equal to or lower than that of the lithium-ion battery at a first temperature and the same SOC. In certain examples, the frequency range of the second oscillation current may be determined by EIS of the lithium-ion battery in a pre-determined frequency range (e.g., 0 Hz~1000 kHz, 0.01 Hz~100 kHz) at various temperatures and SOCs as set forth supra (e.g., from $f_{cd}$ to $f_g$). Alternatively, in a set of the EIS plots with a second SOC (which can be any value from 0-100%, e.g., 90%), the frequencies corresponding to the intersections of the EIS plots at various temperatures and a line parallel to the horizontal axis and through an intersection of the EIS plot at a second temperature (which can be any value from −70° C.~100° C., e.g., −20° C.) and the vertical axis in a low frequency region are the lower limits $f_{dd}$ of the frequency range of the second oscillation current under the various temperatures, respectively; and in a set of the EIS plots with a first SOC (which can be any value from 0-100%, e.g., 10%, and lower than the second SOC), the intersections of the EIS plots and a line parallel to the horizontal axis and through the intersection of the EIS plot at a first temperature (which can be any value from −70° C. to 100° C., e.g., 0° C. and greater than the second temperature) and the vertical axis in a high frequency region are the upper limits $f_g$ of the frequency range of the second oscillation current. Therefore, the frequency range of the second oscillation current can be from $f_{dd}$ to $f_g$. In certain embodiments, the first temperature is a working temperature of the lithium-ion battery (e.g., 0° C.). In certain embodiments, the first temperature is the optimal working temperature of the lithium-ion battery. In certain embodiments, the first temperature is the lowest working temperature of the lithium-ion battery. In certain embodiments, the second temperature is a temperature at which the mobility of the lithium ion is significantly decreased (e.g., about −20° C.). In certain embodiments, the $f_{dd}$-$f_g$ determined for the discharging process can be applicable to the charging process as the frequency range of the second oscillation current.

In certain embodiments, the duration of the first oscillation current and the upper limit $f_g$ of the frequency range of the second oscillation current satisfy the relation: $T_2=n/f_g$, wherein $T_2$ represents the duration of the first oscillation current and n is an integer equal to or greater than 0. For example, discharging the lithium-ion battery in the form of the first and the second oscillation currents based on the one or more discharging parameters may comprise: adjusting the duration of the first oscillation current according to a surface temperature of the lithium-ion battery, wherein, when the lowest surface temperature of the lithium-ion battery equals to or is greater than the first temperature (e.g., 0° C.), n in $T_2=n/f_g$ is 0; and when the lowest surface temperature of the lithium-ion battery is decreased by a pre-determined temperature (e.g., 0.01° C. to 50° C., 0.01° C. to 20° C., 1° C. to 40° C., 2° C. to 30° C., 3° C. to 25° C., 4° C. to 20° C., 5° C. to 15° C., 6° C. to 13° C., 7° C. to 12° C., 8° C. to 11° C., 9° C., 10° C., 14° C., etc.), n in $T_2=n/f_g$ is increased by 1. In certain examples, n is defined the same as supra.

In another embodiment, the pulse width of the oscillation triggering signal for triggering the oscillation loop to generate the first and the second oscillation currents and the upper limit $f_g$ of the frequency range of the second oscillation current satisfy the relation: $T_0=k/f_g$, wherein $T_0$ represents the pulse width of the oscillation triggering signal and k is a real number greater than 0 and less than or equal to 1. The duration $T_2$ of the first oscillation current and the pulse width $T_0$ of the oscillation triggering signal satisfy the relation: $T_2=nT_0/k$, wherein n is an integer equal to or greater than 0. In certain examples, n is defined the same as supra. Therefore, adjusting the duration of the first oscillation current according to the surface temperature of the lithium-ion battery comprises: adjusting the duration of the first oscillation current by adjusting the oscillation triggering signal (for example, adjusting the number of the oscillation triggering signals).

In a third aspect, provided herein is a method for regulating a charging process for a lithium-ion battery comprising: monitoring one or more status parameters of the lithium-ion battery, examples of the one or more status parameters include, without limitation, temperature, SOC, voltage, internal resistance, dimension size, weight, type, appearance, structure, materials, etc.; determining one or more charging regulation parameters of the lithium-ion battery according to the one or more monitored status parameters (e.g., temperature and SOC); generating an oscillation current using an oscillation loop formed based on an inherent impedance characteristic of the lithium-ion battery; and supplying the oscillation current to the lithium-ion battery according to the determined one or more charging regulation parameters, for example, without limitation, alternately supplying at least two oscillation currents such as a first oscillation current and a second oscillation current. One of the at least two oscillation currents has a frequency higher than the other(s). For example, the first oscillation current has a frequency higher than that of the second oscillation current. Examples of the one or more charging regulation parameters include, without limitation, frequency range of the second oscillation current, duration of the first oscillation current, and amplitude of the charging current, wherein the frequency of the first oscillation current is equal to or greater than the upper limit of the frequency range of the second oscillation current. In certain embodiments, determining the one or more charging regulation parameters according to the monitored temperature and SOC comprises: determining the one or more charging regulation parameters corresponding to the monitored temperature and SOC of the lithium-ion battery from a set of pre-stored charging regulation parameters under various temperatures and SOCs.

In an embodiment, the frequency range of the second oscillation current is determined according to the temperature and SOC of the lithium-ion battery as disclosed herein. Optionally, determining the frequency range of the second oscillation current according to the temperature and SOC of the lithium-ion battery comprises: based on EIS of the lithium-ion battery in a pre-determined frequency range (e.g., 0 Hz~1000 kHz, 0.01 Hz~100 kHz) at various temperatures and SOCs, in a set of the EIS plots at a first SOC (which can be any value from 0-100%, e.g., 10%), the frequencies corresponding to the intersections of the EIS plots at various temperatures and a line parallel to the horizontal axis and through the intersection of the EIS plot at a first temperature (which can be any value from −70° C.~100° C., e.g., 0° C.) and the vertical axis in a low frequency region are lower limits $f_{cd}$ of the frequency range of the second oscillation current at the various temperatures, respectively, and the intersections of said parallel line with the EIS plots in a high frequency region are the upper limits $f_g$ of the frequency range of the second oscillation current. Therefore, the frequency range of the second oscillation current may comprise or be the range from $f_{cd}$ to $f_g$. The duration of the first oscillation current and the upper limit $f_g$ of the frequency range of the second oscillation current may satisfy the relation: $T_2=n/f_g$, wherein $T_2$ represents the duration of the first oscillation current and n is an integer equal to or greater than 0. In certain examples, n is defined the same as supra.

Furthermore, supplying the first and the second oscillation currents to the lithium-ion battery according to the one or more charging regulation parameters may comprise: adjusting the duration of the first oscillation current according to the surface temperature of the lithium-ion battery and increasing the amplitude of charging current; when the surface temperature of the lithium-ion battery is above the first temperature (e.g., 0° C.), maintaining the duration of the first oscillation current and increasing the amplitude of the charging current; when the terminal voltage of the lithium-ion battery reaches an upper limit of the charging voltage, decreasing the amplitude of the charging current until the charging process ends. Optionally, adjusting the duration of the first oscillation current according to the surface temperature of the lithium-ion battery comprises: when the lowest surface temperature of the lithium-ion battery is equal to or greater than the first temperature (e.g., 0° C.), n in $T_2=n/f_g$ is 0; and when the lowest surface temperature of the lithium-ion battery is decreased by a pre-determined temperature (e.g., 0.01° C. to 50° C., 0.01° C. to 20° C., 1° C. to 40° C., 2° C. to 30° C., 3° C. to 25° C., 4° C. to 20° C., 5° C. to 15° C., 6° C. to 13° C., 7° C. to 12° C., 8° C. to 11° C., 9° C., 10° C., 14° C., etc.), n in $T_2=n/f_g$ is increased by 1.

In another embodiment, the pulse width of the oscillation triggering signal for triggering the oscillation loop to generate the first and the second oscillation currents and the upper limit $f_g$ of the frequency range of the second oscillation current satisfy the relation: $T_0=k/f_g$, wherein $T_0$ represents the pulse width of the oscillation triggering signal and k is a real number greater than 0 and less than or equal to 1. The duration $T_2$ of the first oscillation current and the pulse width $T_0$ of the oscillation triggering signal satisfy the relation: $T_2=nT_0/k$, wherein n is an integer equal to or greater than 0. In certain examples, n is defined the same as supra. Therefore, adjusting the duration of the first oscillation current according to the surface temperature of the lithium-ion battery comprises: adjusting the duration of the first oscillation current by adjusting the oscillation triggering signal. For example, the duration of the first oscillation current is adjusted by adjusting the number of the oscillation triggering signals.

In a fourth aspect, provided herein is a method for regulating the discharging process for lithium-ion battery comprising: monitoring one or more status parameters of the lithium-ion battery, including one or more parameters selected from temperature, SOC, voltage, internal resistance, dimension size, weight, type, appearance, structure, materials, and so on; determining one or more discharging regulation parameters of the lithium-ion battery according to the monitored temperature and SOC; generating an oscillation current using an oscillation loop formed based on an inherent impedance characteristic of the lithium-ion battery; and discharging the lithium-ion battery in the form of oscillation current according to the one or more discharging regulation parameters, for example, without limitation, in the form of at least two oscillation currents (e.g., a first oscillation current and a second oscillation current). That is to say, the lithium-ion battery is discharged in the form of the oscillation current through the oscillation loop formed based on the inherent impedance characteristic of the lithium-ion battery, according to the one or more status parameters of the lithium-ion battery. One of the at least two oscillation currents has a frequency higher than the other(s). For example, the first oscillation current has a frequency higher than that of the second oscillation current. Examples of the one or more discharging regulation parameters include, without limitation, frequency range of the second oscillation current and duration of the first oscillation current, and the frequency of the first oscillation current is equal to or greater than the upper limit of the frequency range of the second oscillation current. In certain embodiments, determining the one or more discharging regulation parameters according to the monitored temperature and SOC comprises: determining the one or more discharging regulation parameters corresponding to the monitored temperature and SOC from a set of pre-stored discharging regulation parameters under various temperatures and SOCs.

Optionally, the frequency range of the second oscillation current is determined according to the temperature and SOC of the lithium-ion battery. For example, determining the frequency range of the second oscillation current according to the temperature and SOC of the lithium-ion battery comprises: based on the EIS of the lithium-ion battery in a pre-determined frequency range (e.g., 0 Hz~1000 kHz, 0.01 Hz~100 kHz) at various temperatures and SOCs, in a set of the EIS plots at a second SOC (which can be any value from 0-100%, e.g., 90%), the frequencies corresponding to the intersections of the EIS plots at various temperatures and a line parallel to the horizontal axis and through an intersection of the EIS plot at a second temperature (which can be any value from −70° C.~100° C., e.g., −20° C.) and the vertical axis in a low frequency region are lower limits $f_{dd}$ of the frequency range of the second oscillation current under the various temperatures, respectively, in a set of the EIS plots at a first SOC (which can be any value from 0-100%, e.g., 10%), the intersections of the EIS plots and a line parallel to the horizontal axis and through the intersection of the EIS plot at a first temperature (which can be any value from −70° C.~100° C. that is higher than the second temperature, e.g., 0° C.) and the vertical axis in a high frequency region are upper limits $f_g$ of the frequency range of the second oscillation current. Therefore, the frequency range of the second oscillation current may comprise or be the range from $f_{dd}$ to $f_g$. The duration of the first oscillation current and the upper limit $f_g$ of the frequency range of the second oscillation current satisfy the relation: $T_2=n/f_g$, wherein $T_2$ represents the duration of the first oscillation current and n is an integer equal to or greater than 0. In certain examples, n is defined the same as supra.

Furthermore, discharging the lithium-ion battery in the form of the first and the second oscillation currents according to the one or more discharging regulation parameters may comprise: adjusting the duration of the first oscillation current according to the surface temperature of the lithium-ion battery. In certain embodiments, adjusting the duration of the first oscillation current according to the surface temperature of the lithium-ion battery comprises: when the lowest surface temperature of the lithium-ion battery is equal to or greater than the first temperature (e.g., 0° C.), n in $T_2=n/f_g$ is 0; and when the lowest surface temperature of the lithium-ion battery is decreased by a pre-determined temperature (e.g., 0.01° C. to 50° C., 0.01° C. to 20° C., 1° C. to 40° C., 2° C. to 30° C., 3° C. to 25° C., 4° C. to 20° C., 5° C. to 15° C., 6° C. to 13° C., 7° C. to 12° C., 8° C. to 11° C., 9° C., 10° C., 14° C., etc.), n in $T_2=n/f_g$ is increased by 1. In certain examples, n is defined the same as supra.

In certain embodiments, the pulse width of the oscillation triggering signal for triggering the oscillation loop to generate the first and the second oscillation currents and the upper limit $f_g$ of the frequency range of the second oscillation current satisfy the relation: $T_0=k/f_g$, wherein $T_0$ represents the pulse width of the oscillation triggering signal and k is a real number greater than 0 and less than or equal to 1. The duration $T_2$ of the first oscillation current and the pulse width $T_0$ of the oscillation triggering signal satisfy the relation: $T_2=nT_0/k$, wherein n is an integer equal to or greater than 0. In certain examples, n is defined the same as supra. Therefore, adjusting the duration of the first oscillation current according to the surface temperature of the lithium-ion battery may comprise: adjusting the duration of the first oscillation current by adjusting the oscillation triggering signal (e.g., adjusting the number of the oscillation triggering signals).

In a fifth aspect, a system for charging the lithium-ion battery is provided herein, comprising a first charging device and a variable frequency triggering oscillation charging device coupled between the first charging device and the lithium-ion battery. The variable frequency triggering oscillation charging device utilizes an oscillation current generated by an oscillation loop that is formed from an inherent impedance characteristic of the lithium-ion battery to charge the lithium-ion battery. For example, the variable frequency triggering oscillation charging device utilizes at least two oscillation currents (e.g., a first oscillation current and a second oscillation current) to charge the lithium-ion battery, wherein at least one oscillation current of the at least two oscillation currents has a frequency higher than the other(s). For example, the first oscillation current has a frequency higher than that of the second oscillation current.

In one embodiment, the variable frequency triggering oscillation charging device comprises an energy storage and freewheeling unit connected to the first charging device in parallel, an oscillation unit connected to the lithium-ion battery in parallel to form the oscillation loop, and an oscillation trigger connected between the energy storage and freewheeling unit and the oscillation unit. The oscillation trigger triggers the oscillation loop to generate the oscillation current. In certain examples, the oscillation trigger triggers the oscillation loop to generate at least two oscillation currents comprising the first oscillation current and the second oscillation current.

In another embodiment, the variable frequency triggering oscillation charging device comprises an energy storage and freewheeling unit connected to the first charging device in parallel, an oscillation unit connected to the energy storage and freewheeling unit in series, and an oscillation trigger connected to the oscillation unit in parallel. The energy storage and freewheeling unit and the oscillation unit, which are connected in series, are connected to the lithium-ion battery in series to form the oscillation loop. The oscillation trigger triggers the oscillation loop to generate the oscillation current. In certain examples, the oscillation trigger triggers the oscillation loop to generate at least two oscillation currents comprising the first oscillation current and the second oscillation current.

Further, the system further comprises a control device that controls the variable frequency triggering oscillation charging device to supply at least two oscillation currents (e.g., the first and the second oscillation currents) to the lithium-ion battery according to the one or more status parameters of the lithium-ion battery. Examples of the one or more status parameters include, without limitations, temperature, SOC, internal resistance, voltage, dimension size, weight, type, appearance, structure, materials, etc.

In certain embodiments, controlling the variable frequency triggering oscillation charging device to supply the first and the second oscillation currents to the lithium-ion battery by the control device according to the temperature and SOC of the lithium-ion battery comprises: determining the one or more charging parameters by the control device based on the temperature and SOC of the lithium-ion battery; and supplying the first and the second oscillation currents to the lithium-ion battery according to the one or more charging parameters. Determining the one or more charging parameters by the control device according to the temperature and SOC of the lithium-ion battery may comprise determining the one or more charging parameters corresponding to the temperature and SOC of the lithium-ion battery from a set of pre-stored charging parameters under various temperatures and SOCs. Examples of the one or more charging parameters include, without limitation, frequency range of the second oscillation current, duration of the first oscillation current, and amplitude of the charging current. The first oscillation current has a frequency higher than or equal to the upper limit of the frequency range of the second oscillation current.

Optionally, the frequency range of the second oscillation current is determined according to the temperature and SOC of the lithium-ion battery. For example, determining the frequency range of the second oscillation current according to the temperature and SOC of the lithium-ion battery may comprise: according to the EIS of the lithium-ion battery in a pre-determined frequency range (e.g., 0 Hz~1000 kHz, 0.01 Hz~100 kHz) at various temperatures and SOCs. In a set of the EIS plots at a first SOC (which can be any value from 0-100%, e.g., 10%), the frequencies corresponding to the intersections of the EIS plots at various temperatures and a line parallel to the horizontal axis and through the intersection of the EIS plot at a first temperature (which can be any value from −70° C.~100° C., e.g., 0° C.) and the vertical axis in a low frequency region are the lower limits $f_{cd}$ of the frequency range of the second oscillation current at the various temperatures, respectively, and the intersections of said line with the EIS plots in a high frequency region are the upper limits $f_g$ of the frequency range of the second oscillation. Therefore, the frequency range of the second oscillation current may comprise or be the range from $f_{cd}$ to $f_g$. The duration of the first oscillation current and the upper limit $f_g$ of the frequency range of the second oscillation current satisfy the relation: $T_2=n/f_g$, wherein $T_2$ represents the duration of the first oscillation current and n is an integer equal to or greater than 0. In certain examples, n is defined the same as supra.

Furthermore, the control device controls the variable frequency triggering oscillation charging device to supply the first and the second oscillation currents to the lithium-ion battery according to the one or more charging parameters. In certain embodiments, such controlling process includes, e.g., adjusting the duration of the first oscillation current according to the surface temperature of the lithium-ion battery and increasing the amplitude of charging current; when the surface temperature of the lithium-ion battery is above the first temperature (e.g., 0° C.), maintaining the duration of the first oscillation current and increasing the amplitude of charging current; when the terminal voltage of the lithium-ion battery reaches an upper limit of the charging voltage, decreasing the amplitude of charging current until the charging process ends.

In certain embodiments, adjusting the duration of the first oscillation current by the control device according to the surface temperature of the lithium-ion battery includes: when the lowest surface temperature of the lithium-ion battery is equal to or above the first temperature (e.g., 0° C.), n in the equation $T_2=n/f_g$ is 0; and when the lowest surface temperature of the lithium-ion battery is decreased at the pre-determined temperature (e.g., 0.01° C. to 50° C., 0.01° C. to 20° C., 1° C. to 40° C., 2° C. to 30° C., 3° C. to 25° C., 4° C. to 20° C., 5° C. to 15° C., 6° C. to 13° C., 7° C. to 12° C., 8° C. to 11° C., 9° C., 10° C., 14° C., etc.), n in the equation $T_2=n/f_g$ is increased by 1. In certain examples, n is defined the same as supra.

In certain embodiments, the pulse width of the oscillation triggering signal of the oscillation trigger and the upper limit $f_g$ of the frequency range of the second oscillation current satisfy the relation: $T_0=k/f_g$, wherein $T_0$ represents the pulse width of the oscillation triggering signal and k is a real number greater than 0 and less than or equal to 1. The duration $T_2$ of the first oscillation current and the pulse width $T_0$ of the oscillation triggering signal satisfy the relation: $T_2=nT_0/k$, wherein n is an integer equal to or greater than 0. In certain examples, n is defined the same as supra. Therefore, adjusting the duration of the first oscillation current by the control device according to the surface temperature of the lithium-ion battery may comprise: adjusting the oscillation triggering signal (e.g., adjusting the number of the oscillation triggering signals) to adjust the duration of the first oscillation current.

In a sixth aspect, provided herein is a system for discharging the lithium-ion battery comprising: a variable frequency triggering oscillation discharging device coupled between a load and the lithium-ion battery. The variable frequency triggering oscillation discharging device discharges the lithium-ion battery in the form of an oscillation current generated by an oscillation loop formed based on an inherent impedance characteristic of the lithium-ion battery. For example, the variable frequency triggering oscillation discharging device may discharge the lithium-ion battery in the form of at least two oscillation currents. At least one of the at least two oscillation currents has a frequency higher than the other(s).

In an embodiment, the variable frequency triggering oscillation discharging device comprises: an energy storage and freewheeling unit connected to the load in parallel, an oscillation unit connected to the lithium-ion battery in parallel to form the oscillation loop, and an oscillation trigger connected between the energy storage and freewheeling unit and the oscillation unit. The oscillation trigger triggers the oscillation loop to generate the oscillation current. In certain examples, the oscillation trigger triggers the oscillation loop to generate at least two oscillation currents.

In another embodiment, the variable frequency triggering oscillation discharging device comprises: an energy storage and freewheeling unit connected to the load in parallel, an oscillation unit connected to the energy storage and freewheeling unit in series, and an oscillation trigger connected to the oscillation unit in parallel. The energy storage and freewheeling unit and the oscillation unit, which are connected in series, are connected to the lithium-ion battery in series to form the oscillation loop. The oscillation trigger triggers the oscillation loop to generate the oscillation current. In certain examples, the oscillation trigger triggers the oscillation loop to generate at least two oscillation currents.

Further, the system further comprises a control device that controls the variable frequency triggering oscillation discharging device to discharge the lithium-ion battery in the form of at least two oscillation currents according to the temperature and SOC of the lithium-ion battery. The at least two oscillation currents comprise a first oscillation current and a second oscillation current. The first oscillation current has a frequency higher than that of the second oscillation current. Controlling the variable frequency triggering oscillation discharging device to discharge the lithium-ion battery in the form of at least two oscillation currents by the control device based on the temperature and SOC of the lithium-ion battery may comprise: determining one or more discharging parameters by the control device according to the temperature and SOC of the lithium-ion battery, and discharging the lithium-ion battery in the form of the first and the second oscillation currents based on the one or more discharging parameters. Optionally, determining the one or more discharging parameters by the control device according to the temperature and SOC of the lithium-ion battery comprises: determining the one or more discharging parameters corresponding to the temperature and SOC of the lithium-ion battery from a set of pre-stored discharging parameters under various temperatures and SOCs. Examples of the one or more discharging parameters include, without limitation, frequency range of the second oscillation current and duration of the first oscillation current. The first oscillation current has a frequency equal to or higher than the upper limit of the frequency range of the second oscillation current.

Optionally, the frequency range of the second oscillation current is determined according to the temperature and SOC of the lithium-ion battery. For example, determining the frequency range of the second oscillation current according to the temperature and SOC of the lithium-ion battery comprises: according to the EIS of the lithium-ion battery in a pre-determined frequency range (e.g., 0 Hz~1000 kHz, 0.01 Hz~100 kHz) at various temperatures and SOCs, in a set of the EIS plots at a second SOC (which can be any value from 0-100%, e.g., 90%), the frequencies corresponding to the intersections of the EIS plots at various temperatures and a line parallel to the horizontal axis and through the intersection of the EIS plot at a second temperature (which can be any value from −70° C.~100° C., e.g., −20° C.) and the vertical axis in a low frequency region are the lower limits $f_{dd}$ of the frequency range of the second oscillation current at the various temperatures, respectively; in a set of the EIS plots at a first SOC (which can be any value from 0-100%, e.g., 10%), the intersections of the EIS plots and a line parallel to the horizontal axis and through the intersection of the EIS plot at a first temperature (which can be any value from −70° C.~100° C., e.g., 0° C.) and the vertical axis in a high frequency region are the upper limits $f_g$ of the frequency range of the second oscillation current. Therefore, the frequency range of the second oscillation current ranges from $f_{dd}$ to $f_g$. The duration of the first oscillation current and the upper limit $f_g$ of the frequency range of the second oscillation current satisfy the relation: $T_2 = r/f_g$, wherein $T_2$ represents the duration of the first oscillation current and n is an integer equal to or greater than 0. Moreover, controlling the variable frequency triggering oscillation discharging device to discharge the lithium-ion battery in the form of the first and the second oscillation currents by the control device according to the one or more discharging parameters may comprise: adjusting the duration of the first oscillation current according to the surface temperature of the lithium-ion battery. For example, when the lowest surface temperature of the lithium-ion battery is equal to or above the first temperature (e.g., 0° C.), n in the equation $T_2 = n/f_g$ is 0; and when the lowest surface temperature of the lithium-ion battery is decreased by a pre-determined temperature (e.g., 0.01° C. to 50° C., 0.01° C. to 20° C., 1° C. to 40° C., 2° C. to 30° C., 3° C. to 25° C., 4° C. to 20° C., 5° C. to 15° C., 6° C. to 13° C., 7° C. to 12° C., 8° C. to 11° C., 9° C., 10° C., 14° C., etc.), n in the equation $T_2 = n/T_g$ is increased by 1. In certain examples, n is defined the same as supra.

As an alternative, the pulse width of the oscillation triggering signal of the oscillation trigger and the upper limit $f_g$ of the frequency range of the second oscillation current satisfy the relation: $T_0 = k/f_g$, wherein $T_0$ represents the pulse width of the oscillation triggering signal and k is a real number greater than 0 and less than or equal to 1. The duration $T_2$ of the first oscillation current and the pulse width $T_0$ of the oscillation triggering signal satisfy the relation: $T_2 = nT_0/k$, wherein n is an integer equal to or greater than 0. In certain examples, n is defined the same as supra. Therefore, adjusting the duration of the first oscillation current by the control device according to the surface temperature of the lithium-ion battery may comprise: adjusting the oscillation triggering signal (for example, adjusting the number of the oscillation triggering signals) to adjust the duration of the first oscillation current.

In a seventh aspect, provided herein is a control device for regulating charging of the lithium-ion battery comprising: a memory in which computer-readable instructions (or program) and data are stored; and a processor performing part or all of operations (or processes or procedures) in the method as described in the third aspect when executing the computer-readable instructions (or program).

In an eighth aspect, provided herein is a control device for regulating discharging of the lithium-ion battery comprising: a memory in which computer-readable instructions (or program) and data are stored; and a processor performing part or all of operations (or processes or procedures) in the method as described in the fourth aspect when executing the computer-readable instructions (or program).

In a ninth aspect, provided herein is a method for manufacturing a charging system of the lithium-ion battery, comprising: configuring a variable frequency triggering oscillation charging device between a first charging device and the lithium-ion battery. The variable frequency triggering oscillation charging device provides an oscillation loop with the lithium-ion battery based on an inherent impedance characteristic of the lithium-ion battery to generate an oscillation current. The variable frequency triggering oscillation charging device uses the oscillation current to charge the lithium-ion battery. For example, the variable frequency triggering oscillation charging device uses at least two oscillation currents to charge the lithium-ion battery. At least one oscillation current of the at least two oscillation currents has a frequency higher than the other(s). In certain embodiments, the method further comprising providing the first charging device; and providing the lithium-ion battery.

In one embodiment, configuring a variable frequency triggering oscillation charging device between the first charging device and the lithium-ion battery comprises: providing an energy storage and freewheeling unit that is connected to the first charging device in parallel; providing an oscillation unit that is connected to the lithium-ion battery in parallel to form the oscillation loop; and providing an oscillation trigger that is connected between the energy storage and freewheeling unit and the oscillation unit. The oscillation trigger triggers the oscillation loop to generate the oscillation current. In certain embodiments, configuring a variable frequency triggering oscillation charging device between the first charging device and the lithium-ion battery comprises: connecting an energy storage and freewheeling unit to the first charging device in parallel; connecting an oscillation unit to the lithium-ion battery in parallel to form the oscillation loop; and connecting an oscillation trigger between the energy storage and freewheeling unit and the oscillation unit.

In another embodiment, configuring a variable frequency triggering oscillation charging device between the first charging device and the lithium-ion battery comprises: providing an energy storage and freewheeling unit that is connected to the first charging device in parallel; providing an oscillation unit that is connected to the energy storage and freewheeling unit in series; connecting the energy storage and freewheeling unit and the oscillation unit that are connected in series to the lithium-ion battery in series to form the oscillation loop; and providing an oscillation trigger that is connected to the oscillation unit in parallel. The oscillation trigger triggers the oscillation loop to generate the oscillation current. In certain embodiments, configuring a variable frequency triggering oscillation charging device between the first charging device and the lithium-ion battery comprises: connecting an energy storage and freewheeling unit to the first charging device in parallel; connecting an oscillation unit to the energy storage and freewheeling unit in series; connecting the energy storage and freewheeling unit and the oscillation unit that are connected in series to the lithium-ion battery in series to form the oscillation loop; and connecting an oscillation trigger to the oscillation unit in parallel.

In certain embodiments, the method may further comprise: providing a control device that controls the variable frequency triggering oscillation charging device to supply the oscillation current to the lithium-ion battery according to the one or more status parameters of the lithium-ion battery. In certain embodiments, the method may further comprise: coupling a control device into the charging system to control the variable frequency triggering oscillation charging device to supply the oscillation current to the lithium-ion battery according to the one or more status parameters of the lithium-ion battery. The controlling method is the same as the adjusting method disclosed herein.

In a tenth aspect, a method for manufacturing a discharging system of the lithium-ion battery is provided herein, comprising: and configuring a variable frequency triggering oscillation discharging device between a load and the lithium-ion battery. The variable frequency triggering oscillation charging device constructs an oscillation loop with the lithium-ion battery based on an inherent impedance characteristic of the lithium-ion battery to generate an oscillation current. The variable frequency triggering oscillation discharging device discharges the lithium-ion battery in the form of the oscillation current. For example, the variable frequency triggering oscillation discharging device discharges the lithium-ion battery in a form of at least two oscillation currents. At least one oscillation current of the at least two oscillation currents has a frequency higher than the other(s). In certain embodiments, the method further comprises providing a lithium-ion battery;

In one embodiment, configuring a variable frequency triggering oscillation discharging device between the load and the lithium-ion battery comprises: providing an energy storage and freewheeling unit that is connected to the load in parallel; providing an oscillation unit that is connected to the lithium-ion battery in parallel to form the oscillation loop; and providing an oscillation trigger that is connected between the energy storage and freewheeling unit and the oscillation unit. The oscillation trigger triggers the oscillation loop to generate the oscillation current. In certain embodiments, configuring a variable frequency triggering oscillation discharging device between the load and the lithium-ion battery comprises: connecting an energy storage and freewheeling unit to the load in parallel; connecting an oscillation unit to the lithium-ion battery in parallel to form the oscillation loop; and connecting an oscillation trigger between the energy storage and freewheeling unit and the oscillation unit.

In another embodiment, configuring a variable frequency triggering oscillation discharging device between the load and the lithium-ion battery comprises: providing an energy storage and freewheeling unit that is connected to load in parallel; providing an oscillation unit that is connected to the energy storage and freewheeling unit in series; connecting the energy storage and freewheeling unit and the oscillation unit that are connected in series to the lithium-ion battery in series to form the oscillation loop; and providing an oscillation trigger that is connected to the oscillation unit in parallel. The oscillation trigger triggers the oscillation loop to generate the oscillation current. In certain embodiments, configuring a variable frequency triggering oscillation discharging device between the load and the lithium-ion battery comprises: connecting an energy storage and freewheeling unit in parallel; connecting an oscillation unit to the energy storage and freewheeling unit in series; connecting the energy storage and freewheeling unit and the oscillation unit that are connected in series to the lithium-ion battery in series to form the oscillation loop; and connecting an oscillation trigger to the oscillation unit in parallel.

In certain embodiments, the method further comprises: providing a control device that controls the variable frequency triggering oscillation discharging device to discharge the lithium-ion battery in the form of the oscillation current according to the one or more status parameters of the lithium-ion battery. In certain embodiments, the method further comprises: coupling a control device into the discharging system to control the variable frequency triggering oscillation discharging device to discharge the lithium-ion battery in the form of the oscillation current according to the one or more status parameters of the lithium-ion battery. The controlling method is the same as disclosed herein.

According to the various embodiments in the respective aspects disclosed herein, in a charge-discharge process of a lithium-ion battery (e.g., a battery cell, and battery pack), the charge/discharge current for a conventional charging device/load is a direct current while the charge/discharge of the lithium-ion battery is performed using an oscillation current. As the lithium-ion battery is no longer charged/discharged by a direct current, polarization and lithium precipitation of the lithium-ion battery are eliminated, and the lithium-ion battery life is prolonged. Charging threshold voltage for the lithium-ion battery is also enhanced, and charging quantity of the lithium-ion battery is increased. As another oscillation current with a higher frequency is used for an internal heating of the lithium-ion battery, the internal temperature raising in the battery is controlled, and operating temperature range for the lithium-ion battery is broadened. Unless otherwise specified, a conventional charging device can be any charging device suitable for charging the lithium-ion battery.

Aspects, features, advantages and the like of the embodiment will be described in greater detail by reference to the drawings. The aspects, features, advantages and the like will be apparent according to the detailed description by reference to the drawings.

BRIEF DESCRIPTION OF THE DRAWINGS

Brief descriptions of the drawings are provided below for illustration of various embodiments disclosed herein. A person of ordinary skill in the art may obtain other drawings for other embodiments based on these drawings without creative effort.

This application contains at least one drawing executed in color. Copies of this application with color drawing(s) will be provided by the Office upon request and payment of the necessary fees.

FIG. 4*a* shows a connection for an oscillation trigger in a charging system for a lithium-ion battery according to an embodiment disclosed herein.

FIG. 4*b* shows a connection for an oscillation trigger in a charging system for a lithium-ion battery according to an embodiment disclosed herein.

FIG. 5 is a block diagram of a charging system for a lithium-ion battery according to Example 4.

FIG. 14*a* shows a connection for an oscillation trigger in a charge-discharge system for a lithium-ion battery according to embodiments disclosed herein.

FIG. 14*b* shows a connection for an oscillation trigger in a charge-discharge system for a lithium-ion battery according to embodiments disclosed herein.

FIG. 14*c* shows a connection for an oscillation trigger in a charge-discharge system for a lithium-ion battery according to embodiments disclosed herein.

FIG. 15 is a schematic diagram of an inherent impedance characteristic of a lithium-ion battery according to an embodiment disclosed herein.

DETAILED DESCRIPTION OF THE INVENTION

Figure 1:
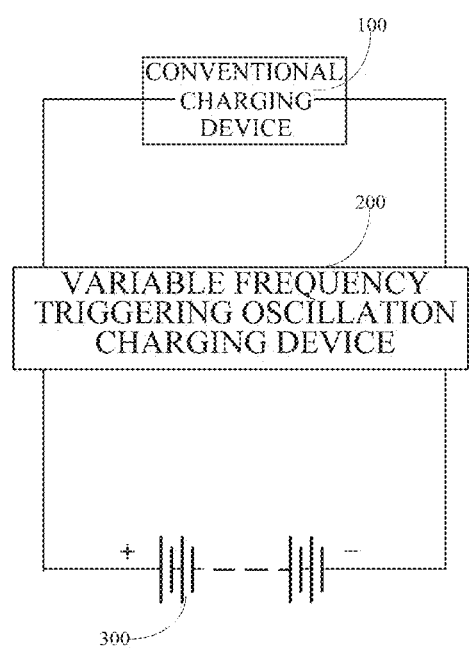
FIG. 1 is a block diagram of a charging system for a lithium-ion battery according to Example 1.

According to various embodiments disclosed herein, an oscillation current is generated using an oscillation loop formed based on an inherent impedance characteristic of a lithium-ion battery in a charge-discharge system, a control device and relevant methods for the lithium-ion battery, and the lithium-ion battery is charged or discharged using the oscillation current according to one or more status parameters of the lithium-ion battery. For example, at least two oscillation currents are used to charge the lithium-ion battery according to the one or more status parameters of the lithium-ion battery. At least one of the at least two oscillation currents has a frequency higher than the other(s). Technical solutions disclosed herein are described using a first oscillation current and a second oscillation current as examples. A person ordinary skill in the art should understand that the terms "first" and "second" are used to distinguish two oscillation currents, rather than limiting the number of the oscillation currents. And the one or more status parameters of the lithium-ion battery is not limited to temperature and SOC discussed herein, and can be one or more parameters selected from voltage, internal resistance, dimension size, weight, type, appearance, structure, materials, and the like.

Certain methods recited in the specification, claims and the drawings may include a plurality of operations described in certain orders. However, a person of ordinary skill in the art should understand that these operations are not necessarily required to be implemented according to the consecutive orders or be implemented concurrently as described herein. The reference numerals and letters for the operations are merely used to distinguish respective operations without requiring the implementation of the corresponding operations in any particular orders.

In order to fully understand the respective aspects, features and advantages of the methods and devices disclosed herein, embodiments are described below in detail with reference to the drawings. It should be understood that each exemplary embodiment intends to illustrate but not limit the scope of the present invention.

[Charging System]

Example 1

FIG. 1 shows a charging system for a lithium-ion battery according to Example 1 provided herein. The charging system for the lithium-ion battery may comprise a first charging device (e.g., a conventional charging device 100 used herein for illustration or any other charging devices that is not a variable frequency triggering oscillation charging device) and a variable frequency triggering oscillation charging device 200 connected between the conventional charging device 100 and the lithium-ion battery 300. The variable frequency triggering oscillation charging device 200 constructs an oscillation loop/circuit with the lithium-ion battery 300 using an inherent impedance characteristic of the lithium-ion battery 300. This oscillation loop generates an oscillation current for charging the lithium-ion battery. In one embodiment as described herein, the variable frequency triggering oscillation charging device 200 utilizes a first oscillation current and a second oscillation current to charge the lithium-ion battery 300. The first oscillation current has a frequency higher than that of the second oscillation current and may be a high frequency oscillation current as described below. The second oscillation current may be a middle frequency two-way oscillation current as described below. For example, the lithium-ion battery may be charged by providing the middle frequency two-way oscillation current initially, then further introducing the high frequency oscillation current to the lithium-ion battery for internal heating when the battery temperature is below 0° C., and providing the middle frequency two-way oscillation current for charging when the battery temperature is increased to be above 0° C. In another embodiment as described herein, when the battery temperature remains above 0° C., the lithium-ion battery is charged by a supply of the middle frequency two-way oscillation current.

In comparison with a conventional DC charging, the example provided herein utilizes the middle frequency oscillation current for charging to avoid a DC charging of the lithium-ion battery, and consequently eliminate polarization and lithium precipitation of the lithium-ion battery, extend its battery life, increase a charging threshold voltage of lithium ion, and increase a charging capacity of the lithium-ion battery. The internal heating with the high frequency oscillation current controls the increase of the internal temperature to broaden the temperature range suitable for the lithium-ion battery.

Example 2

Figure 2:
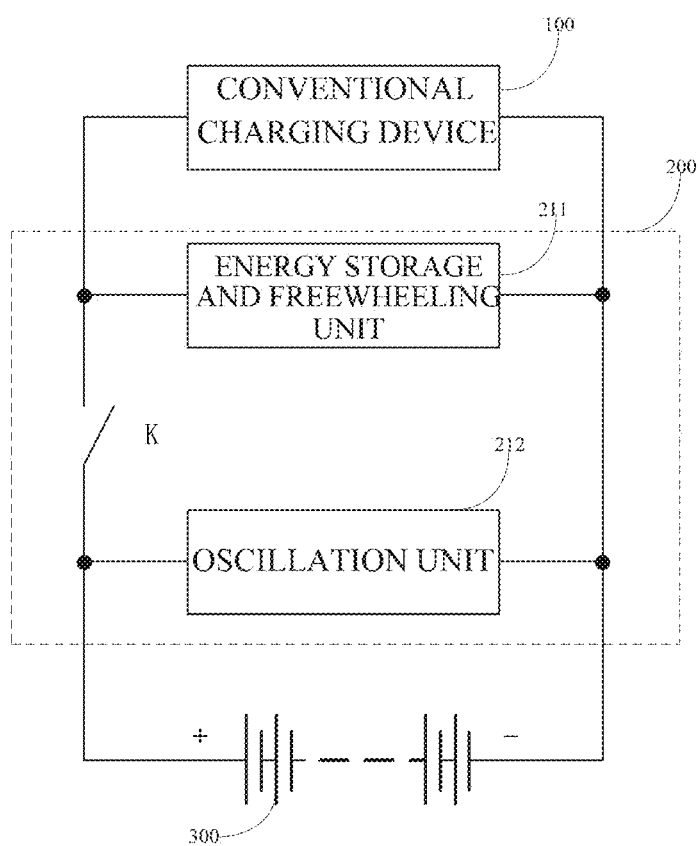
FIG. 2 is a block diagram of a charging system for a lithium-ion battery according to Example 2.

FIG. 2 shows a charging system for a lithium-ion battery according to Example 2. In this example, the system also includes a conventional charging device 100 and a variable frequency triggering oscillation charging device 200 connected between the conventional charging device 100 and the lithium-ion battery 300. The variable frequency triggering oscillation charging device 200 may comprise: an energy storage and freewheeling unit 211 connected to the conventional charging device 100 in parallel, an oscillation unit 212 connected to the lithium-ion battery 300 in parallel to form an oscillation loop, and an oscillation trigger K connected between the energy storage and freewheeling unit 211 and the oscillation unit 212. The oscillation trigger K triggers the oscillation loop to generate a first oscillation current and a second oscillation current. For example, the first oscillation current and the second oscillation current are supplied alternately to the lithium-ion battery 300 for charging. The first oscillation current may be a high frequency oscillation current as described below. The second oscillation current may be a middle frequency two-way oscillation current as described below. For example, the lithium-ion battery may be charged by providing the middle frequency two-way oscillation current initially, then further introducing the high frequency oscillation current to the lithium-ion battery for internal heating when the battery temperature is below 0° C., and providing the middle frequency two-way oscillation current for charging when the battery temperature is increased to be above 0° C. In another embodiment as described herein, when the battery temperature remains above 0° C., the lithium-ion battery is charged by a supply of the middle frequency two-way oscillation current.

In this example, the oscillation unit 212 comprises one or more elements (e.g., capacitors, inductors, resistors and the like) connected in parallel-series. The energy storage and freewheeling unit 211 comprises one or more of passive or active energy storage elements (e.g., capacitors, inductors, etc.) connected in parallel-series. During an oscillation of the oscillation loop, the energy storage and freewheeling unit 211 provides energy storage and freewheeling for the conventional charging device to maintain an output current of the charging device as a direct current meeting the requirement for ripple, for example, having a ripple coefficient of a direct-current of 0.1% to 10%.

Example 3

Figure 3:
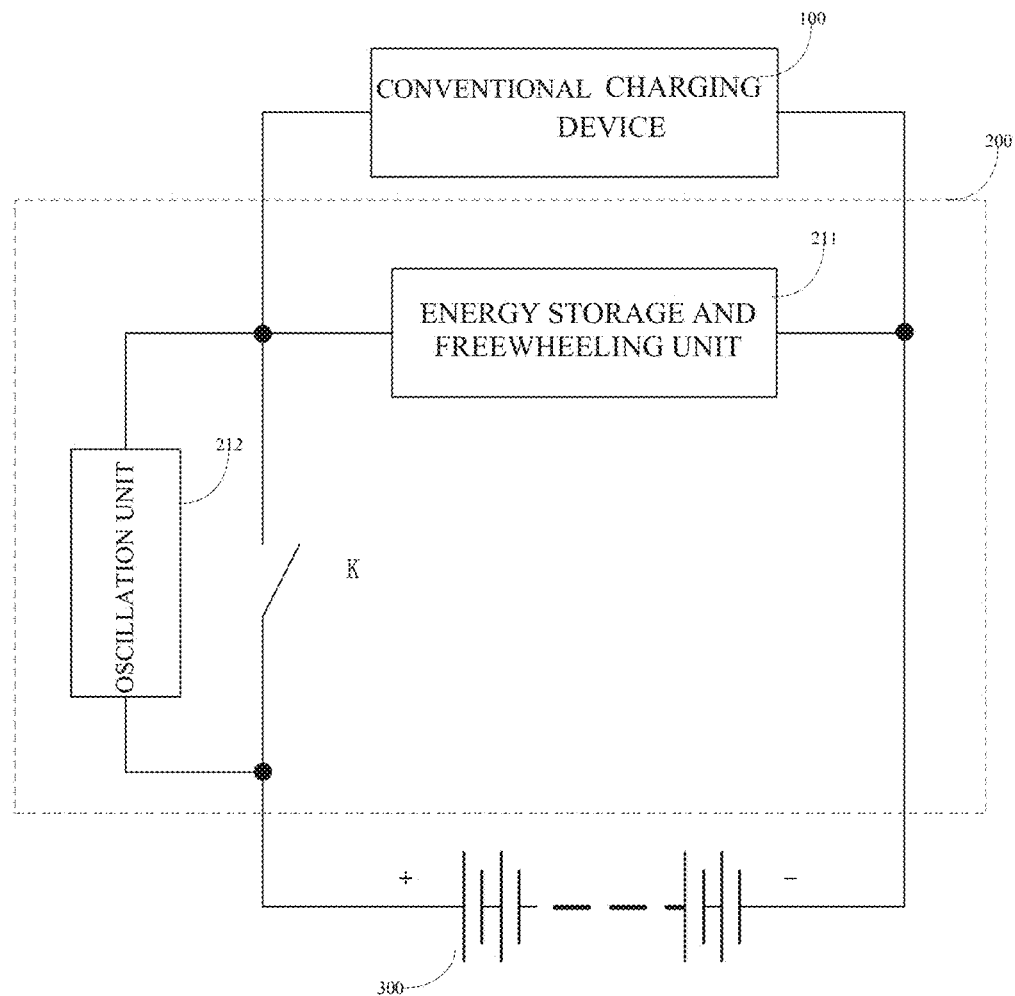
FIG. 3 is a block diagram of the charging system for a lithium-ion battery according to Example 3.

FIG. 3 shows a charging system for a lithium-ion battery according to Example 3. In this example, the system also includes a conventional charging device 100 and a variable frequency triggering oscillation charging device 200 connected between the conventional charging device 100 and the lithium-ion battery 300. The variable frequency triggering oscillation charging device 200 may comprise: an energy storage and freewheeling unit 211 connected to the conventional charging device in parallel, an oscillation unit 212 connected to the energy storage and freewheeling unit 211 in series, and an oscillation trigger K connected to the oscillation unit 212 in parallel. The energy storage and freewheeling unit 211 and the oscillation unit 212, which are connected in series, are connected to the lithium-ion battery 300 in series to form an oscillation loop. The oscillation trigger K triggers the oscillation loop to generate a first oscillation current and a second oscillation current. For example, the first and the second oscillation currents are supplied alternately to the lithium-ion battery 300 for charging. The first oscillation current may be a high frequency oscillation current as described below. The second oscillation current may be a middle frequency two-way oscillation current as described below. For example, the lithium-ion battery may be charged by providing the middle frequency two-way oscillation current initially, then further introducing the high frequency oscillation current to the lithium-ion battery for internal heating when the battery temperature is below 0° C., and providing the middle frequency two-way oscillation current for charging when the battery temperature is increased to be above 0° C. In another embodiment as described herein, when the battery temperature remains above 0° C., the lithium-ion battery is charged by a supply of the middle frequency two-way oscillation current.

In this example, the oscillation unit 212 comprises one or more elements (e.g., capacitors, inductors, resistors and the like) connected in parallel-series. The energy storage and freewheeling unit 211 comprises one or more passive or active energy storage elements (e.g., capacitors, inductors, and so on) connected in parallel-series. During an oscillation of the oscillation loop, the energy storage and freewheeling unit 211 provides energy storage and freewheeling for the conventional charging device to maintain the output current of the charging device as a direct current meeting the requirement for ripple, for example, having a ripple coefficient of a direct-current of 0.1% to 10%.

In the embodiments and examples disclosed herein, the oscillation trigger K can be an active switch device (e.g., MOSFET (Metal-Oxide-Semiconductor Field-Effect Transistor), IGBT (Insulated Gate Bipolar Transistor), transistor and the like). In an embodiment provided herein, the oscillation trigger K can be connected to a positive or negative output end of the oscillation loop in series. When the active switch is off, the oscillation loop is triggered for oscillation. As the active switch devices such as MOSFET, IGBT and the like comprises an anti-paralleled diode, the oscillation trigger can have a structure as shown in FIGS. 4A and 4B in the charging system for the lithium-ion battery when constructing the oscillation loop for the lithium-ion battery, wherein, $K_c$ represents the oscillation trigger for charging.

A person of ordinary skill in the art should understand that Examples 1 to 3 above use the first oscillation current and the second oscillation current as examples for illustration only, and not for limitation to the methods and devices disclosed herein. More than two oscillation currents can be used for charging. For example, oscillation currents with three, four, five, six, seven, eight, nine, ten, or more frequencies can be used for charging with any suitable sequences thereof.

Example 4

As shown in FIG. 5, Example 4 is different from Examples 1 to 3 in that the system further comprises a control device 400 that controls the variable frequency triggering oscillation charging device 200 to supply the first and the second oscillation currents to the lithium-ion battery according to a temperature and SOC of the lithium-ion battery. For example, the control device 400 determines one or more charging parameters according to the temperature and SOC of the lithium-ion battery 300 such that the first and the second oscillation currents are alternately supplied to the lithium-ion battery 300 according to the one or more charging parameters. For example, the one or more charging parameters corresponding to the temperature and SOC of the lithium-ion battery 300 can be retrieved from a set of pre-stored charging parameters under various temperatures and SOC. Examples of the one or more charging parameters include, without limitation, one or more elements selected from the group consisting of frequency ranges of the second oscillation current, frequency ranges of the first oscillation current, durations of the first oscillation current, duration of the second oscillation current, and amplitudes of charging currents. The first oscillation current has a frequency higher than the upper limit of the frequency range of the second oscillation current.

Figure 6:
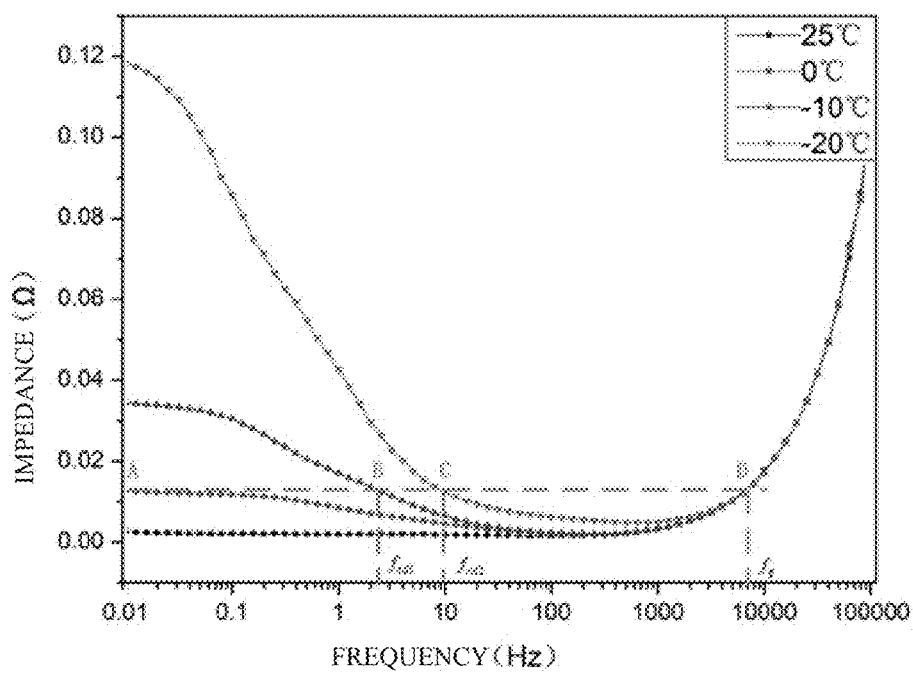
FIG. 6 shows EIS plots of a lithium-ion battery when SOC=10% according to an embodiment disclosed herein.

Optionally, the frequency range of the second oscillation current can be determined according to the temperature and SOC of the lithium-ion battery. For example, EIS of the lithium-ion battery in a pre-determined frequency range from 0.01 Hz to 100 kHz under various temperatures and SOCs can be obtained using an electrochemical workstation. A line parallel to the horizontal axis and through an intersection of the EIS plot at 0° C. and the vertical axis is plotted in the EIS with SOC=10% (shown as line A-D in FIG. 6). All EIS plots with a temperature below 0° C. intersect with the parallel line in a low frequency region and the frequencies $f_{cd}$ corresponding to the resultant intersections are the lower limits of the frequency ranges for triggering the oscillation for charging the lithium-ion battery under said temperature. For example, in FIG. 6, the intersection B of EIS plot at −10° C. and line A-D corresponds to $f_{cd1}$=2.3 Hz, and the intersection C of EIS plot at −20° C. and line A-D corresponds to $f_{cd2}$=10 Hz. These data indicate that the lower limits of the frequency for triggering charging of the second oscillation current (e.g., a middle frequency two-way oscillation current with high duty ratio) of the lithium-ion battery is 2.3 Hz and 10 Hz at −10° C. and −20° C., respectively. Moreover, a line parallel to the horizontal axis and through the intersection of EIS at 0° C. and the vertical axis is plotted (line A-D in FIG. 6) to intersect with the EIS in the high frequency region, the frequency $f_g$ corresponding to the intersection is the upper limit of the frequency of the middle frequency two-way oscillation charging/discharging current of the lithium-ion battery with high duty ratio at said temperature. As shown in FIG. 6, the intersection D of the EIS and the parallel line A-D corresponds to $f_g$=7 kHz. Thus, the upper limit of the frequency range of the middle frequency two-way oscillation charging current (i.e., the second oscillation current) of the lithium-ion battery with high duty ratio is 7 kHz.

Therefore, during a charging process, the frequency range of the second oscillation current is determined to be $f_{cd}$-$f_g$. During the charging process, the middle frequency is between $f_{cd}$ and $f_g$. The high frequency is a frequency higher than $f_g$. Thus, the second oscillation current is the middle frequency two-way oscillation current, and the first oscillation current is the high frequency oscillation current.

Furthermore, the duration of the first oscillation current and the upper limit $f_g$ of the frequency range of the second oscillation current satisfy the relation: $T_2=n/f_g$, wherein, $T_2$ represents duration of the first oscillation current, and n is an integer equal to or greater than 0. In certain examples, n is defined the same as supra.

The control device 400 controls the variable frequency triggering oscillation charging device 200 to alternately supply the first oscillation current and the second oscillation current to the lithium-ion battery 300 based on the one or more charging parameters, which may comprise: adjusting the duration of the first oscillation current and increasing the amplitude of the charging current (e.g., the amplitude of the second oscillation current) based on a surface temperature of the lithium-ion battery; maintaining the duration of the first oscillation current and increasing the amplitude of the second oscillation current after the surface temperature of the lithium-ion battery is above 0° C.; and reducing the amplitude of the second oscillation current when the terminal voltage of the lithium-ion battery reaches an upper limit of the charging voltage, until the charging process ends.

In this example, adjusting the duration of the first oscillation current by the control device 400 according to the surface temperature of the lithium-ion battery includes: when the lowest surface temperature of the lithium-ion battery is equal to or above 0° C., n in the equation $T_2=n/f_g$ is 0; and when the lowest surface temperature of the lithium-ion battery is decreased by 10° C., n in the equation $T_2=n/f_g$ is increased by 1. Thus, when the lowest surface temperature of the lithium-ion battery is 0° C. to −10° C., n=1; when the lowest surface temperature of the lithium-ion battery is −10° C. to −20° C., n=2; and when the lowest surface temperature of the lithium-ion battery is between −20° C. to −30° C., n=3. Of course, those skilled in the art should understand that the present invention is not limited to the specific embodiment disclosed herein. In another embodiment, when the lowest surface temperature of the lithium-ion battery is decreased by 5° C., 8° C., 9° C., or 11° C., n in the equation $T_2=n/f_g$ is increased by 1.

In this example, the maximum amplitude of the charging current is limited by the upper limit of the charging voltage of the battery. When the surface temperature of the battery is equal to or above 0° C., the upper limit of the charging voltage is the upper limit $U^0_{MAX}$ of the charging voltage of the lithium-ion battery under ambient temperature. When the surface temperature of the battery is below 0° C., the upper limit of the charging voltage should be reduced, and is $U_{MAX}^d = U_{MAX}^0 + 0.01 \cdot T$(V/° C.), wherein T ranges from 0° C. to −30° C. to avoid lithium precipitation during the charging process under low temperature. During the charging, $I_d$ is adjusted by a battery management system (BMS) or triggering controller to keep the terminal voltage of the battery $\leq U_{MAX}^d$.

In addition, a pulse width $T_0$ of the oscillation triggering signal of the oscillation trigger K and the upper limit $f_g$ of the frequency range of the second oscillation current satisfy the relation $T_0=k/f_g$, $0<k\leq 1$. The duration $T_2$ of the first oscillation current and the pulse width $T_0$ of the oscillation triggering signal satisfy the relation $T_2=nT_0/k$, wherein n is an integer equal to or greater than 0. In certain examples, n is defined the same as supra. In certain embodiments, n is defined the same as supra. Therefore, in another embodiment, adjusting the duration of the first oscillation current by the control device according to the surface temperature of the lithium-ion battery may comprise adjusting the oscillation triggering signal to adjust the duration of the first oscillation current.

In an embodiment as described herein, the control device 400 can be a battery management system (BMS) or an independent triggering controller.

A person of ordinary skill in the art should understand that the foregoing describes a charging control based on the temperature and SOC of the lithium-ion battery for illustration only and not for limitation of the methods and devices disclosed herein. The charging control can be performed based on other parameters of the lithium-ion battery (e.g., voltage and/or internal resistance). The frequency range of the EIS, SOC and temperature are not limited to the specific values as mentioned in the examples and embodiments disclosed herein. The specific values are used for illustration only. A person of ordinary skill in the art could select specific values as needed. For example, in a set of EIS plots with SOC at 20%, within the frequency range from 0.02 Hz to 99 kHz, a line parallel to the horizontal axis and through a intersection of the EIS at 5° C. and the vertical axis can be used to determine the frequency range of the second oscillation current.

[Discharging System]

Example 5

Figure 7:
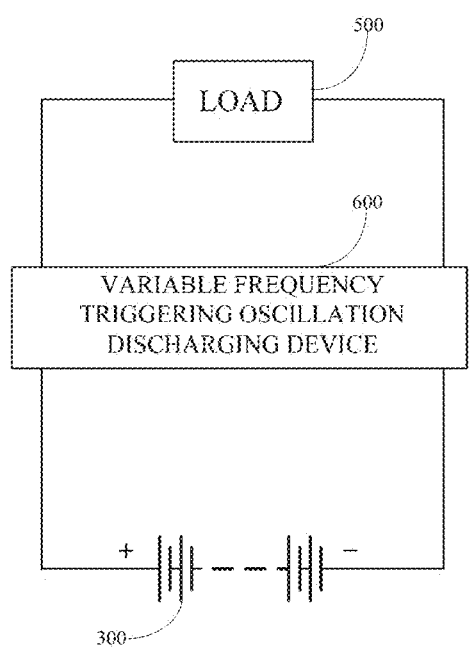
FIG. 7 is a block diagram of a discharging system for a lithium-ion battery according to Example 5.

FIG. 7 shows a discharging system of a lithium-ion battery according to Example 5 as described herein. The system comprises a variable frequency triggering oscillation discharging device 600 connected between a load 500 and the lithium-ion battery 300, wherein the variable frequency triggering oscillation discharging device 600 makes the lithium-ion battery 300 discharge in the form of an oscillation current generated by an oscillation loop formed based on an inherent impedance characteristic of the lithium-ion battery 300, and the oscillation current is supplied to the load 500. In one embodiment as described herein, the variable frequency triggering oscillation discharging device 600 makes the lithium-ion battery 300 discharge in a form of a first oscillation current and a second oscillation current, wherein the first oscillation current has a frequency higher than that of the second oscillation current. The first oscillation current may be a high frequency oscillation current. The second oscillation current may be a middle frequency two-way oscillation current. For example, the lithium-ion battery may be discharged via the middle frequency two-way oscillation current, uses the high frequency oscillation current for internal heating when the battery temperature is below 0° C., and uses the middle frequency two-way oscillation current for discharging when the battery temperature is increased to above 0° C. In another embodiment as described herein, when the battery temperature remains above 0° C., the lithium-ion battery uses the middle frequency two-way oscillation current for discharging.

Example 6

Figure 8:
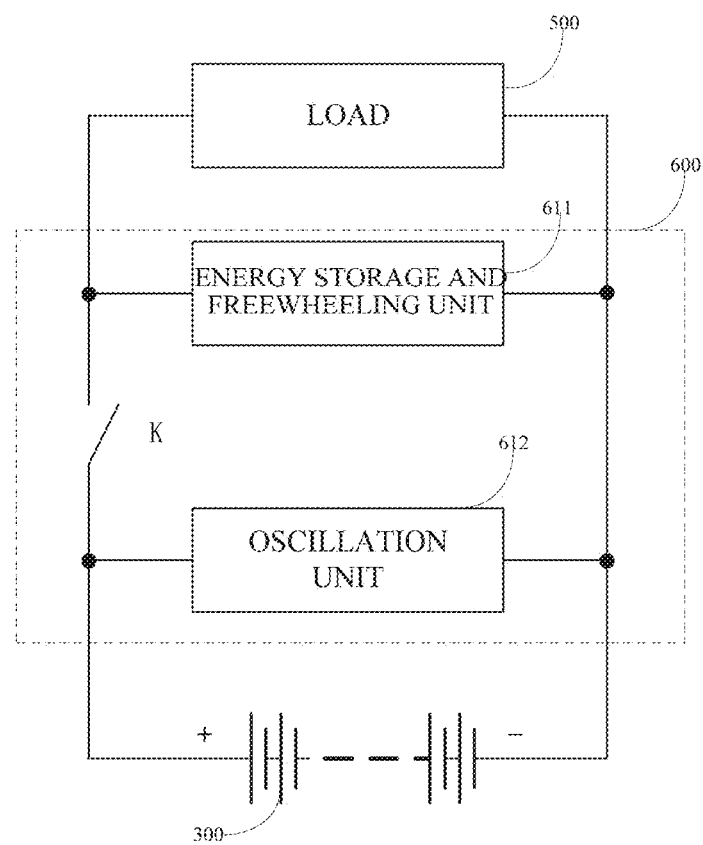
FIG. 8 is a block diagram of a discharging system for a lithium-ion battery according to Example 6.

FIG. 8 shows a discharging system of a lithium-ion battery according to Example 6. The system comprises a variable frequency triggering oscillation discharging device 600 connected between a load 500 and the lithium-ion battery 300. The variable frequency triggering oscillation discharging device 600 comprises: an energy storage and freewheeling unit 611 connected to the load 500 in parallel, an oscillation unit 612 connected to the lithium-ion battery 300 in parallel to form an oscillation loop, and an oscillation trigger K connected between the energy storage and freewheeling unit 611 and the oscillation unit 612, wherein the oscillation trigger K triggers the oscillation loop to generate a first oscillation current and a second oscillation current. For example, the lithium-ion battery 300 can be discharged alternately in the form of the first and the second oscillation currents which are supplied to the load 500. For example, the lithium-ion battery may be discharged in the form of a middle two-way oscillation current and may be discharged in the form of a high frequency oscillation current when the battery temperature is below 0° C. for internal heating, and the lithium-ion battery is discharged via the middle frequency two-way oscillation current when the battery temperature is increased to above 0° C. In another embodiment as described herein, when the battery temperature remains above 0° C., the lithium-ion battery uses the middle frequency two-way oscillation current for discharging.

Example 7

Figure 9:
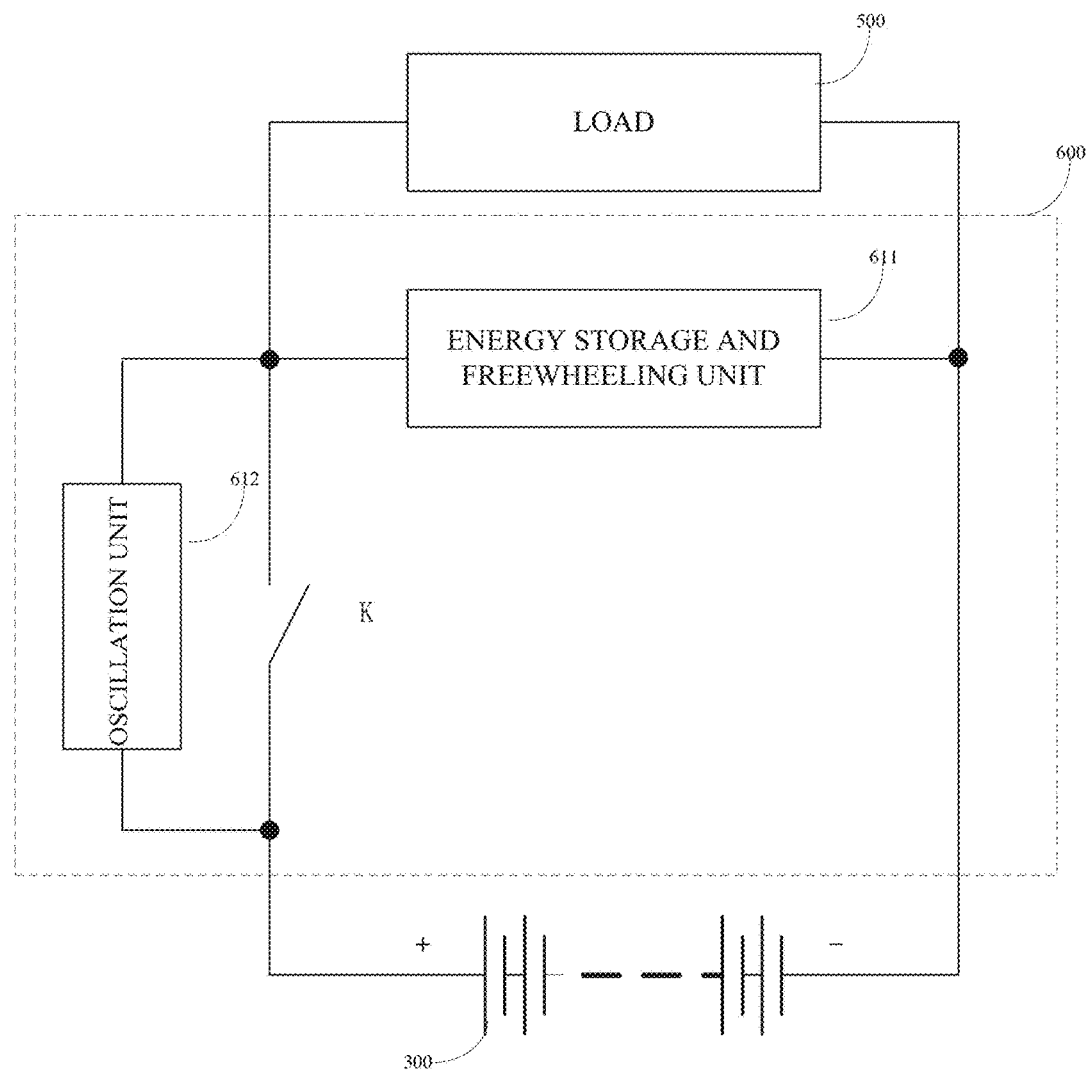
FIG. 9 is a block diagram of a discharging system for a lithium-ion battery according to Example 7.

FIG. 9 shows a discharging system of a lithium-ion battery according to Example 7. The system includes a variable frequency triggering oscillation discharging device 600 connected between a load 500 and the lithium-ion battery 300. The variable frequency triggering oscillation discharging device 600 comprises an energy storage and freewheeling unit 611 connected to the load 500 in parallel, an oscillation unit 612 connected to the energy storage and freewheeling unit 611 in series, and an oscillation trigger K connected to the oscillation unit 612 in parallel. The energy storage and freewheeling unit 611 and the oscillation unit 612 connected to each other in series are connected to the lithium-ion battery 300 in series to form an oscillation loop. The oscillation trigger K triggers the oscillation loop to generate a first oscillation current and a second oscillation current. The lithium-ion battery is discharged in the form of the first and the second oscillation currents which is supplied to the load 500. For example, the lithium-ion battery may be discharged via the middle frequency two-way oscillation current, uses the high frequency oscillation current for internal heating when the battery temperature is below 0° C., and uses the middle frequency two-way oscillation current for discharging when the battery temperature is increased to above 0° C. In another embodiment as described herein, when the battery temperature remains above 0° C., the lithium-ion battery uses the middle frequency two-way oscillation current for discharging.

In the embodiment discloses above in this example, the oscillation unit 612 comprises one or more elements (e.g., capacitors, inductors, resistors and the like) connected in parallel-series. The energy storage and freewheeling unit 611 comprises one or more of passive or active energy storage elements (e.g., capacitors, inductors and the like) connected in parallel-series. During an oscillation of the oscillation loop, the energy storage and freewheeling unit 611 provides energy storage and freewheeling for the load 500 to maintain the load under the maximum discharging current to meet ripple coefficient of a direct-current ranging from 0.1% to 10%.

Figure 10A:
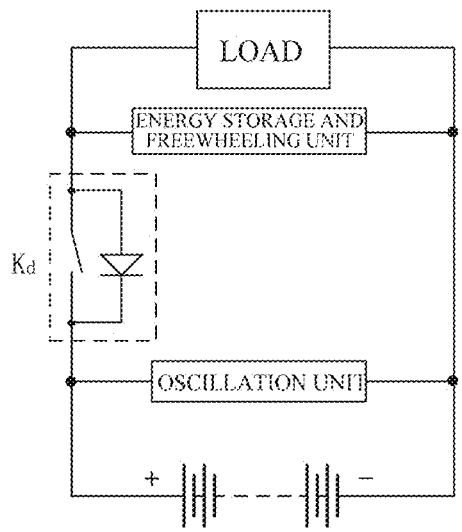
FIG. 10*a* shows a connection for an oscillation trigger in a discharging system for a lithium-ion battery according to an embodiment disclosed herein.
Figure 10B:
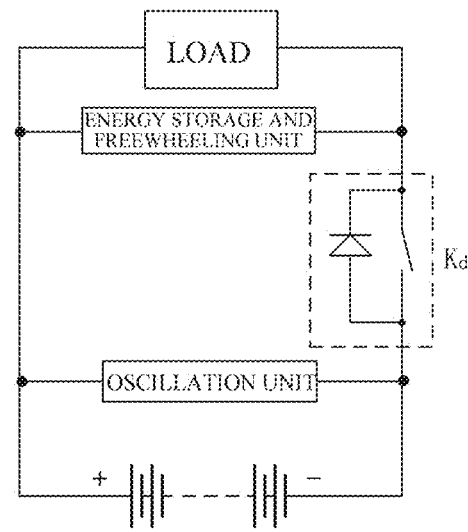
FIG. 10*b* shows various a connection for an oscillation trigger in a discharging system for a lithium-ion battery according to an embodiment disclosed herein.

In the examples of the discharging system disclosed herein, the oscillation trigger K can be an active switch device, e.g., MOSFET, IGBT, transistor or the like. In an embodiment as provided herein, the oscillation trigger K can be connected to a positive or negative output end of the oscillation loop in series. When the active switch is off, the oscillation loop is triggered for oscillation. As an active switch device such as MOSFET, IGBT and the like comprising an anti-paralleled diode, the oscillation trigger can have a structure as shown in FIGS. 10a and 10b in the discharging system for the lithium-ion battery when constructing the oscillation loop of the lithium-ion battery, wherein, $K_d$ represents the oscillation trigger for discharging.

A person of ordinary skill in the art should understand that the above Examples 5 to 7 are provided for illustration using the first and the second oscillation currents as examples, and not for limitation to the methods and devices disclosed herein. More than two oscillation currents can be used for discharging. For example, oscillation currents with three, four or five frequencies can be used for discharging.

Example 8

Figure 11:
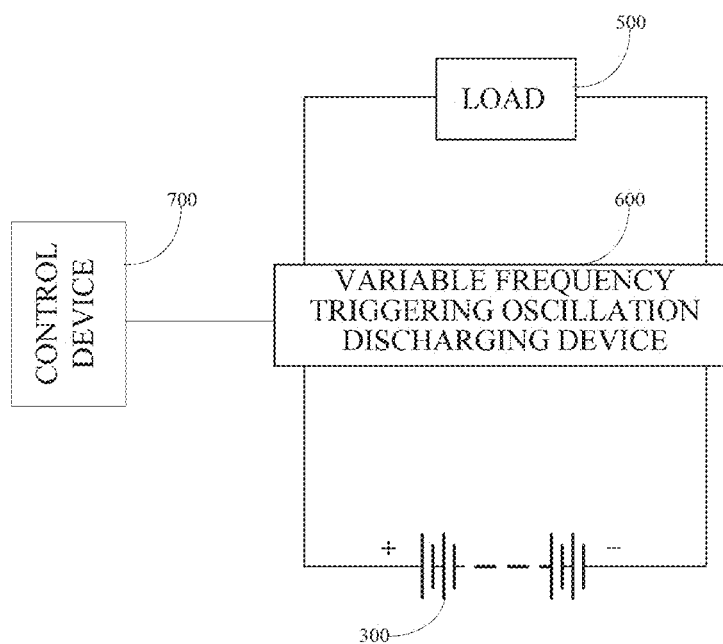
FIG. 11 is a block diagram of a discharging system for a lithium-ion battery according to Example 8.

As shown in FIG. 11, a system disclosed in Example 8 is different from Examples 5 to 7 in that the system disclosed in this example further comprises a control device 700 that controls a variable frequency triggering oscillation discharging device 600 according to a temperature and SOC of a lithium-ion battery to perform a discharging of a lithium-ion battery in the form of a first oscillation current and a second oscillation current. That is to say, the oscillation current is supplied to the load 500 according to the one or more status parameters of the lithium-ion battery. For example, the control device 700 determines the one or more discharging parameters based on the temperature and SOC of the lithium-ion battery, based on which the lithium-ion battery is discharged alternately in the form of the first and the second oscillation currents. Determining the one or more discharging parameters according to the temperature and SOC of the lithium-ion battery comprises: determining the one or more discharging parameters corresponding to the temperature and SOC of the lithium-ion battery from a set of pre-stored discharging parameters under various temperatures and SOCs. Examples of the one or more discharging parameters include, without limitation, frequency range of the second oscillation current and duration of the first oscillation current. Furthermore, the first oscillation current has a frequency higher than the upper limit of the frequency range of the second oscillation current.

Optionally, the frequency range of the second oscillation current is determined according to the temperature and SOC of the lithium-ion battery. For example, determining the frequency range of the second oscillation current according to the temperature and SOC of the lithium-ion battery may comprise:

obtaining EIS of the lithium-ion battery with a frequency range from 0.01 Hz to 100 kHz at various temperatures and SOCs using an electrochemical workstation;

plotting a line (e.g., line A-B in FIG. 12) parallel to the horizontal axis and through an intersection of EIS at −20° C. and the vertical axis in the EIS plots with SOC=90%, wherein, a frequency $f_{dd}$ corresponding to an intersection of the EIS plot at a temperature less than −20° C. and the parallel line in the low frequency region is a lower limit of the frequency for triggering the oscillation for discharging of the lithium-ion battery under the temperature. For example, in FIG. 12, intersection B of the EIS plot at −30° C. and line A-B corresponds to $f_{dd}$=0.6 Hz, indicating that the frequency for triggering the oscillation discharging of the lithium-ion battery at −30° C. should be greater than 0.6 Hz; in a set of the EIS plots with SOC=10%, intersections of the EIS plots at various temperatures and a line (e.g., line A-D in FIG. 6) parallel to the horizontal axis and through an intersection of the EIS at 0° C. and the vertical axis in the high frequency region are upper limits $f_g$ of the frequency ranges of the second oscillation current at the various temperatures, respectively. As shown in FIG. 6, intersection D of the EIS plot and line A-D corresponds to $f_g$=7 kHz, i.e., the upper limit of the frequency range of the middle frequency two-way oscillation charging/discharging current with high duty ratio is 7 kHz.

Thus, the frequency range of the second oscillation current may comprise or be the range from $f_{dd}$ to $f_g$. During a discharging, the middle frequency used herein is between $f_{dd}$ and $f_g$. The high frequency used herein is greater than $f_g$. Thus, the second oscillation current is the middle frequency two-way oscillation current and the first oscillation current is the high frequency oscillation current.

Moreover, the duration of the first oscillation current and the upper limit of the frequency range of the second oscillation current satisfy the relation $T_2=n/f_g$, wherein $T_2$ represents the duration of the first oscillation current, and n is an integer equal to or greater than 0. In certain examples, n is defined the same as supra. The control device controls the variable frequency triggering oscillation discharging device to make the lithium-ion battery discharge in the form of the first and the second oscillation currents based on the one or more discharging parameters. In certain embodiments, such controlling process may comprise: adjusting the duration of the first oscillation current according to a surface temperature of the lithium-ion battery, wherein when the lowest surface temperature of the lithium-ion battery is equal to or above 0° C., n in $T_2=n/f_g$ is 0; and when the lowest surface temperature of the lithium-ion battery is decreased by 10° C., n in $T_2=n/f_g$ is increased by 1.

Alternatively, the pulse width of the oscillation triggering signal of the oscillation trigger K and the upper limit $f_g$ of the frequency range of the second oscillation current satisfy the relation $T_0=k/f_g$, $0<k\le1$, wherein $T_0$ represents the pulse width of the oscillation triggering signal. The duration $T_2$ of the first oscillation current and the pulse width $T_0$ of the oscillation triggering signal satisfy the relation $T_2=nT_0/k$, wherein n is an integer equal to or greater than 0. In certain examples, n is defined the same as supra. Therefore, the control device 700 can adjust the duration of the first oscillation current by controlling the oscillation trigger K, e.g., by adjusting the oscillation triggering signal.

In an embodiment as described herein, the control device 700 can be a battery management system (BMS) or an independent triggering controller.

A person of ordinary skill in the art should understand that the foregoing describes discharging controlling based on the temperature and SOC of the lithium-ion battery for illustration only and not for limitation to the methods and devices disclosed herein. Discharging controlling can be performed based on other parameters of the lithium-ion battery (e.g., voltage and internal resistance). Furthermore, the frequency range, SOC, and temperature of the EIS are used for illustration only and should not be limited to the specific values as mentioned in the above examples. A person of ordinary skill in the art could set specific values as needed in a practical situation. For example, in a set of the EIS plots with SOC at 20%, within a frequency range from 0.02 Hz to 99 kHz, a line parallel to the horizontal axis and through an intersection of the EIS plot at 5° C. and the vertical axis can be used to determine the upper limit of the frequency range of the second oscillation current, and in a set of the EIS plots with SOC at 95%, a line parallel to the horizontal axis and through the intersection of the EIS plot at −25° C. and the vertical axis can be used to determine the lower limit of the frequency range of the second oscillation current.

[Charge-Discharge System]

Example 9

Figure 13:
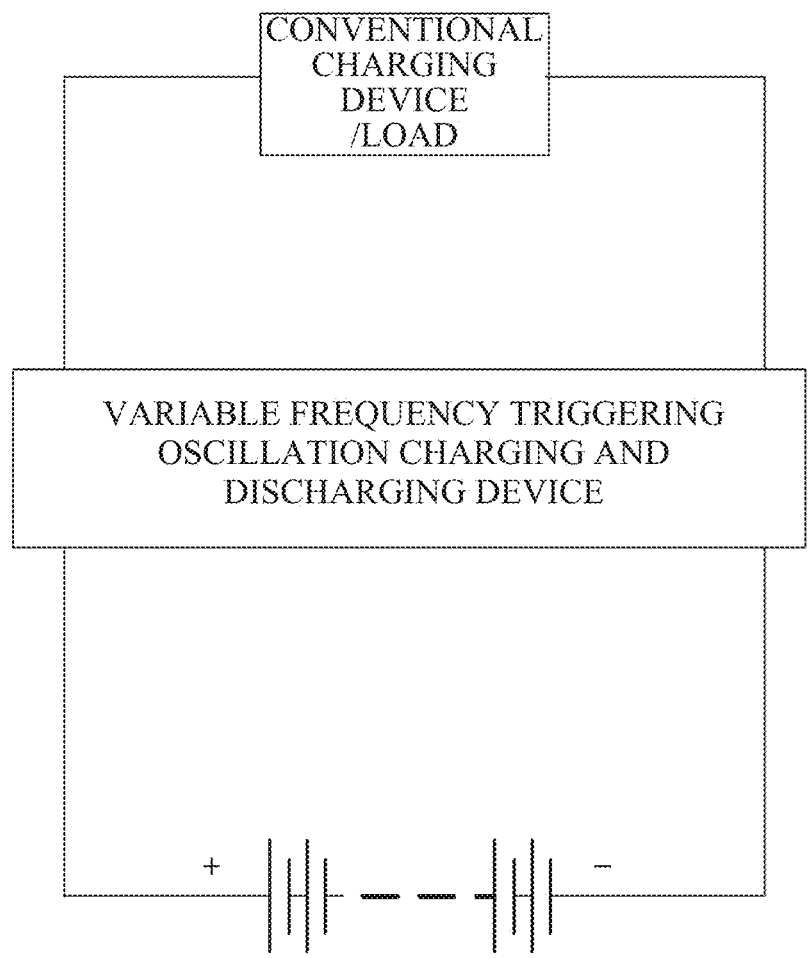
FIG. 13 is a block diagram of a charge-discharge system for a lithium-ion battery according to Example 9.

The systems shown in FIGS. 2 and 3 are the same as those shown in FIGS. 8 and 9, respectively, except that the conventional charging devices 100 in FIGS. 2 and 3 (e.g., as described in Examples 2 and 3) are replaced by the loads 500 in FIGS. 8 and 9 (e.g., as described in Examples 6 and 7), respectively. Therefore, the charging system and discharging system for the lithium-ion battery disclosed herein can be implemented by the same system. For example, FIG. 13 shows a charge-discharge system for a lithium-ion battery according to Example 9. The charge-discharge system for the lithium-ion battery comprises a variable frequency triggering oscillation charge-discharge device connected between a conventional charging device/load and the lithium-ion battery (e.g., a battery cell and a battery pack). The variable frequency triggering oscillation charge-discharge device forms an oscillation loop based on an inherent impedance characteristic of the lithium-ion battery. When charging the lithium-ion battery, the variable frequency triggering oscillation charge-discharge device supplies the first and the second oscillation currents to the lithium-ion battery. When discharging the lithium-ion battery, the variable frequency triggering oscillation charge-discharge device makes the lithium-ion battery discharge in the first and the second oscillation currents. In addition, the charge-discharge system can further comprise the control devices 400 and 700 as mentioned above, and the control devices 400 and 700 can be integrated into one control device. The variable frequency triggering oscillation charge-discharge device may have the same structure as the variable frequency triggering oscillation charging device 200 described in Examples 2 and 3 or the variable frequency triggering oscillation discharging device 600 described in Examples 6 and 7.

In the variable frequency triggering oscillation charge-discharge device, the oscillation trigger may have a structure shown in FIGS. 14a, 14b and 14c, wherein $K_c$ represents an oscillation trigger for charging and $K_d$ represents an oscillation trigger for discharging.

As shown in the above examples, the variable frequency triggering oscillation charge-discharge device for the lithium-ion battery disclosed herein can only charge the lithium-ion battery or a battery pack, only discharge the lithium-ion battery or battery pack, or both charge and discharge the lithium-ion battery or battery pack. Optionally, the low frequency described herein is lower than $MIN(f_{cd}, f_{dd})$, the middle frequency described herein is between $MIN(f_{cd}, f_{dd})$ and $f_g$, and the high frequency described herein is higher than $f_g$. Principles of various examples and embodiments disclosed herein are further depicted below with reference to the drawings.

Figure 16A:
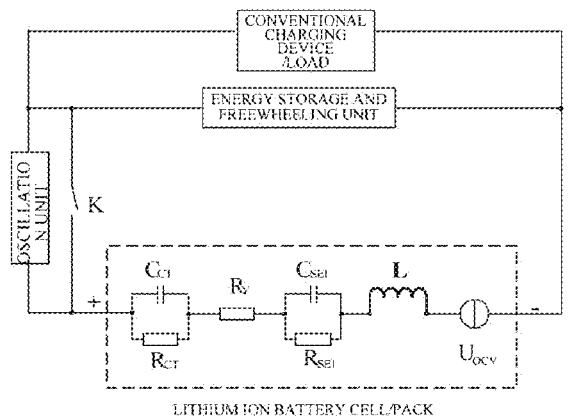
FIG. 16*a* is a schematic diagram of a variable frequency triggering oscillation charge-discharge loop including an inherent impedance characteristic of a lithium-ion battery according to an embodiment disclosed herein.
Figure 16B:
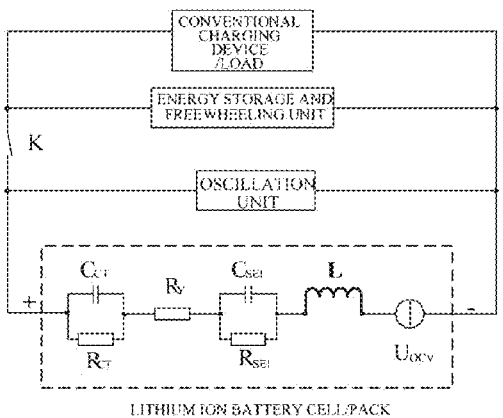
FIG. 16*b* is a schematic diagram of a variable frequency triggering oscillation charge-discharge loop including an inherent impedance characteristic of a lithium-ion battery according to an embodiment disclosed herein.

In an embodiment provided herein, the variable frequency triggering oscillation charge-discharge loop for the lithium-ion battery cell or battery pack shown in FIGS. 16a and 16b is constructed based on an inherent impedance characteristic of the lithium-ion battery shown in FIG. 15. The energy storage and freewheeling unit in FIGS. 16a and 16b can comprise energy storage elements (e.g., capacitors, inductors and the like) that are connected in series-parallel, which provides an energy storage and freewheeling in the whole variable frequency triggering oscillation charge-discharge loop to maintain an output current of the charging device or the load current as a direct current meeting the requirement for ripple. The oscillation unit in FIG. 16b is connected to the positive and negative ends of the lithium-ion battery cell/pack in parallel to form an oscillation loop directly. As shown in FIG. 16a, the oscillation unit may also be connected to the oscillation trigger in parallel and then forms the oscillation loop with the lithium-ion battery cell/pack. The oscillation unit comprises elements (e.g., capacitors, induc-tors, resistors and the like) connected in series-parallel. The trigger K in FIGS. 16a and 16b is an oscillation trigger that is controlled by a BMS or a triggering controller to trigger the oscillation loop for oscillation. And based on a change of the EIS of the lithium-ion battery with a change of a SOC, temperature, frequency and so on, the frequency for triggering oscillation is altered, and the frequency of the middle frequency two-way oscillation current (the second oscillation current) and the duration of the high frequency oscillation current (the first oscillation current) are adjusted to make the charging/discharging current of the lithium-ion battery an alternation of the middle frequency two-way oscillation current and high frequency oscillation current with high duty ratio.

Figure 17:
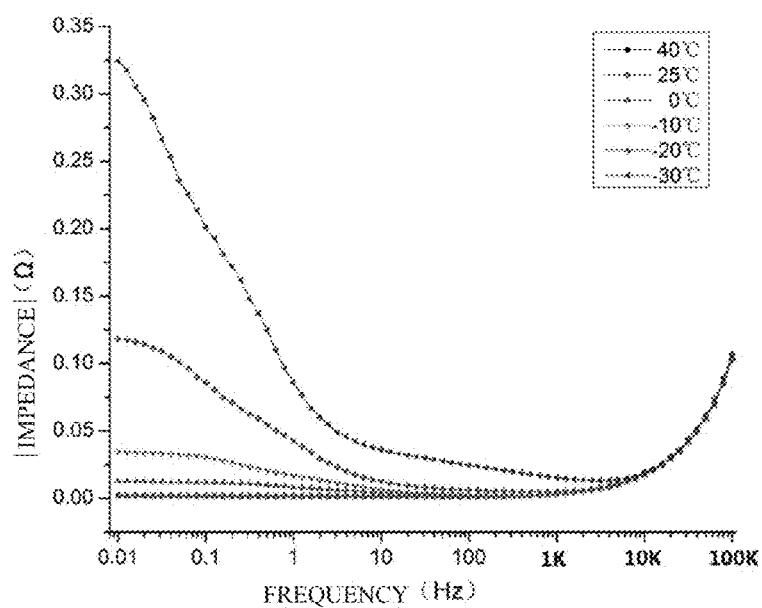
FIG. 17 is a schematic diagram of EIS of a lithium-ion battery under various temperatures according to an embodiment disclosed herein.

As shown in FIG. 17, the impedance spectroscopy of the lithium-ion battery shows an inductive reactance characteristic in the high frequency region that is hardly influenced by the temperature, relatively lower impedance in the middle frequency region, and an impedance in the low frequency region is significantly influenced by the temperature. Based on the electrochemical impedance model of the lithium-ion battery as shown in FIG. 15 and the equivalent impedance calculation Equation (1) of the lithium-ion battery:

$$Z_Q(T, f, I) = \left[R_Y(T) + \frac{R_{SEI}(T)}{1+(2\pi f)^2 R_{SEI}^2(T)C_{SEI}^2} + \frac{R_{CT}(T, I)}{1+(2\pi f)^2 R_{CT}^2(T, I)C_{CT}^2}\right] + \\ j\left[2\pi fL - \frac{2\pi f R_{SEI}(T)C_{SEI}}{1+(2\pi f)^2 R_{SEI}^2(T)C_{SEI}^2} - \frac{2\pi f R_{CT}(T, I)C_{CT}}{1+(2\pi f)^2 R_{CT}^2(T, I)C_{CT}^2}\right], \tag{1}$$

it appears that f=0 during a direct-current charge-discharge, and Equation (1) becomes $$Z_Q(T,f,I)=R_Y(T)+R_{SEI}(T)+R_{CT}(T,I) \tag{2}$$

Accordingly, the impedance of the lithium-ion battery exhibits resistivity in a direct-current charge-discharge. The charging/discharging current is likely to result in formation of lithium dendritic crystals via a solution resistance $R_Y(T)$, an SEI film resistance $R_{SEI}(T)$ and a charge transfer resistance $R_{CT}(T,I)$. The lithium dendritic crystals may grow to penetrate a separator in the battery to cause a short circuit in the battery. Moreover, the lithium dendritic crystals may lose its electrical contact with the base and become "dead lithium" having no electrochemical activity. In addition, the formation of the lithium dendritic crystals may also involve chemical reactions with an electrolyte, which will consume the electrolyte and reduce the content of a corresponding active substance. Therefore, the direct-current charge-discharge of the lithium-ion battery may reduce the battery's charge-discharge circulation performance with potential safety hazards. Especially at a low temperature, the resistance values of the solution resistance $R_Y(T)$, the SEI film resistance $R_{SEI}(T)$ and especially the charge transfer resistance $R_{CT}(T,I)$ may dramatically increase, while the charge mobility may reduce significantly to render the direct-current charge-discharge more difficult and further expedite attenuation of the circulation performance of the battery.

In a high-frequency charge-discharge, an approximation of Equation (1) when f is relative large is:

$$Z_Q(T,f,I)=R_Y(T)+j2\pi fL \tag{3}$$

Equation 3 indicates that the impedance of the lithium-ion battery in high frequencies depends on the solution resistance $R_Y(T)$ and the inductive reactance $2\pi fL$. When the frequency is sufficiently high, the impedance of the lithium-ion battery exhibits an inductive reactance characteristic that does not depend on the temperature, i.e.:

$$|Z_Q(T,f,I)| \approx 2\pi f L \qquad (4)$$

Therefore, the high frequency alternating current is shorted by an electrode double-layer capacitor, a charge transfer resistance and an SEI film resistance, i.e., it has very low Faradic current.

Figure 18:
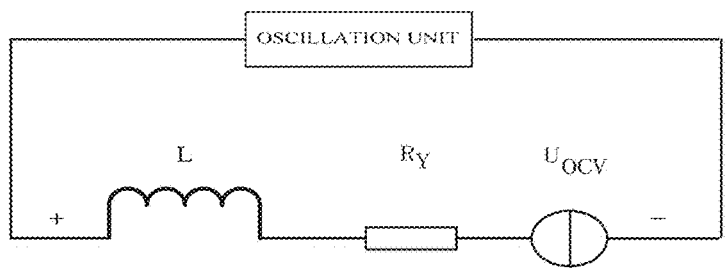
FIG. 18 shows the oscillation loop for charging and discharging the lithium-ion battery according to an embodiment disclosed herein.

Accordingly, when the oscillation trigger K in the oscillation loop of the lithium-ion battery as shown in FIGS. 16*a* and 16*b* is off, the oscillation loop starts oscillating and form the oscillation loop as shown in FIG. 18, wherein $U_{OCV}$ is the open-loop voltage of the lithium-ion battery.

Figure 19:
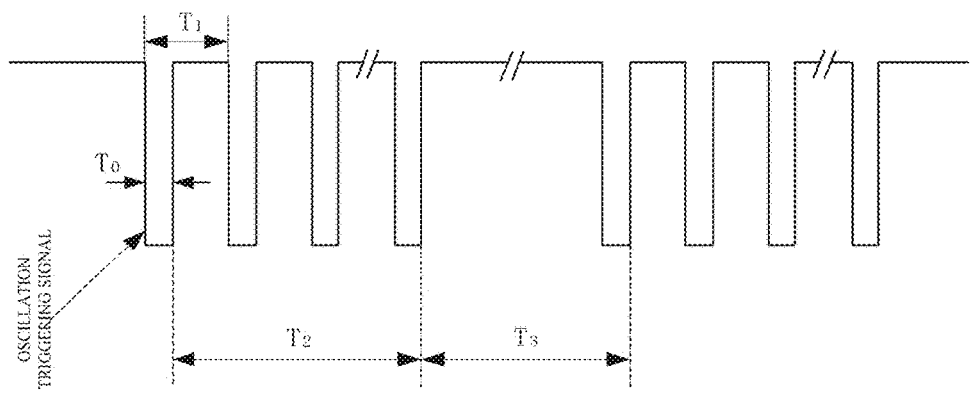
FIG. 19 is a schematic diagram of time series for a controlling triggering oscillation according to an embodiment disclosed herein.
Figure 20:
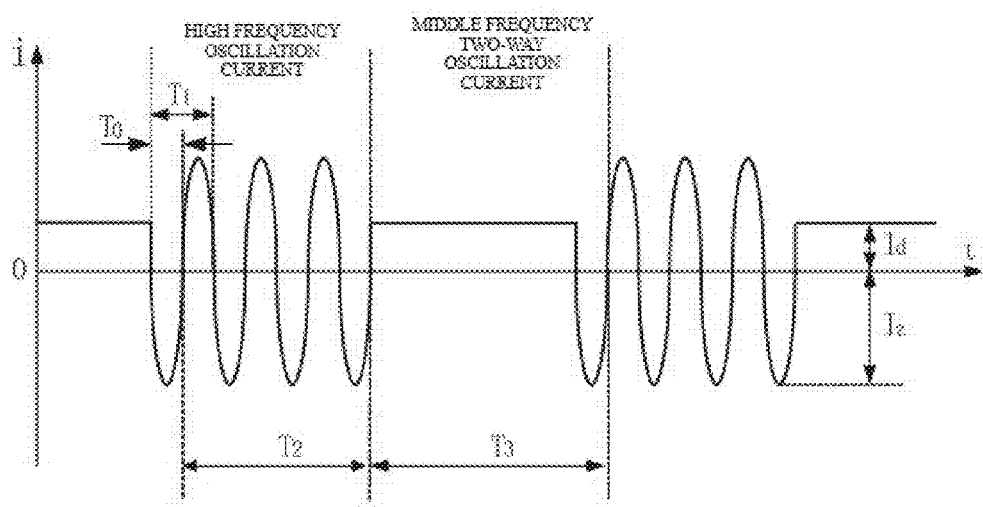
FIG. 20 is a schematic diagram of wave forms of a middle frequency two-way oscillation current and a high frequency oscillation current according to an embodiment disclosed herein.

The variable frequency triggering sequence as shown in FIG. 19 is designed to alternately generate the middle frequency two-way oscillation current (the second oscillation current) and the high frequency oscillation current (the first oscillation current). $T_0$ is a pulse width for triggering an oscillation, $f_1=1/T_1$ is a frequency of the high frequency oscillation, $T_2$ is a duration of the high frequency oscillation, $f_3=1/T_3$ is a charge-discharge frequency of the middle frequency two-way oscillation, which determines a charging rate and a discharging ratio requirement. According to the time series shown in FIG. 19, a schematic diagram of the middle frequency two-way oscillation current and the high frequency oscillation current in FIG. 20 can be obtained. In FIG. 20, $I_d$ is an amplitude of the middle frequency charge-discharge oscillation current, wherein the charging current is positive, the discharging current is negative, and $I_z$ is the amplitude of the high frequency oscillation current.

The charging/discharging current of the lithium-ion battery comprises the middle frequency two-way oscillation current which may eliminate the polarization, dissolve the precipitation of enriched lithium, stop the continuous growth of the lithium dendritic crystals, and achieve a uniform and dense lithium ion precipitation that inhibits the formation of the lithium dendritic crystals.

Because the charging/discharging current of the lithium-ion battery may comprise the high frequency oscillation current, temperature increase of the lithium-ion battery may be controlled by adjusting the duration of the high frequency oscillation current. According to the thermal equilibrium equation within the battery, during a high frequency oscillation:

$$(T-T^0) = (-Q_n + Q_g) \cdot T_2/mC_p \quad Q_n = hS_{cell}(T-T^0)$$
$$Q_g = I_z^2 R_Y(T)/2 \qquad (5)$$

In Equation (5), m is the mass of the battery, $C_p$ is the specific heat capacity of the battery, T is a temperature of the battery, $Q_n$ is the amount of a heat radiation from the battery to the outside space, $Q_g$ is a heat yield of the battery, h is an equivalent heat transfer coefficient, $S_{cell}$ is a surface area of the battery, and $T^0$ is an ambient temperature.

According to Equation (5), increasing the duration $T_2$ of the high frequency oscillation current at a low temperature can provide internal heating with low energy consumption to the lithium-ion battery; and when the battery temperature is relatively high, reducing the duration $T_2$ of the high frequency oscillation current can decrease the temperature increase of the battery.

Based on the temperature-dependent change of the EIS of the lithium-ion battery, the lower limit of the middle frequency two-way oscillation frequency for a charge-discharge of the lithium-ion battery without damage is determined to avoid the relatively high electrochemical impedance of the lithium-ion battery in the low frequency region, the low efficiency of charge-discharge, and the resultant attenuation of the battery capacity at a low temperature.

Based on the temperature-dependent change of the EIS of the lithium-ion battery, the lower limit of the frequency of the high frequency oscillation of the lithium-ion battery is determined to provide uniform internal heating to the battery by oscillating with high alternating current amplitude.

Based on the various systems and devices disclosed herein, a charging method, a discharging method, a charging regulation method, and a discharging regulation method and relevant control devices for the lithium-ion battery are provided herein, which are described below in further detail.

[Charging Method]

A method for charging a lithium-ion battery disclosed herein may comprise: generating an oscillation current through an oscillation loop formed based on an inherent impedance characteristic of the lithium-ion battery; and charging the lithium-ion battery using the oscillation current according to one or more status parameters of the lithium-ion battery. In certain embodiments, a first and a second oscillation currents are used to charge the lithium-ion battery based on a temperature and a SOC of the lithium-ion battery. The first oscillation current has a frequency higher than that of the second oscillation current. For example, the first oscillation current is a high frequency oscillation current described herein, and the second oscillation current is a middle frequency two-way oscillation current described herein. For example, the lithium-ion battery may be charged by providing the middle frequency two-way oscillation current initially, then further introducing the high frequency oscillation current to the lithium-ion battery for internal heating when the battery temperature is below 0° C., and providing the middle frequency two-way oscillation current for charging when the battery temperature is increased to above 0° C. In another embodiment as described herein, when the battery temperature remains above 0° C., the lithium-ion battery is charged by a supply of the middle frequency two-way oscillation current. When the temperature of the battery is below 0° C., the lithium-ion battery may be provided with the high frequency oscillation current initially for internal heating, then provided with the middle frequency two-way oscillation current to the lithium-ion battery for charging, such that the high frequency oscillation current and the middle frequency two-way oscillation current are provided alternatively; and the middle frequency two-way oscillation current is provided for charging when the battery temperature is increased to above 0° C.

In certain embodiments, using the first and the second oscillation currents to charge the lithium-ion battery based on the temperature and SOC of the lithium-ion battery comprises: determining one or more charging parameters according to the temperature and SOC of the lithium-ion battery and alternately using the first and the second oscillation currents to charge the lithium-ion battery based on the one or more charging parameters. Examples of the one or more charging parameters include, without limitation, frequency range of the second oscillation current, duration of the first oscillation current, and amplitude of the charging current. The first oscillation current has a frequency higher than the upper limit of the frequency range of the second oscillation current.

Optionally, determining the one or more charging parameters according to the temperature and SOC of the lithium-ion battery may comprise: determining the one or more charging parameters corresponding to the temperature and SOC of the lithium-ion battery from a set of pre-stored charging parameters under various temperatures and SOCs.

In an embodiment as provided herein, the frequency range of the second oscillation current is determined according to the temperature and SOC of the lithium-ion battery. For example, as shown in FIG. 6, based on the EIS of the lithium-ion battery with a frequency range from 0.01 Hz to 100 kHz at various temperatures and SOCs, in the EIS plots at SOC=10%, the frequency corresponding to an intersection of an EIS plot at a temperature and a line (line A-D) parallel to the horizontal axis and through the intersection of the EIS plot at 0° C. and the vertical axis in the low frequency region is the lower limit $f_{cd}$ of the frequency range of the second oscillation current at the temperature. The frequency corresponding to the intersection of said line and the EIS plots in the high frequency region is the upper limit $f_g$ of the frequency range of the second oscillation current. Therefore, the frequency range of the second oscillation current at the temperature may comprise or be the range from $f_{cd}$ to $f_g$.

In an embodiment as provided herein, the duration $T_2$ of the first oscillation current and the upper limit $f_g$ of the frequency range of the second oscillation current satisfy the relation: $T_2=n/f_g$, wherein n is an integer equal to or greater than 0;

wherein, using the first and the second oscillation currents to charge the lithium-ion battery based on the one or more charging parameters comprises: adjusting the duration of the first oscillation current according to the surface temperature of the lithium-ion battery and increasing the amplitude of the charging current (e.g., the amplitude of the second oscillation current); when the surface temperature of the lithium-ion battery is above 0° C., maintaining the duration of the first oscillation current and increasing the amplitude of the charging current; when the terminal voltage of the lithium-ion battery reaches an upper limit of the charging voltage, decreasing the amplitude of charging current until the charging process ends.

For example, adjusting the duration of the first oscillation current according to the surface temperature of the lithium-ion battery comprises: when the lowest surface temperature of the lithium-ion battery is equal to or above 0° C., n=0 in $T_2=n/f_g$; and when the lowest surface temperature of the lithium-ion battery is decreased by 10° C. (or any other value, e.g., 4° C.), n in $T_2=n/f_g$ is increased by 1.

In another embodiment as provided herein, a pulse width $T_0$ of the oscillation triggering signal for triggering the oscillation loop to generate the first and the second oscillation currents and the upper limit $f_g$ of the frequency range of the second oscillation current satisfy the relation: $T_0=k/f_g$, wherein k is a real number greater than 0 and equal to or less than 1. Therefore, the duration $T_2$ of the first oscillation current and the pulse width $T_0$ of the oscillation triggering signal satisfy the relation: $T_2=nT_0/k$, wherein n is an integer equal to or greater than 0. In certain examples, n is defined the same as supra.

Accordingly, adjusting the duration of the first oscillation current according to the surface temperature of the lithium-ion battery comprises: adjusting the duration of the first oscillation current by adjusting the oscillation triggering signal. For example, the duration of the first oscillation current may be adjusted by adjusting the number of the oscillation triggering signals.

A person of ordinary skill in the art should understand that the first and the second oscillation currents are used for illustration and not for limitation of any methods or devices disclosed herein. More than two oscillation currents, e.g., three, four and five oscillation currents with different frequencies can be used for charging.

A person of ordinary skill in the art should also understand that the charging controlling based on the temperature and SOC of the lithium-ion battery as described above is for illustration and not for limitation of any methods or devices disclosed herein. The charging controlling can also be performed based on one or more of other status parameters of the lithium-ion battery, e.g., voltage, internal resistance, dimension size, weight, type, appearance, structure, materials and the like. The specific value of the frequency range, SOC and temperature of the EIS disclosed in in the examples are used only for illustration and not for limitation for any methods or devices disclosed herein. A person of ordinary skill in the art could set a specific value as needed. For example, in a set of EIS plots with SOC at 5%, within a frequency range from 10 Hz to 200 kHz, a line parallel to the horizontal axis and through the intersection of the EIS plot at 1° C. and the vertical axis can be used to determine the frequency range of the second oscillation current.

[Discharging Method]

The discharging method for the lithium-ion battery provided herein may comprise: generating an oscillation current from the lithium-ion battery utilizing an oscillation loop formed based on an inherent impedance characteristic of the lithium-ion battery; discharging the lithium-ion battery in the form of the oscillation current according to one or more status parameters of the lithium-ion battery. The oscillation current is supplied to the load based on the one or more status parameters of the lithium-ion battery. The lithium-ion battery is discharged in the form of the oscillation current by utilizing the oscillation loop formed based on the inherent impedance characteristic of the lithium-ion battery according to one or more status parameters of the lithium-ion battery. For example, the lithium-ion battery may be discharged by the middle frequency two-way oscillation current initially, then further by the high frequency oscillation current for internal heating when the battery temperature is below 0° C., and discharged by the middle frequency two-way oscillation current when the battery temperature is increased to above 0° C. In another embodiment as described herein, when the battery temperature remains above 0° C., the lithium-ion battery is discharged by the middle frequency two-way oscillation current. When the temperature of the battery is below 0° C., the lithium-ion battery is first heated internally by the high frequency oscillation current initially while discharging by the middle frequency two-way oscillation current, such that the high frequency oscillation current and the middle frequency two-way oscillation current alternate for discharging; and discharge by the middle frequency two-way oscillation current when the battery temperature is increased to above 0° C.

In an embodiment as provided herein, discharging the lithium-ion battery in the form of the first and the second oscillation currents based on the temperature and SOC of the lithium-ion battery comprises: determining one or more discharging parameters according to the temperature and SOC of the lithium-ion battery, and discharging the lithium-ion battery alternately in the form of the first and the second oscillation currents based on the one or more discharging parameters. Examples of the one or more discharging parameters include, without limitation, frequency range of the second oscillation current, and duration of the first oscillation current. Moreover, the first oscillation current has a frequency higher than the upper limit of the frequency range of the second oscillation current. Optionally, determining the one or more discharging parameters according to the temperature and SOC of the lithium-ion battery comprises: determining the one or more discharging parameters corresponding to the temperature and SOC of the lithium-ion battery from a set of pre-stored discharging parameters under various temperatures and SOCs.

Figure 12:
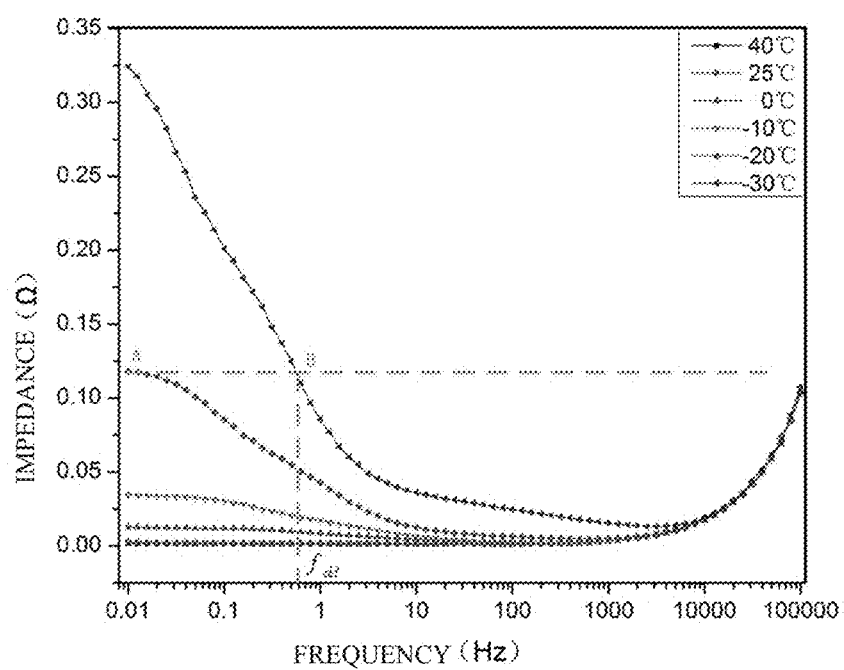
FIG. 12 shows EIS of a lithium-ion battery when SOC=90% according to an embodiment disclosed herein.

In an embodiment as provided herein, the frequency range of the second oscillation current is determined based on the temperature and SOC of the lithium-ion battery. For example, determining the frequency range of the second oscillation current according to the temperature and SOC of the lithium-ion battery comprises: as shown in FIG. 12, based on the EIS of the lithium-ion battery with a frequency range from 0.01 Hz to 100 kHz under various temperatures and SOCs, in a set of the EIS plots at SOC=90%, the frequency corresponding to the intersection of an EIS plot at a temperature and a line (line A-B) parallel to the horizontal axis and through the intersection of the EIS plot at −20° C. and the vertical axis in the low frequency region is the lower limit $f_{dd}$ of the frequency range of the second oscillation current at the temperature. As shown in FIG. 6, in a set of the EIS plots at SOC=10%, the frequency corresponding to the intersection of an EIS plot at a temperature and a line (line A-D) parallel to the horizontal axis and through the intersection of the EIS plot at 0° C. and the vertical axis in the high frequency region is the upper limit $f_g$ of the frequency range of the second oscillation current at the temperature. Therefore, the frequency range of the second oscillation current may comprise or be the range from $f_{dd}$ to $f_g$ at the temperature.

The duration $T_2$ of the first oscillation current and the upper limit $f_g$ of the frequency range of the second oscillation current satisfy the relation: $T_2=n/f_g$, wherein n is an integer equal to or greater than 0. In certain examples, n is defined the same as supra.

Moreover, discharging the lithium-ion battery in the form of the first and the second oscillation currents based on the one or more discharging parameters may comprise: adjusting the duration of the first oscillation current according to the surface temperature of the lithium-ion battery. For example, when the lowest surface temperature of the lithium-ion battery is equal to or above 0° C., n in $T_2=n/f_g$ is 0, and when the lowest surface temperature of the lithium-ion battery is decreased by 10° C., n in $T_2=n/f_g$ is increased by 1.

In another embodiment as provided herein, the pulse width $T_0$ of the oscillation triggering signal for triggering the oscillation loop to generate the first and the second oscillation currents and the upper limit $f_g$ of the frequency range of the second oscillation current satisfy the relation: $T_0=k/f_g$, wherein k is a real number greater than 0 and equal to or less than 1. Therefore, the duration $T_2$ of the first oscillation current and the pulse width $T_0$ of the oscillation triggering signal satisfy the relation: $T_2=nT_0/k$, wherein n is an integer equal to or greater than 0. In certain examples, n is defined the same as supra. Thus, adjusting the duration of the first oscillation current according to the surface temperature of the lithium-ion battery comprises: adjusting the duration of the first oscillation current by adjusting the oscillation triggering signal.

A person of ordinary skill in the art should understand that the first and the second oscillation currents are used for illustration and not for limitation of any methods or devices disclosed herein. More than two oscillation currents, e.g., three, four and five oscillation currents with different frequencies can be used for discharging.

A person of ordinary skill in the art should also under, dimension size, weight, type, appearance, structure, materials and the like stand that the discharging controlling based on the temperature and SOC of the lithium-ion battery as described above is for illustration and not for limitation of any methods or devices disclosed herein. The discharging controlling can also be performed based on one or more of other status parameters of the lithium-ion battery, e.g., voltage, and internal resistance. The specific value of the frequency range, SOC and temperature of the EIS disclosed in in the examples are used only for illustration and not for limitation for any methods or devices disclosed herein. A person of ordinary skill in the art could set a specific value as needed. For example, in a set of EIS plots with SOC at 5%, within a frequency range from 10 Hz to 200 kHz, a line parallel to the horizontal axis and through the intersection of the EIS plot at 1° C. and the vertical axis can be used to determine the upper limit of the frequency range of the second oscillation current; and in a set of EIS plots with SOC at 95%, a line parallel to the horizontal axis and through the intersection of the EIS plot at −30° C. and the vertical axis can be used to determine the lower limit of the frequency range of the second oscillation current.

[Charging Regulation Method]

In an embodiment of the method for regulating a charging process for the lithium-ion battery disclosed herein includes, but is not limited to: monitoring one or more status parameters of a lithium-ion battery; determining one or more charging regulation parameters of the lithium-ion battery according to the monitored one or more status parameters; generating an oscillation current through an oscillation loop formed based on an inherent impedance characteristic of the lithium-ion battery; and supplying the oscillation current to the lithium-ion battery according to the determined one or more charging regulation parameters.

Figure 21:
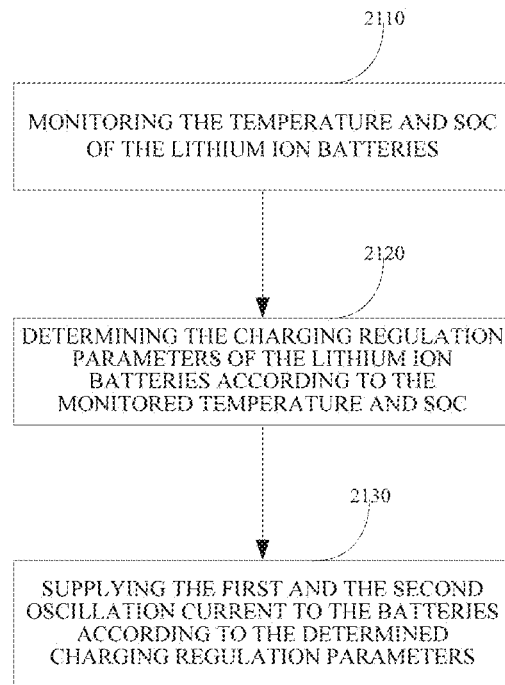
FIG. 21 is a flow chart of a method for regulating a charging of a lithium-ion battery according to an embodiment disclosed herein.

In one embodiment, as shown in FIG. 21, the method for regulating the charging process for the lithium-ion battery comprises: 2110—monitoring the temperature and SOC of the lithium-ion battery; 2120—determining the one or more charging regulation parameters of the lithium-ion battery according to the monitored temperature and SOC, wherein examples of the one or more charging regulation parameters include, without limitation, frequency range of the second oscillation current, duration of the first oscillation current, and amplitude of the charging current; 2130—supplying the first and the second oscillation currents generated by the oscillation loop formed based on the inherent impedance characteristic of the lithium-ion battery to the lithium-ion battery according to the determined one or more charging regulation parameters, wherein the first oscillation current has a frequency higher than the upper limit of the frequency range of the second oscillation current.

In certain embodiments, determining the one or more charging regulation parameters according to the monitored temperature and SOC comprises: determining the one or more charging regulation parameters corresponding to the monitored temperature and SOC from a set of the pre-stored charging regulation parameters under various temperatures and SOCs.

In an embodiment, the frequency range of the second oscillation current is determined based on the temperature and SOC of the lithium-ion battery. Optionally, determining the frequency range of the second oscillation current based on the temperature and SOC of the lithium-ion battery comprises: as shown in FIG. 6, according to EIS in a frequency range from 0.01 Hz to 100 kHz at various temperatures and SOCs, in the EIS plots at SOC=10%, a frequency corresponding to an intersection of an EIS plot at a temperature with a line (e.g., line A-D) parallel to the horizontal axis and through the intersection of the EIS plot at 0° C. and the vertical axis in a low frequency region is a lower limit $f_{cd}$ of a frequency range of the second oscillation current at the temperatures, and determining the frequency corresponding to an intersection of the line and the EIS plot at the temperature in a high frequency region is the upper limit $f_g$ of the frequency range of the second oscillation current. Therefore, the frequency range of the second oscillation current may comprise or be the range from $f_{cd}$ to $f_g$. Moreover, a duration $T_2$ of the first oscillation current and the upper limit $f_g$ of the frequency range of the second oscillation current satisfy the relation: $T_2=n/f_g$, wherein n is an integer equal to or greater than 0. In certain examples, n is defined the same as supra.

Furthermore, supplying the first and the second oscillation currents to the lithium-ion battery according to the one or more charging regulation parameters comprises: adjusting the duration of the first oscillation current according to the surface temperature of the lithium-ion battery and increasing the amplitude of the charging current (e.g., the amplitude of the second oscillation current); maintaining the duration of the first oscillation current and increasing the amplitude of the charging current after the surface temperature of the lithium-ion battery is above 0° C.; when the terminal voltage of the lithium-ion battery reaches an upper limit of the charging voltage, decreasing the amplitude of the charging current until the charging process ends. Optionally, adjusting the duration of the first oscillation current according to the surface temperature of the lithium-ion battery comprises: when the lowest surface temperature of the lithium-ion battery is equal to or above 0° C., n in $T_2=n/f_g$ is 0, and when the lowest surface temperature of the lithium-ion battery is decreased by 10° C., n in $T_2=n/f_g$ is increased by 1.

In another embodiment as provided herein, a pulse width $T_0$ of the oscillation triggering signal for triggering the oscillation loop to generate the first and the second oscillation currents and the upper limit $f_g$ of the frequency range of the second oscillation current satisfy the relation: $T_0=k/f_g$, wherein k is a real number less than or equal to 1 and a duration $T_2$ of the first oscillation current and the pulse width $T_0$ of the oscillation triggering signal satisfy the relation: $T_2=nT_0/k$, wherein n is an integer equal to or greater than 0. In certain examples, n is defined the same as supra. Therefore, adjusting the duration of the first oscillation current according to the surface temperature of the lithium-ion battery comprises: adjusting the oscillation triggering signal to adjust the duration of the first oscillation current.

A person of ordinary skill in the art should understand that the first and the second oscillation currents are used for illustration and not for limitation of any methods or devices disclosed herein. More than two oscillation currents, e.g., six, ten, twenty oscillation currents with different frequencies can be used for a charging regulation.

A person of ordinary skill in the art should also understand that the charging controlling based on the temperature and SOC of the lithium-ion battery as described above is for illustration and not for limitation of any methods or devices disclosed herein. The charging controlling can also be performed based on one or more other status parameters of the lithium-ion battery, e.g., voltage, internal resistance, dimension size, weight, type, appearance, structure, materials and the like. The specific value of the frequency range, SOC and temperature of the EIS disclosed in in the examples are used only for illustration and not for limitation for any methods or devices disclosed herein. A person of ordinary skill in the art could set a specific value as needed. For example, in a set of EIS plots with SOC at 30%, within a frequency range from 100 Hz to 1,000 kHz, a line parallel to the horizontal axis and through the intersection of the EIS plot at 10° C. and the vertical axis can be used to determine the frequency range of the second oscillation current.

[Discharging Regulation Method]

In an embodiment, the method for regulating the discharging process for the lithium-ion battery disclosed herein comprising: monitoring one or more status parameters of the lithium-ion battery; determining one or more discharging regulation parameters of the lithium-ion battery according to the monitored one or more status parameters; generating an oscillation current through an oscillation loop formed based on an inherent impedance characteristic of the lithium-ion battery; discharging the lithium-ion battery in the form of an oscillation current according to the status parameters of the lithium-ion battery. The oscillation current is applied to the load according to the one or more status parameters of the lithium-ion battery. The lithium-ion battery is discharged in the form of an oscillation current through the oscillation loop formed based on the inherent impedance characteristic of the lithium-ion battery, according to the one or more status parameters of the lithium-ion battery.

Figure 22:
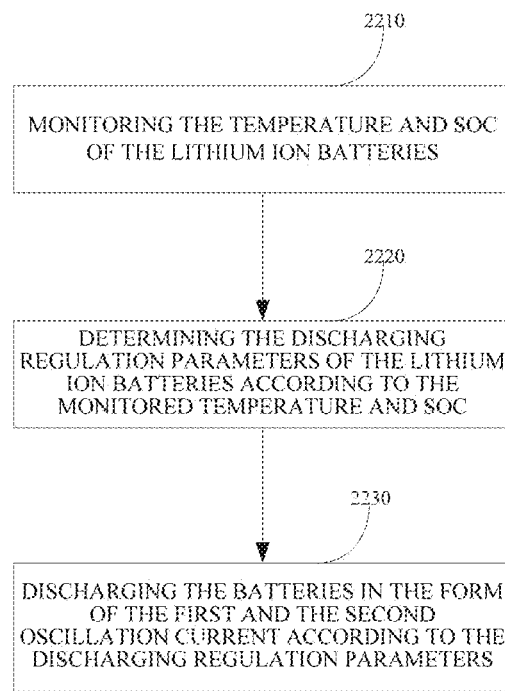
FIG. 22 is a flow chart of a method for regulating a discharging of a lithium-ion battery an embodiment disclosed herein.

In an embodiment as provided herein, as shown in FIG. 22, the method for regulating the discharging process for the lithium-ion battery may comprise: 2210—monitoring the temperature and SOC of the lithium-ion battery; 2220—determining the one or more discharging regulation parameters of the lithium-ion battery according to the monitored temperature and SOC, wherein examples of the one or more discharging regulation parameters include, without limitation, frequency range of the second oscillation current and duration of the first oscillation current; 2230—discharging the lithium-ion battery in the form of the first and the second oscillation currents generated by the oscillation loop formed based on the inherent impedance characteristic of the lithium-ion battery according to the one or more discharging regulation parameters, wherein the first oscillation current has a frequency higher than the upper limit of the frequency range of the second oscillation current. Determining the one or more discharging regulation parameters of the lithium-ion battery according to the monitored temperature and SOC may comprise: determining the one or more discharging regulation parameters corresponding to the monitored temperature and SOC from a set of pre-stored discharging regulation parameters at various temperatures and SOCs.

Optionally, the frequency range of the second oscillation current is determined according to the temperature and SOC of the lithium-ion battery. For example, determining the frequency range of the second oscillation current according to the temperature and SOC of the lithium-ion battery may comprise: as shown in FIG. 12, according to the EIS in a frequency range from 0.01 Hz to 100 kHz under various temperatures and SOCs, in a set of the EIS plots at SOC=90%, the frequencies corresponding to the intersections of EIS plots at various temperatures and a line (e.g., line A-B) parallel to the horizontal axis and through the intersection of the EIS plot at −20° C. and the vertical axis in the low frequency region are the lower limits $f_{dd}$ of the frequency ranges of the second oscillation current at the various temperatures, respectively; and as shown in FIG. 6, in a set of EIS plots with SOC=10%, the intersection of the EIS plot and a line (line A-D) parallel to the horizontal axis and through the intersection of the EIS plot at 0° C. and the vertical axis in the high frequency region is the upper limit $f_g$ of the frequency range of the second oscillation current.

Therefore, the frequency range of the second oscillation current may comprise or be the range from $f_{dd}$ to $f_g$. Moreover, the duration $T_2$ of the first oscillation current and the upper limit $f_g$ of the frequency range of the second oscillation current satisfy the relation: $T_2=n/f_g$, wherein n is an integer equal to or greater than 0. In certain examples, n is defined the same as supra.

Furthermore, discharging the lithium-ion battery in the form of the first and the second oscillation currents according to the one or more discharging regulation parameters may comprise: adjusting the duration of the first oscillation current according to the surface temperature of the lithium-ion battery. For example, adjusting the duration of the first oscillation current according to the surface temperature of the lithium-ion battery comprises: when the lowest surface temperature of the lithium-ion battery is equal to or above 0° C., n in $T_2=n/f_g$ is 0, and when the lowest surface temperature of the lithium-ion battery is decreased by 10° C., n in $T_2=n/f_g$ is increased by 1.

In certain embodiments, the pulse width $T_0$ of the oscillation triggering signal for triggering the oscillation loop to generate the first and the second oscillation currents and the upper limit $f_g$ of the frequency range of the second oscillation current satisfy the relation: $T_0=k/f_g$, wherein k is a real number less than or equal to 1. And the duration $T_2$ of the first oscillation current and the pulse width $T_0$ of the oscillation triggering signal satisfy the relation: $T_2=nT_0/k$, wherein n is an integer equal to or greater than 0. In certain examples, n is defined the same as supra. Therefore, adjusting the duration of the first oscillation current according to the surface temperature of the lithium-ion battery may comprise: adjusting the oscillation triggering signal to adjust the duration of the first oscillation current.

A person of ordinary skill in the art should understand that the first and the second oscillation currents are used for illustration and not for limitation of any methods or devices disclosed herein. More than two oscillation currents, e.g., six, ten, twenty oscillation currents with different frequencies can be used for a discharging regulation.

A person of ordinary skill in the art should also understand that the discharging controlling based on the temperature and SOC of the lithium-ion battery as described above is for illustration and not for limitation of any methods or devices disclosed herein. The discharging controlling can also be performed based on one or more other status parameters of the lithium-ion battery, e.g., voltage, internal resistance, dimension size, weight, type, appearance, structure, materials and the like. The specific value of the frequency range, SOC and temperature of the EIS disclosed in in the examples are used only for illustration and not for limitation for any methods or devices disclosed herein. A person of ordinary skill in the art could set a specific value as needed. For example, in a set of EIS plots with SOC at 30%, within a frequency range from 100 Hz to 1,000 kHz, a line parallel to the horizontal axis and through the intersection of the EIS plot at 10° C. and the vertical axis can be used to determine the upper limit of the frequency range of the second oscillation current; and in a set of EIS plots with SOC at 100%, a line parallel to the horizontal axis and through the intersection of the EIS plot at −40° C. and the vertical axis can be used to determine the lower limit of the frequency range of the second oscillation current.

Example 10

A: According to any one of examples 1-9, a variable frequency triggering oscillation charge-discharge loop is constructed using an inherent impedance characteristic of the lithium-ion battery.

Figure 23:
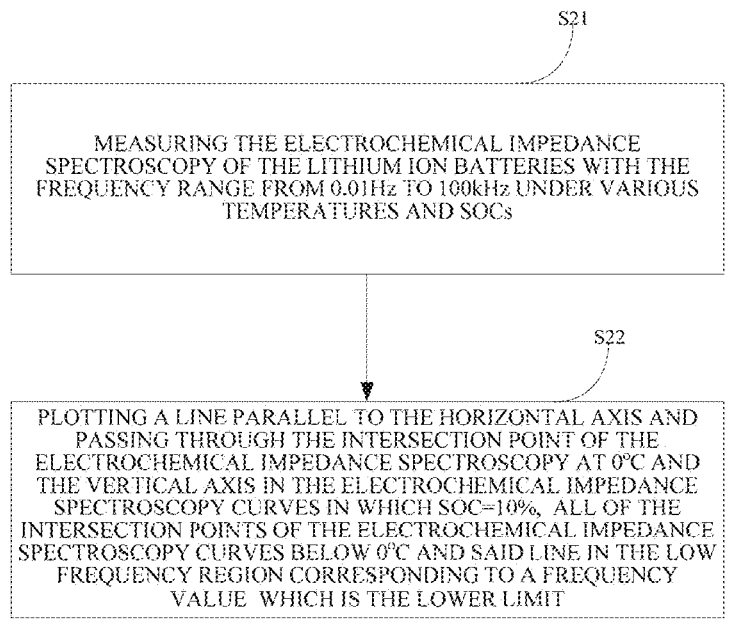
FIG. 23 is a flow chart for determining a lower limit of a frequency range of a middle frequency two-way oscillation charging current according to Example 10.

B: The lower limit of the frequency range of the middle frequency two-way oscillation charging current with high duty ratio of the lithium-ion battery is determined according to the method shown in FIG. 23, which comprises:

S21: measuring EIS with a frequency range from 0.01 Hz to 100 kHz under various temperatures and SOCs using an electrochemical working station;

S22: plotting a line (line A-D as shown in FIG. 6) parallel to the horizontal axis and through the intersection of the EIS at 0° C. and the vertical axis in the EIS plots at SOC=10%, wherein a frequency corresponding to an intersection of the EIS plot at a temperature below 0° C. and said line in a low frequency region is the lower limit $f_{cd}$ of the oscillation charging triggering frequency of the lithium-ion battery at the temperature. For example, as shown in FIG. 6, the intersection B of the EIS plot at −10° C. and line A-D corresponds to $f_{cd1}$=2.3 Hz; and the intersection C of the EIS plot at −20° C. and line A-D corresponds to $f_{cd2}$=10 Hz, which indicates that the lower limits of the middle frequency two-way oscillation charging triggering frequency with high duty ratio are 2.3 Hz and 10 Hz at −10° C. and −20° C., respectively.

Figure 24:
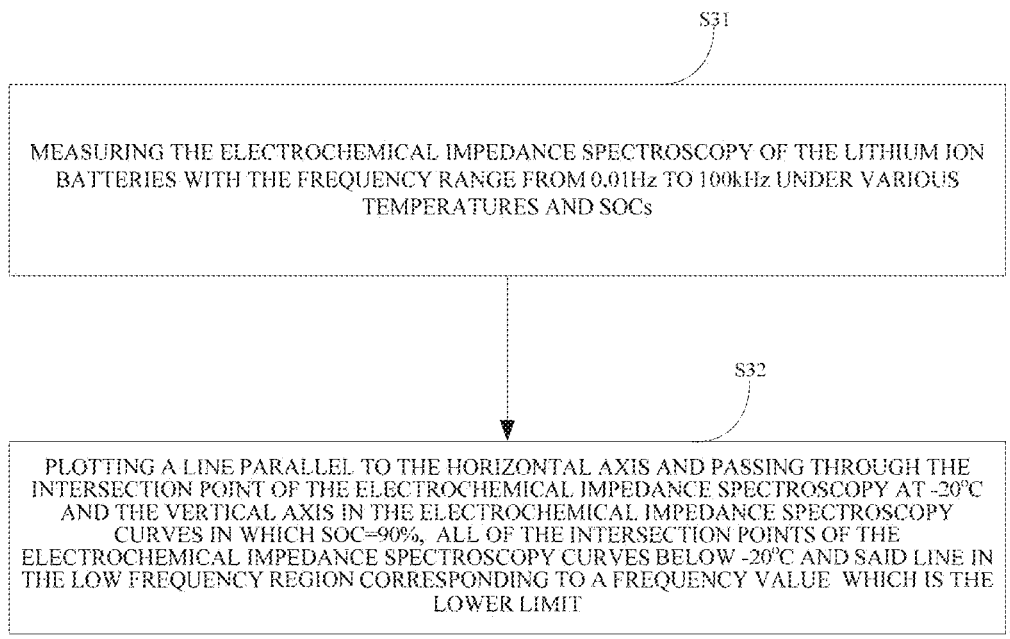
FIG. 24 is a flow chart for determining a lower limit of a frequency range of a middle frequency two-way oscillation discharging current according to Example 10.

C: The lower limit of the frequency range of the middle frequency two-way oscillation discharging current of the lithium-ion battery is determined according to the method shown in FIG. 24, which comprises:

S31: measuring EIS with a frequency range from 0.01 Hz to 100 kHz under various temperatures and SOCs using an electrochemical working station;

S32: plotting a line (line A-B as shown in FIG. 12) parallel to the horizontal axis and through the intersection of the EIS at −20° C. and the vertical axis in the EIS plots at SOC=90%, wherein a frequency corresponding to an intersection of an EIS plot at a temperature below −20° C. and said line in the low frequency region is the lower limit $f_{dd}$ of the oscillation discharging triggering frequency of the lithium-ion battery at the temperature. For example, as shown in FIG. 12, the intersection B of the EIS plot at −30° C. and line A-B corresponds to $f_{dd}$=0.6 Hz, which indicates that the oscillation discharging triggering frequency of the lithium-ion battery at this temperature needs to be above 0.6 Hz.

Figure 25:
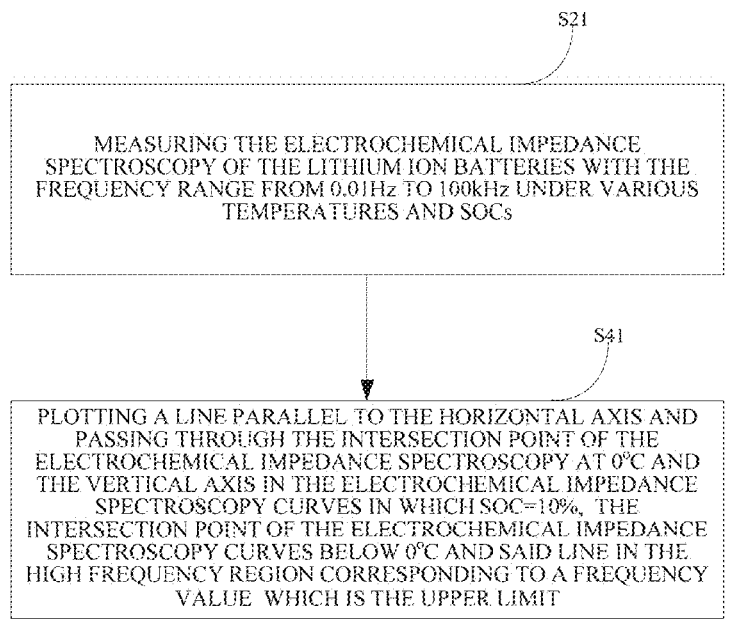
FIG. 25 is a flow chart for determining the upper limit of a frequency range of a middle frequency two-way oscillation charging/discharging currents according to Example 10.
Figure 26A:
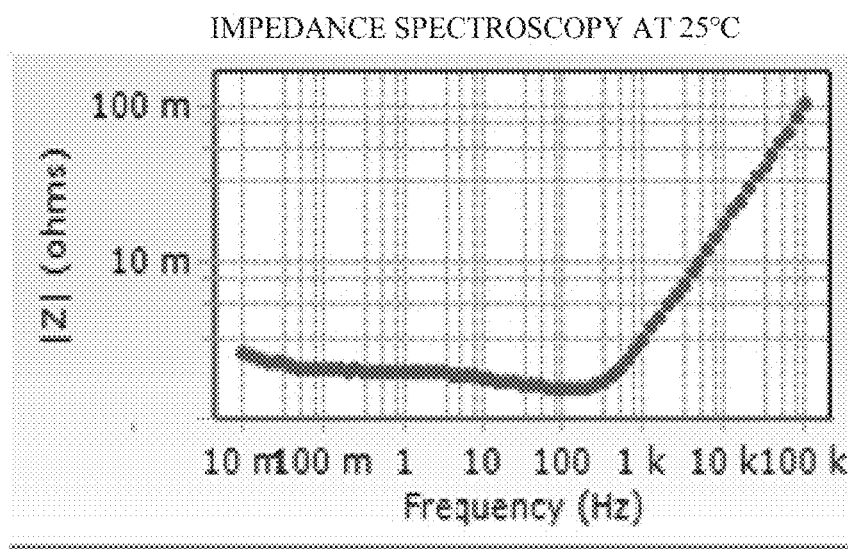
FIG. 26a shows EIS with a frequency ranging from 0.01 Hz to 100 kHz for a ternary lithium-ion battery according to Example 11 at 25° C.
Figure 26B:
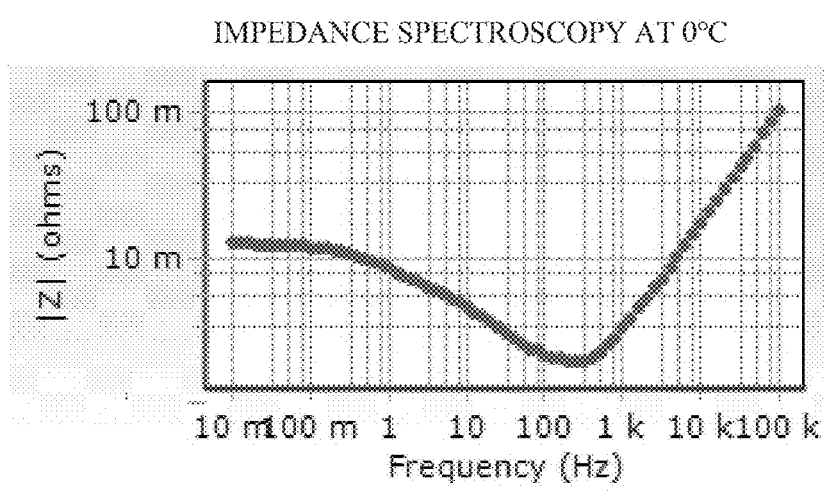
FIG. 26b shows EIS with a frequency ranging from 0.01 Hz to 100 kHz for a ternary lithium-ion battery according to Example 11 at 0° C.
Figure 26C:
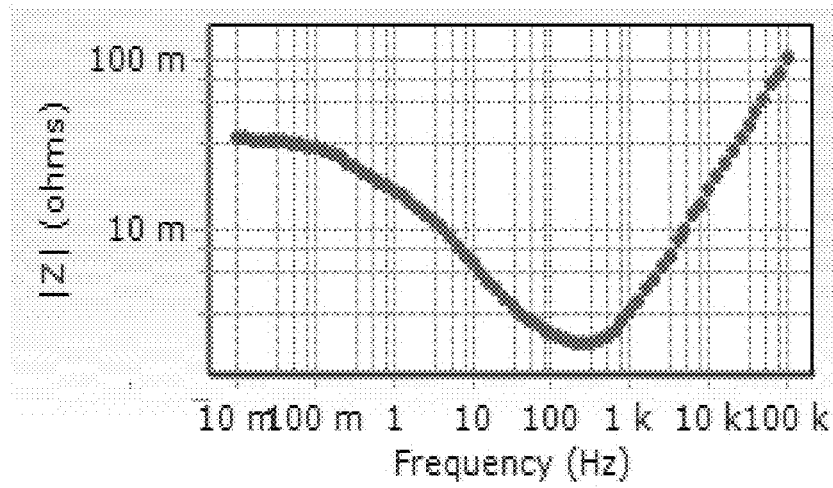
FIG. 26c shows EIS with a frequency ranging from 0.01 Hz to 100 kHz for a ternary lithium-ion battery according to Example 11 at −10° C.
Figure 26D:
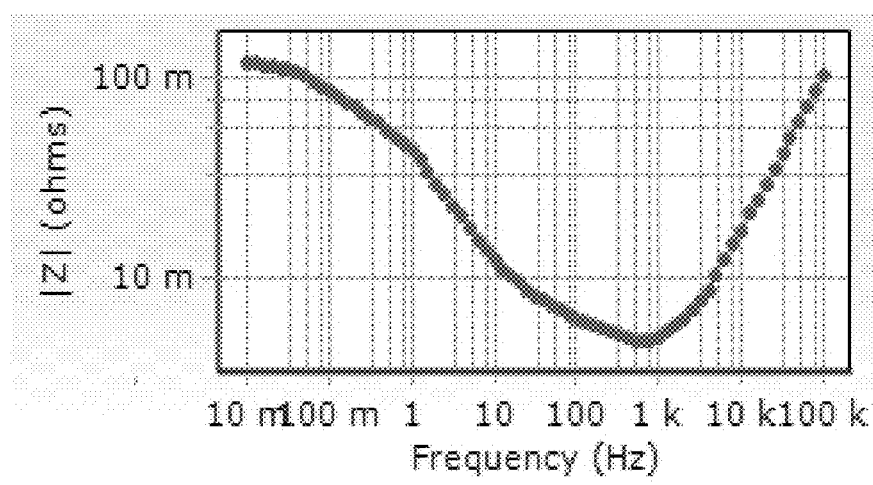
FIG. 26d shows EIS with a frequency ranging from 0.01 Hz to 100 kHz for a ternary lithium-ion battery according to Example 11 at −25° C.

D: The upper limit of the frequency range of the middle frequency two-way oscillation charging/discharging current and the middle frequency two-way oscillation discharging current of the lithium-ion battery is determined according to the method shown in FIG. 25, which comprises:

S21: measuring EIS with a frequency range from 0.01 Hz to 100 kHz under various temperatures and SOCs using an electrochemical working station;

S41: plotting a line (e.g., line A-D shown in FIG. 6) parallel to the horizontal axis and through the intersection of the EIS at 0° C. and the vertical axis in the EIS plots, wherein a frequency corresponding to the intersection of said line in the high frequency region is the upper limit $f_g$ of the middle frequency two-way oscillation charging/discharging current with high duty ratio of the lithium-ion battery. As shown in FIG. 6, the intersection D of the EIS plot and line A-D corresponds to $f_g$=7 kHz. Thus, the upper limit of the frequency range of the middle frequency two-way oscillation charging/discharging current is 7 kHz.

E: The lower limit of the frequency range of the high frequency oscillation current for an internal heating of the lithium-ion battery is determined by a method comprising: making the frequency of the high frequency oscillation current of the lithium-ion battery equal to or higher than $f_g$ determined by step S41.

F: A pulse width $T_0$ of the oscillation triggering signal is determined by a method comprising: determining the pulse width $T_0$ of the oscillation triggering signal and $f_g$ as determined in step S41 to satisfy the relation: $T_0 = \frac{1}{2} f_g$.

G: A duration $T_2$ of internal heating high frequency oscillation of the lithium-ion battery is determined by a method comprising: determining the duration $T_2$ of internal heating high frequency oscillation of the lithium-ion battery according to the equation $T_2 = 2nT_0$, wherein n is an integer equal to or greater than 0, wherein when the lowest surface temperature of the lithium-ion battery $\geq 0°$ C., n=0; when the lowest surface temperature of the lithium-ion battery is between 0° C. and −10° C., n=1; when the lowest surface temperature of the lithium-ion battery is between −10° C. and −20° C., n=2; and when the lowest surface temperature of the lithium-ion battery is between −20° C. and −30° C., n=3. In a similar fashion, when the lowest surface temperature of the lithium-ion battery is decreased by 10° C., n is increased by 1.

H: A maximum amplitude $I_d$ of the middle frequency two-way oscillation charging current of the lithium-ion battery at a low temperature is adjusted by a method comprising: the maximum amplitude $I_d$ is limited by the upper limit of the charging voltage of the battery, when the surface temperature of the battery is equal to or above 0° C., the upper limit of the charging voltage is the upper limit $U_{MAX}^0$ of the charging voltage of the lithium-ion battery at ambient temperature; and when the surface temperature of the battery is less than 0° C., the upper limit of the charging voltage should be reduced according to $U_{MAX}^d = U_{MAX}^0 + 0.01 \cdot T(V/°C.)$, wherein T ranges from 0° C. to −30° C., to avoid lithium precipitation when charged at low temperature. During a charging process, $I_d$ is adjusted by a battery management system (BMS) or a triggering controller to make the terminal voltage of the battery $\leq U_{MAX}^d$.

In one embodiment, the frequency range of the middle frequency two-way oscillation charging current with high duty ratio of the lithium-ion battery is determined according to steps S21, S22 and S41, the pulse width $T_0$ of the oscillation triggering signal is determined according to the method in F, the duration $T_2$ of the high frequency oscillation current is determined according to the method in G, and the amplitude $I_d$ of the charging current is determined by the method in H. The data determined above are stored in a BMS or triggering controller. According to the method for regulating a charge-discharge of the lithium-ion battery with the variable frequency oscillation, charging the lithium-ion battery comprises the following steps:

before the charging starts: measuring a battery voltage and a battery temperature by a BMS or triggering controller, and initiating the charging based on the current SOC of the battery, the frequency range of the middle frequency two-way oscillation charging current with a high duty ratio, the pulse width $T_0$ of the oscillation triggering signal, the duration $T_2$ of the high oscillation current, and the amplitude $I_d$ of charging current as stored; for example, if the surface temperature of the battery is above 0° C., the charging is performed by the middle frequency two-way oscillation current; and if the surface temperature of the battery is below 0° C., the internal heating is performed by the high frequency oscillation current to increase the battery temperature;

during the charging: measuring the battery voltage and battery temperature by the BMS or triggering controller in real-time, as the temperature of the battery rises and SOC increases; reducing the duration $T_2$ of the high frequency oscillation current according to the method in G and increasing the amplitude $I_d$ of the charging current according to the method in H to expedite charging through adjusting oscillating trigger K by the BMS or triggering controller; and when the lowest surface temperature of the lithium-ion battery is above 0° C.: maintaining the same duration $T_2$ of the high frequency oscillation current and increasing the amplitude of the charging current $I_d$; and after the terminal voltage of the battery reaches $U_{MAX}^0$, decreasing $I_d$ until of the condition for ending the charging process is satisfied.

In another embodiment, the frequency range of the middle frequency two-way oscillation discharging current of the lithium-ion battery with a high duty ratio is determined according to steps S31, S32 and S41, the pulse width $T_0$ of the oscillation triggering signal is determined according to the method of F, and the duration $T_2$ of the high frequency oscillation is determined according to the method of G. These data are stored in the BMS or triggering controller. The method for regulating a charge-discharge of the lithium-ion battery with the variable frequency oscillation according to the example disclosed herein may prolong the cycle life when discharging the lithium-ion battery. Said discharging method comprises:

before the discharging starts: measuring the battery voltage and the battery temperature by a BMS or a triggering controller, initiating the discharging based on the current SOC of the battery and the frequency range of the middle frequency two-way oscillation discharging current with a high duty ratio, the pulse width $T_0$ of the oscillation triggering signal, and the duration $T_2$ of high frequency oscillation as stored; and during the discharging: measuring the battery voltage and battery temperature by the BMS and the triggering controller in real-time, as the temperature and the SOC of the battery change, adjusting the oscillation trigger K by the BMS or triggering controller to alter the duration $T_2$ of the high frequency oscillation according to the method of G.

[Control Device]

In one embodiment, a control device for charging regulation of the lithium-ion batteries provided herein comprises:

a memory in which one or more computer-readable instructions (or program) and data are stored; and a processor executing the computer-readable instructions (or program) to perform part or all of the operations (or processes or procedures) as described in the charging regulation method.

In another embodiment, a control device for discharging regulation of the lithium-ion battery provided herein comprises:

a memory in which one or more computer-readable instructions (or program) and data are stored; and a processor executing the computer-readable instructions (or program) to perform part or all of the operations (or processes or procedures) as described in the discharging regulation method.

In another embodiment, a control device for charge-discharge regulation of the lithium-ion battery provided herein comprises:

a memory in which one or more computer-readable instructions (or program) and data are stored; and a processor executing the computer-readable instructions (or program) to perform part or all of the operations (or processes or procedures) as described in the discharging regulation method and charging regulation method.

Optionally, the control device described herein can be a BMS or triggering controller, or any other devices or apparatus e.g., a microcontroller, a digital processor, a single chip micyoco (SCM), and the like.

[Manufacturing Method]
Manufacturing Method for a Charging System

In one embodiment, a method for manufacturing a charging system of a lithium-ion battery provided herein comprises:
configuring a variable frequency triggering oscillation charging device between the first charging device and the lithium-ion battery. In certain examples, the method further comprises:
providing a first charging device;
providing the lithium-ion battery.

The variable frequency triggering oscillation charging device constructs an oscillation loop with the lithium-ion battery based on an inherent impedance characteristic of the lithium-ion battery to generate an oscillation current. For example, the variable frequency triggering oscillation charging device constructs the oscillation loop with the lithium battery using the inherent impedance characteristic of the lithium-ion battery, the oscillation loop is triggered to generate at least two oscillation currents. The variable frequency triggering oscillation charging device utilizes the at least two oscillation currents to charge the lithium-ion battery, wherein at least one of the at least two oscillation currents has a frequency higher than the other(s).

In certain embodiments, configuring the variable frequency triggering oscillation charging device between the first charging device and the lithium-ion battery comprises:
providing an energy storage and freewheeling unit that is connected to the first charging device in parallel;
providing an oscillation unit that is connected to the lithium-ion battery in parallel to form the oscillation loop; and
providing an oscillation trigger that is connected between the energy storage and freewheeling unit and the oscillation unit. The oscillation trigger triggers the oscillation loop to generate the oscillation current.

In certain embodiments, configuring the variable frequency triggering oscillation charging device between the first charging device and the lithium-ion battery comprises:
connecting an energy storage and freewheeling unit to the first charging device in parallel;
connecting an oscillation unit connected to the lithium-ion battery in parallel to form the oscillation loop; and
configuring an oscillation trigger between the energy storage and freewheeling unit and the oscillation unit. The oscillation trigger triggers the oscillation loop to generate the oscillation current.

In another embodiment, configuring the variable frequency triggering oscillation charging device between the first charging device and the lithium-ion battery comprises:
providing an energy storage and freewheeling unit that is connected to the first charging device in parallel;
providing an oscillation unit that is connected to the energy storage and freewheeling unit in series;
connecting the energy storage and freewheeling unit and the oscillation unit that are connected in series to the lithium-ion battery in series to form the oscillation loop; and
providing an oscillation trigger that is connected to the oscillation unit in parallel. The oscillation trigger triggers the oscillation loop to generate the oscillation current.

In another embodiment, configuring the variable frequency triggering oscillation charging device between the first charging device and the lithium-ion battery comprises:
connecting an energy storage and freewheeling unit to the first charging device in parallel;
connecting an oscillation unit to the energy storage and freewheeling unit in series; connecting the energy storage and freewheeling unit and the oscillation unit that are connected in series to the lithium-ion battery in series to form the oscillation loop; and
connecting an oscillation trigger to the oscillation unit in parallel. The oscillation trigger triggers the oscillation loop to generate the oscillation current.

In certain embodiments, the manufacturing method further comprises: providing a control device that controls the variable frequency triggering oscillation charging device to supply the oscillation current to the lithium-ion battery based on the status parameters of the lithium-ion battery. In certain embodiments, the method may further comprise: coupling a control device into the charging system to control the variable frequency triggering oscillation charging device to supply the oscillation current to the lithium-ion battery according to the one or more status parameters of the lithium-ion battery. For example, at least two oscillation currents are supplied. The controlling method is the same as the one described herein.

Manufacturing Method for a Discharging System

A method for manufacturing a discharging system of lithium-ion battery provided herein comprises:
configuring a variable frequency triggering oscillation discharging device between a load and the lithium-ion battery. In certain examples, the method further comprises: providing a lithium-ion battery.

In certain embodiments, the variable frequency triggering oscillation charging device constructs an oscillation loop with the lithium-ion battery based on an inherent impedance characteristic of the lithium-ion battery to generate an oscillation current. For example, the variable frequency triggering oscillation discharging device constructs the oscillation loop with the lithium-ion battery using the inherent impedance characteristic of the lithium-ion battery, and then the oscillation loop is triggered to generate at least two oscillation currents. The variable frequency triggering oscillation discharging device discharges the lithium-ion battery in the form of at least two oscillation currents. At least one of the at least two oscillation currents has a frequency higher than the other(s).

In one embodiment, configuring the variable frequency triggering oscillation discharging device between the load and the lithium-ion battery comprises:
providing an energy storage and freewheeling unit that is connected to the load in parallel;
providing an oscillation unit that is connected to the lithium-ion battery in parallel to form the oscillation loop; and
providing an oscillation trigger that is connected between the energy storage and freewheeling unit and the oscillation unit. The oscillation trigger triggers the oscillation loop to generate the oscillation current.

In one embodiment, configuring the variable frequency triggering oscillation discharging device between the load and the lithium-ion battery comprises:
connecting an energy storage and freewheeling unit to the load in parallel;
connecting an oscillation unit to the lithium-ion battery in parallel to form the oscillation loop; and
connecting an oscillation trigger between the energy storage and freewheeling unit and the oscillation unit. The oscillation trigger triggers the oscillation loop to generate the oscillation current.

In another embodiment, configuring the variable frequency triggering oscillation discharging device between the load and the lithium-ion battery comprises:

providing an energy storage and freewheeling unit that is connected to load in parallel;

providing an oscillation unit that is connected to the energy storage and freewheeling unit in series;

connecting the energy storage and freewheeling unit and the oscillation unit that are connected in series to the lithium-ion battery in series to form the oscillation loop; and providing an oscillation trigger that is connected to the oscillation unit in parallel.

In another embodiment, configuring the variable frequency triggering oscillation discharging device between the load and the lithium-ion battery comprises:

connecting an energy storage and freewheeling unit to the load in parallel;

connecting an oscillation unit to the energy storage and freewheeling unit in series;

connecting the energy storage and freewheeling unit and the oscillation unit that are connected in series to the lithium-ion battery in series to form the oscillation loop; and connecting an oscillation trigger to the oscillation unit in parallel. The oscillation trigger triggers the oscillation loop to generate the oscillation current.

The manufacturing method may further comprise: providing a control device that controls the variable frequency triggering oscillation discharging device to discharge the lithium-ion battery in the form of the oscillation current according to the one or more status parameters of the lithium-ion battery. In certain embodiments, the method further comprises: coupling a control device into the discharging system to control the variable frequency triggering oscillation discharging device to discharge the lithium-ion battery in the form of the oscillation current according to the one or more status parameters of the lithium-ion battery. For example, the lithium-ion battery can be discharged in the form of at least two oscillation currents. The controlling method is the same as the one described herein.

In addition, the method for manufacturing the charging system and the method for manufacturing the discharging system may also be used for manufacturing the charge-discharge system of the lithium-ion battery disclosed herein.

[Technical Effect]

The variable frequency triggering oscillation charge-discharge methods and regulation methods disclosed herein, as well as the devices for the same may achieve technical effects similar to a direct current discharging in a lithium-ion battery with a reduced temperature increase in a discharging to prolong the cycle life of the battery, without altering its load configurations.

Three more examples and figures for the same are described below for further illustration of the methods and devices disclosed herein.

Example 11

Provided herein is a charging example of a ternary lithium-ion battery pack for an electric SUV (sport utility vehicle) at a low temperature of −25° C. The battery pack included 4P92S 31 Ah/3.7V ternary lithium-ion batteries.

The single 31 Ah/3.7V ternary lithium-ion battery at SOC=10% was placed at 25° C., 0° C., −10° C., or −25° C. for 24 hours. Then its EIS in the frequency range of 0.01 Hz to 100 kHz at various temperatures was measured using an electrochemical work station, as shown in FIGS. 26a to 26d.

Figure 27A:
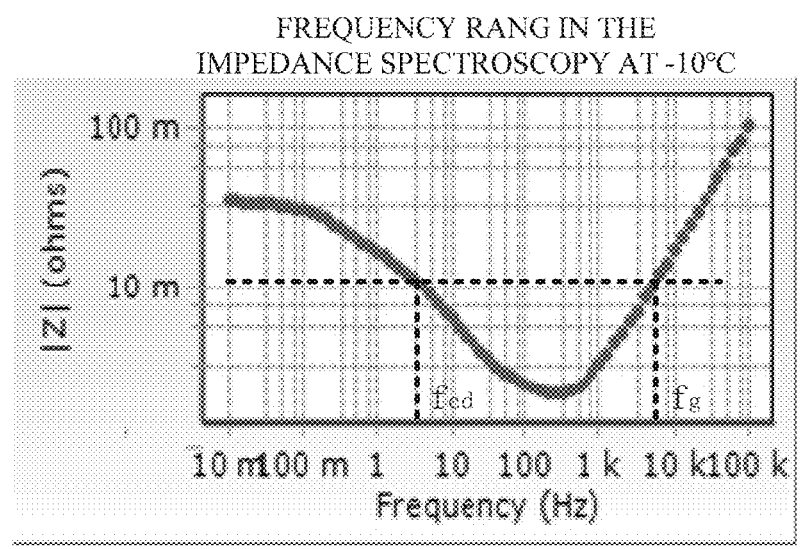
FIG. 27a shows a frequency range of a middle frequency two-way oscillation current and a high frequency oscillation current of a ternary lithium-ion battery according to Example 11 at −10° C.
Figure 27B:
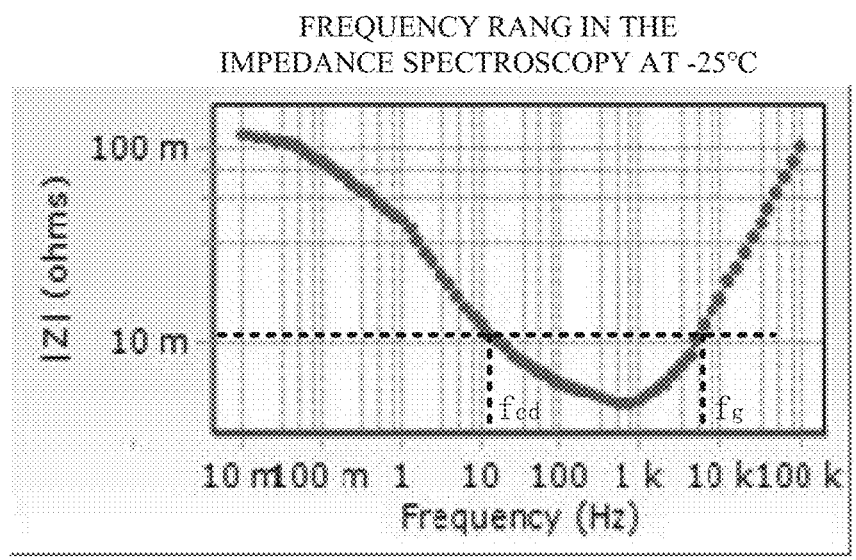
FIG. 27b shows a frequency range of a middle frequency two-way oscillation current and a high frequency oscillation current of a ternary lithium-ion battery according to Example 11 at 25° C.

The middle frequency two-way oscillation charging frequency range at −25° C. was determined to be from 11 Hz to 7 kHz according to the method described supra in B and D. The high frequency oscillation frequency at −25° C. was determined to be ≥7 kHz according to the method described supra in E. The middle frequency two-way oscillation charging frequency range at −10° C. was determined to be from 5 Hz to 7 kHz according to the method described in B and D. The high frequency oscillation frequency at −10° C. was determined to be ≥7 kHz according to the method described in E, as shown in FIGS. 27a and 27b. Therefore, the initial middle frequency two-way oscillation charging frequency for a charging at −25° C. was determined to be 250 Hz, and the high frequency oscillation frequency was determined to be 10 kHz.

The pulse width $T_0$ of the oscillation triggering signal was determined to be 50 μs according to the method described in F.

The duration $T_2$ of the initial high frequency oscillation was determined to be 400 μs according to the method described in G.

According to the method described in H, the upper limit of the initial charging voltage at −25° C. was determined to be 3.95V, and the amplitude $I_d$ of the middle frequency two-way oscillation charging current was adjusted to 37.2 A by a BMS.

Figure 28:
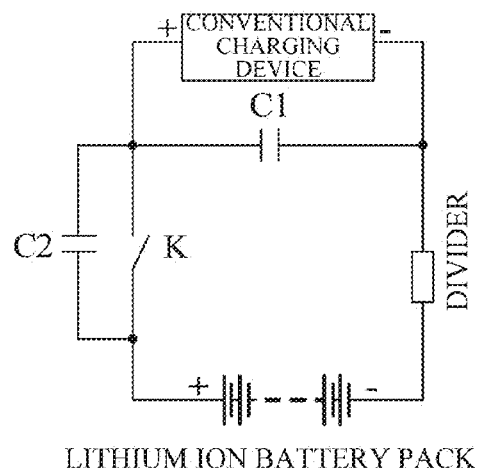
FIG. 28 shows a variable frequency triggering oscillation charging loop constructed according to Example 3 in Example 11.

A variable frequency triggering oscillation charging loop for the battery pack was constructed according to Example 3, as shown in FIG. 28, wherein capacitor $C_1$ was the energy storage and freewheeling unit, capacitor $C_2$ was the oscillation unit, and the oscillation trigger K was MOSFET. The ripple coefficient of DC charging current was set to be 10%, and consequently, $C_1$=150 μF and $C_2$=20 μF.

The lithium-ion battery pack was placed at −25° C. for eight hours after the surface temperature reached −25° C. The lithium-ion battery pack was charged at −25° C. according to the charging method or charging regulation method disclosed herein.

Figure 29:
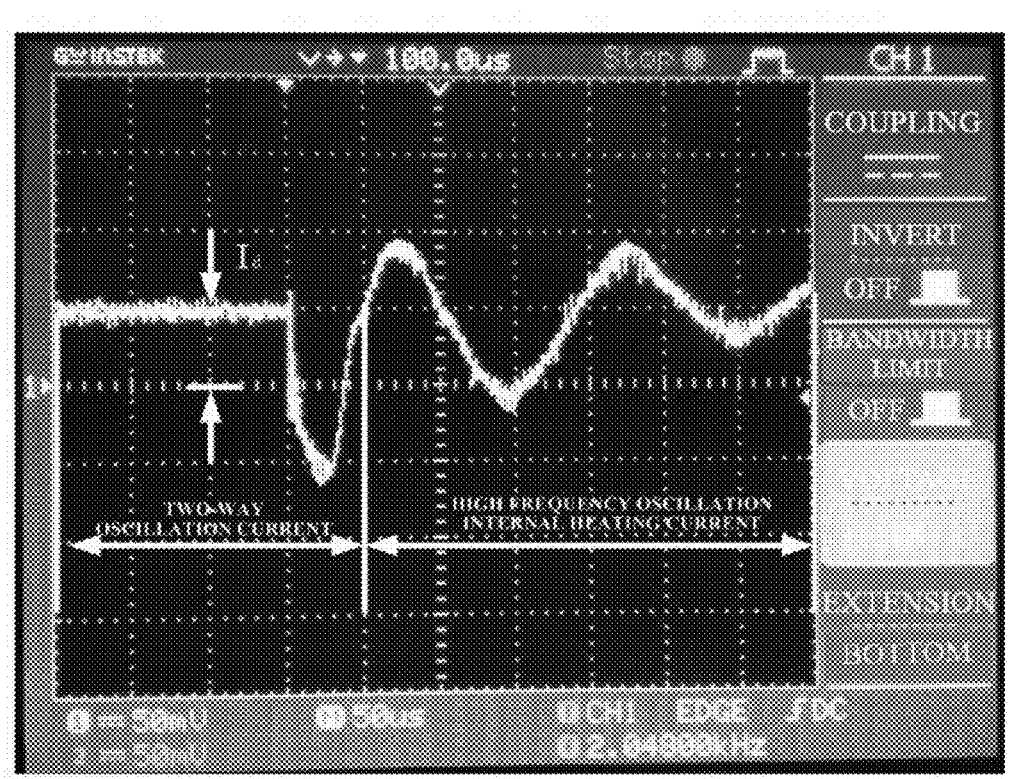
FIG. 29 shows a current wave form of a divider of FIG. 28.

FIG. 29 shows a current wave through a divider in FIG. 28, which shows that after triggered by a 250 Hz oscillation, a reverse current generated by the first triggering oscillation and the forward charging current before the triggering formed a two-way oscillation current, and then a high frequency 10 kHz triggering formed an internal heating current with a high frequency oscillation.

Figure 30:
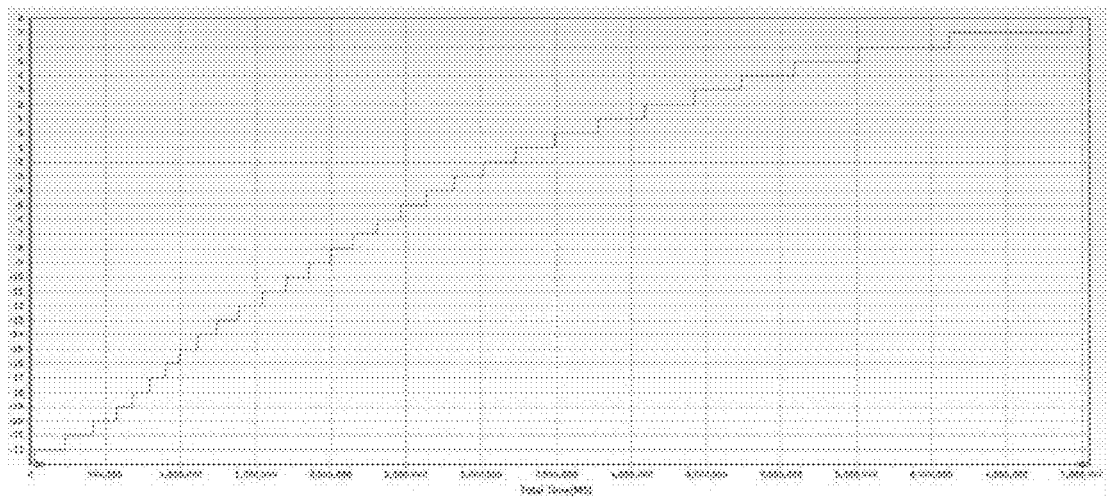
FIG. 30 shows a temperature raising process during a charging process in Example 11.

After the charging process ended, the surface temperature of the battery increased from −25° C. to 8° C., and the charging time was 7,000 seconds with the charged electric quantity at 95% of the nominal capacity. The temperature increase during the charging process is shown in FIG. 30. The charging capacity of the lithium-ion battery was increased and the charging efficiency was enhanced. The internal temperature increase was effectively controlled, which broadened the suitable temperature range for the lithium-ion battery.

Example 12

Figure 31A:
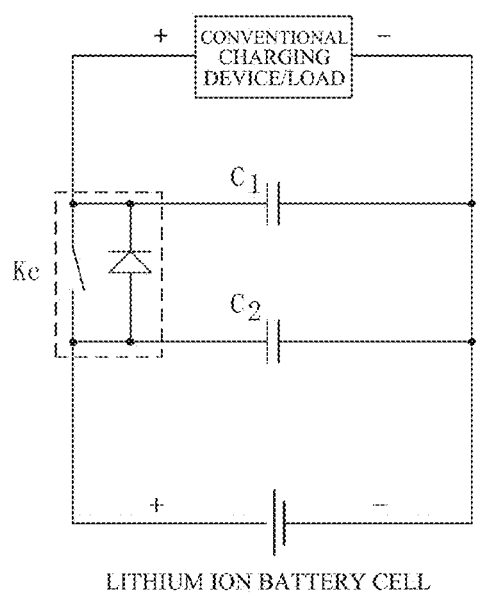
FIG. 31a shows an oscillation charging/DC discharging loop according to an embodiment disclosed herein in Example 12.
Figure 31B:
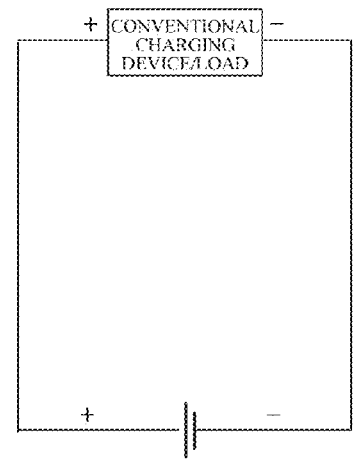
FIG. 31b shows a conventional DC charging/discharging loop for comparison in Example 12.
Figure 32A:
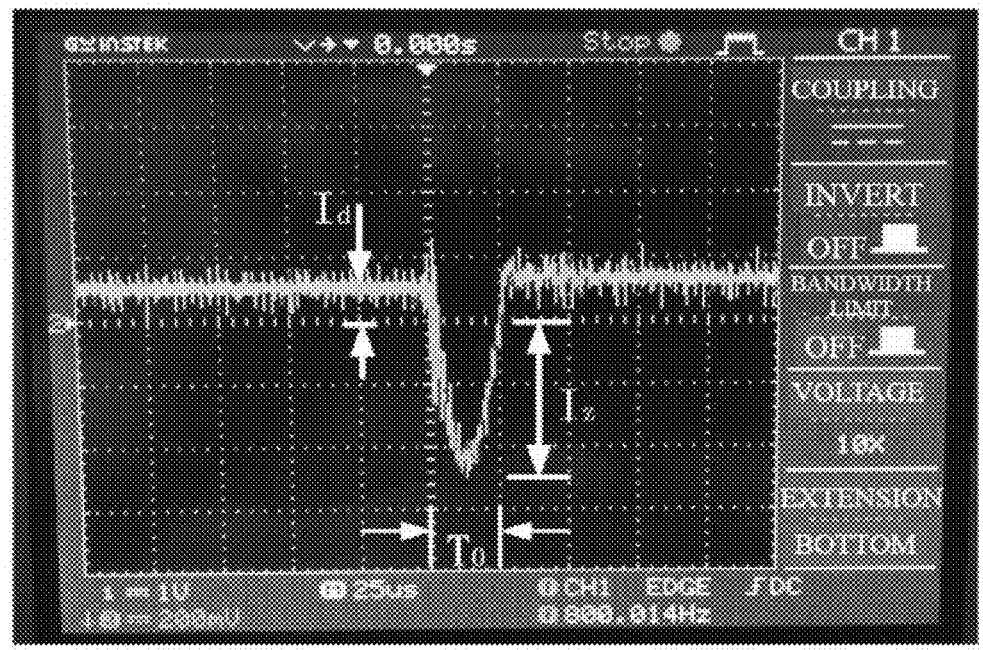
FIG. 32a shows a positive current amplitude, a reverse current amplitude, and a triggering pulse width of a middle frequency two-way oscillation in Example 12.
Figure 32B:
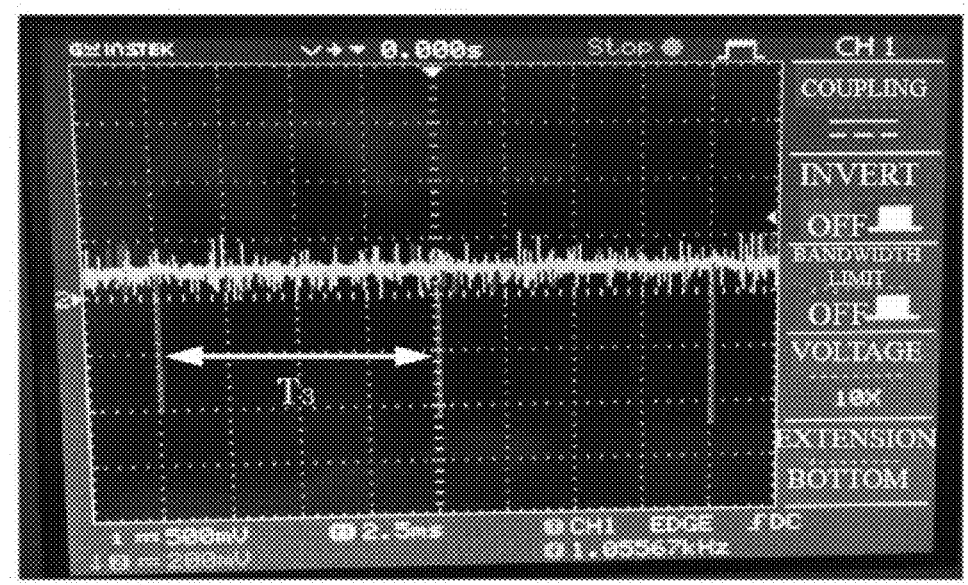
FIG. 32b shows a charging period of a middle frequency two-way oscillation in Example 12.
Figure 33A:
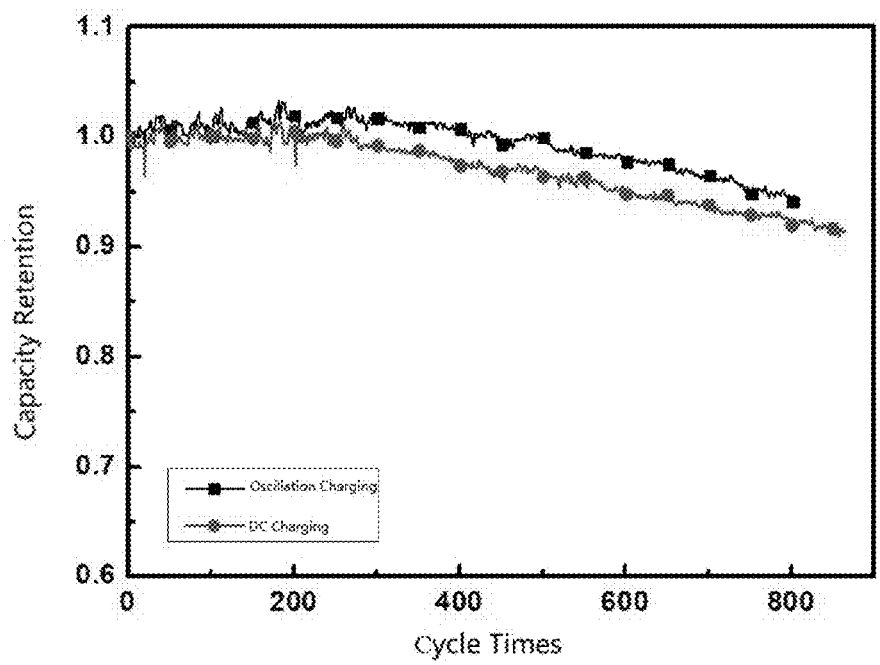
FIG. 33a shows a comparison of cycle times between an oscillation charging and a conventional charging in Example 12.
Figure 33B:
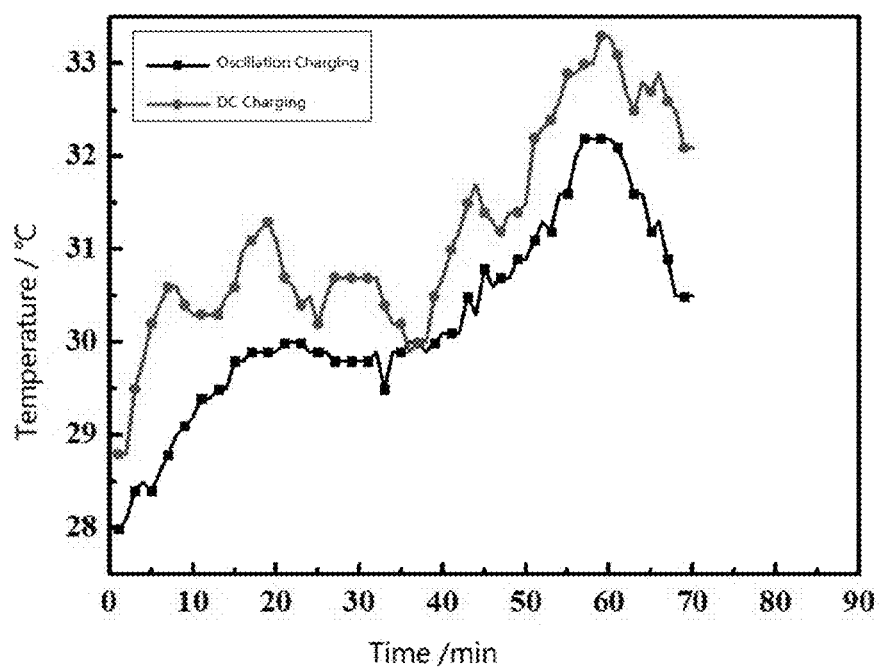
FIG. 33b shows a comparison of temperature raising between an oscillation charging and a conventional charging in Example 12.

An 1 C oscillation charging and a direct current 1 C discharging cycle experiment was performed on a 31 Ah/3.7V ternary lithium-ion battery cell at 25° C. with a configuration shown in FIG. 31a according to the charging methods or charging regulation methods disclosed herein. The upper limit of the charging voltage was increased to 4.3 V. As a control, a conventional constant current/constant voltage 1 C charging and 1 C discharging cycle experiment was performed with a configuration shown in FIG. 31b on a 31 Ah/3.7V ternary lithium-ion battery cell having the same lot number and the same configurations as the 31 Ah/3.7V ternary lithium-ion battery cell used for the 1 C oscillation charging and direct current 1 C discharging cycle experiment. The amplitude $I_d$ of the middle frequency two-way oscillation forward current was 31 A, the amplitude $I_z$ of the reverse current was 130 A, the middle frequency two-way oscillation charging period $T_3$ was 10 ms, and the triggering pulse width $T_0$ was 25 μs, as shown in FIGS. 32a and 32b. The results are shown in FIGS. 33a and 33b. The lithium-ion battery using oscillation charging had significantly increased cycle times and reduced temperature increase. Thus, the oscillation charging method disclosed herein enhanced the charging threshold voltage, the charging electric quantity and the cycle performance of the lithium-ion battery remarkably when compared to the conventional direct current charging method.

Example 13

Figure 34A:
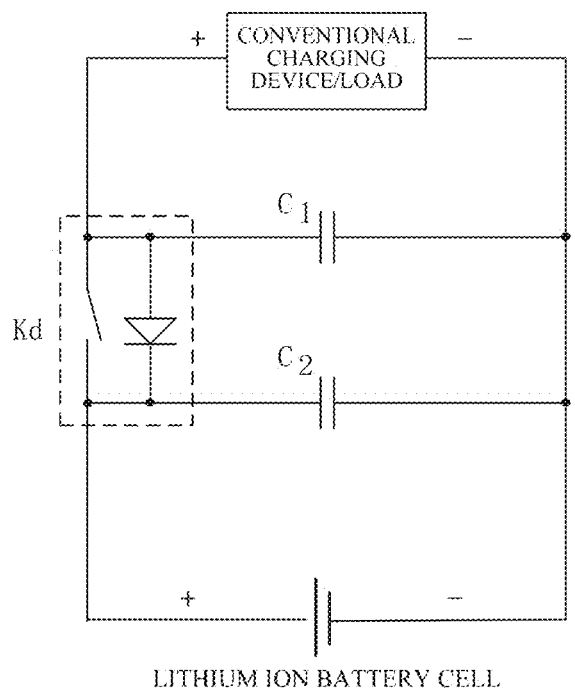
FIG. 34a shows a DC charging/oscillation discharging loop according to an embodiment disclosed herein in Example 13.
Figure 34B:
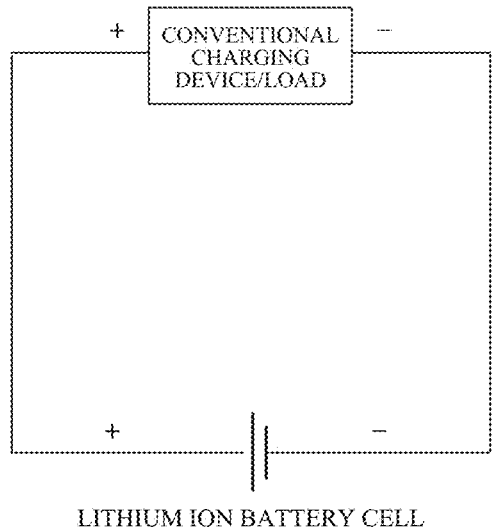
FIG. 34b shows a conventional DC charging/discharging loop for comparison in Example 13.
Figure 35A:
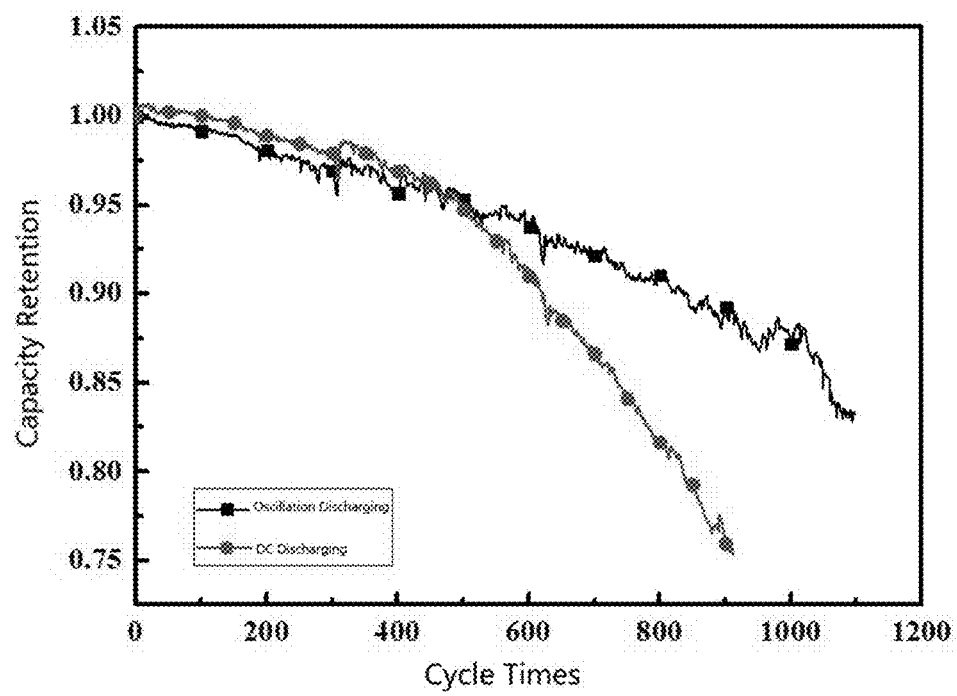
FIG. 35a shows a comparison of cycle times between an oscillation discharging and a DC discharging in Example 13.
Figure 35B:
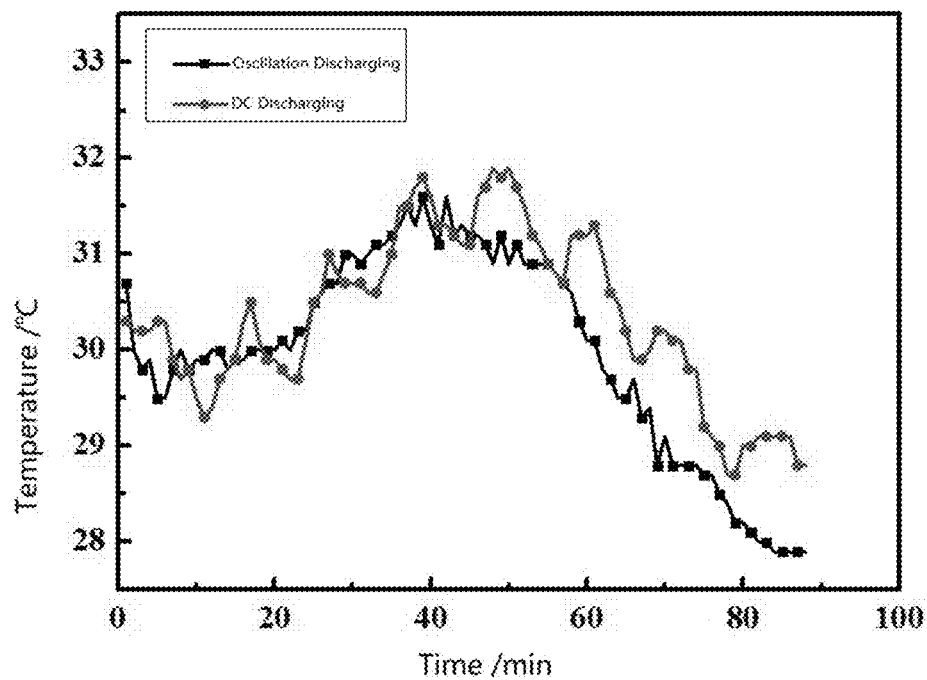
FIG. 35b shows a comparison of temperature control between an oscillation discharging and a DC discharging in Example 13.

A direct current 1 C charging and 1 C oscillation discharging cycle experimentation was performed with a configuration shown in FIG. 34a on a 31 Ah/3.7V ternary lithium-ion battery cell at 25° C. according to the discharging methods or discharging regulation methods disclosed herein. The upper limit of the charging voltage was 4.2 V, and the lower limit of the discharging voltage was 3.0 V. As a control, a conventional constant current/constant voltage 1 C charging and 1 C discharging cycle experiment was performed with a configuration shown in FIG. 34b on a 31 Ah/3.7V ternary lithium-ion battery cell having the same lot number and the same configurations as the 31 Ah/3.7V ternary lithium-ion battery cell used for the 1 C direct current charging and 1 C oscillation discharging cycle experiment. The oscillation condition was the same as disclosed in Example 12. The results are shown in FIGS. 35a and 35b. The lithium-ion battery using the oscillation discharging had significantly increased cycle numbers and reduced temperature increase. Thus, the oscillation discharging methods disclosed herein remarkably enhanced the cycle performance of the lithium-ion battery when compared to the conventional direct current discharging method.

Example 14

A method of charging and/or discharging a lithium-ion battery comprising:
  generating one or more oscillation currents by an oscillation loop formed based on an inherent impedance characteristic of the lithium-ion battery itself; and
  charging and/or discharging the lithium-ion battery with the one or more oscillation currents according to one or more charging and/or discharging parameters, wherein the charging and/or discharging parameters are determined based on one or more status parameters of the lithium-ion battery.

Example 15

The method of Example 14, wherein the one or more oscillation currents comprise a first oscillation current and a second oscillation current, wherein the first oscillation current has a frequency range higher than a frequency range of the second oscillation current.

Example 16

The method of Example 15, wherein the one or more status parameters selected from the group consisting of temperature, state of charge (SOC), voltage, internal resistance, dimensional size, weight, type, appearance, structure, and material of the lithium-ion battery.

Example 17

The method of Example 15, wherein the one or more status parameters comprise temperature and SOC of the lithium-ion battery, and the one or more charging parameters comprise the frequency range of the second oscillation current, the duration of the first oscillation current, and the amplitude of the charging current.

Example 18

The method of Example 15, wherein the one or more status parameters comprise temperature and SOC of the lithium-ion battery, and the one or more discharging parameters include the frequency range of the second oscillation current, and the duration of the first oscillation current.

Example 19

The method of Example 15, wherein the first oscillation current and the second oscillation current are alternatively applied during charging/discharging.

Example 20

The method of Example 19, wherein the duration of the first oscillation current is adjusted according to the temperature of the lithium-ion battery (the first battery temperature).

Example 21

The method of Example 20, further comprising determining the duration T2 of the first oscillation current by a formula:

$T2 = n/fg$, wherein:

n=0 if the first battery temperature ≥the first working temperature; and
   n=1+INT((the first working temperature—the first battery temperature)/x') if the first battery temperature <the first working temperature, wherein 0.01≤x'≤20, and INT is the integer-valued function.

Example 22

The method of Example 20, further comprising:
  plotting a line (e.g., line A-B in FIG. 12) parallel to the horizontal axis and through an intersection of EIS at a first working temperature and the vertical axis in the EIS plots with the first SOC in a frequency range; wherein:
    the frequency $f_{cd}$ corresponding to the intersection of the EIS plot at the first battery temperature and the parallel line in the low frequency region is the lower limit of the frequency for triggering the oscillation for charging and/or discharging of the lithium-ion battery; and
    the frequency $f_g$ corresponding to the intersection of the EIS plot at the first battery temperature and the parallel line in the high frequency region is the upper limit of the frequency for triggering the oscillation for charging and/or discharging of the lithium-ion battery.

Example 23

A system for charging and/or discharging a lithium-ion battery, comprising a variable frequency triggering oscillation charging/discharging device, which forms an oscillation loop with the lithium-ion battery, wherein:
the variable frequency triggering oscillation charging/discharging device is to be coupled between a first charging device and/or a load and the lithium-ion battery; and
the oscillation loop generates one or more oscillation currents for charging and/or discharging the lithium-ion battery.

Example 24

The system of Example 23, wherein the variable frequency triggering oscillation charging/discharging device comprises:
an energy storage and freewheeling unit connected to the first charging device and/or load in parallel;
an oscillation unit connected to the lithium-ion battery in parallel to form the oscillation loop; and
an oscillation trigger connected between the energy storage and freewheeling unit and the oscillation unit to trigger the oscillation loop to generate the one or more oscillation currents.

Example 25

The system of Example 24, wherein the oscillation trigger comprises an anti-paralleled diode.

Example 26

The system of Example 24, further comprising a control device that controls the variable frequency triggering oscillation charging/discharging device to supply one or more oscillation currents to the lithium-ion battery according to one or more status parameters of the lithium-ion battery, wherein the one or more oscillation currents include a first oscillation current and a second oscillation current, and the first oscillation current has a frequency range higher than that of the second oscillation current.

Example 27

The system of Example 26, wherein the one or more status parameters of the lithium-ion battery comprise a temperature and a State of Charge (SOC) of the lithium-ion battery.

Example 28

The system of Example 26, wherein the control device is a battery manage system (BMS) or a triggering controller.

Example 29

The system of Example 23, wherein the variable frequency triggering oscillation charging/discharging device comprises:
an energy storage and freewheeling unit connected to the first charging device and/or load in parallel;
an oscillation unit connected to the energy storage and freewheeling unit in series and then connected to the lithium-ion batteries in series to form the oscillation loop; and
an oscillation trigger connected to the oscillation unit in parallel to trigger the oscillation loop to generate the one or more oscillation currents.

Example 30

The system of Example 29, wherein the oscillation trigger comprises an anti-paralleled diode.

Example 31

The system of Example 29, further comprising a control device that controls the variable frequency triggering oscillation charging/discharging device to supply one or more oscillation currents to the lithium-ion battery according to one or more status parameters of the lithium-ion battery, wherein the one or more oscillation currents include a first oscillation current and a second oscillation current, and the first oscillation current has a frequency range higher than that of the second oscillation current.

Example 32

The system of Example 31, wherein the one or more status parameters of the lithium-ion battery comprise a temperature and a State of Charge (SOC) of the lithium-ion battery.

Example 33

The system of Example 31, wherein the control device is a battery manage system (BMS) or a triggering controller.

In summary, a variable frequency triggering oscillation charge-discharge device may be configured between a lithium-ion battery/battery pack and a conventional charging device/load according to the charge-discharge methods, systems and devices disclosed herein for the lithium-ion battery, such that the charging/discharging current of the conventional charging device/load is a direct current, and the charging/discharging currents for the lithium-ion battery are a middle frequency two-way oscillation current with a high duty ratio and a high frequency oscillation current applied alternately to avoid the direct current charge-discharge for the lithium-ion battery or battery pack that may cause polarization of the lithium-ion battery and lithium precipitation. Accordingly, the lithium-ion batteries has longer battery life, higher charging threshold voltage, improved charge quantity, controlled internal temperature increase, and broader suitable temperature range.

A conventional charging device can be used to charge a lithium-ion battery by alternating a middle frequency two-way oscillation current with a high duty ratio and a high frequency oscillation current as disclosed herein. At a low temperature, the lithium-ion battery may be charged quickly without damage and with an even internal heating in the absence of an external heating device or pre-heating means for the battery. At an ambient temperature, the battery may be charged with less temperature increase, higher charging efficiency, and longer cycle life. Moreover, similar discharging effects achieved by the direct current discharging for the lithium-ion battery is achieved by the methods and devices disclosed herein without changing the load configuration along and with less temperature increase during the discharging and longer cycle life.

A person of ordinary skill in the art would understand that the methods disclosed herein can be achieved by using software in combination with a hardware platform. Accordingly, all or part of the methods disclosed herein can be implemented via a software product storable in a memory media (e.g., ROM/RAM, disc, CD, etc.), wherein the software product may comprise one or more instructions enabling a computer device (e.g., a PC, microcontroller, server, or network device) to perform the methods disclosed herein.

A person of ordinary skill in the art should understand that the various embodiments and examples disclosed herein are described for illustration only and not for limitation of any methods or devices disclosed herein. Equivalent variations and/or modifications of the embodiments and examples are also within the scope of the appended claims.

What is claimed is:

1. A method of charging or discharging a lithium-ion battery comprising:
   generating two or more oscillation currents by an oscillation loop formed based on an inherent impedance characteristic of the lithium-ion battery itself; and
   charging the lithium-ion battery with a charging unit with the two or more oscillation currents according to one or more charging parameters, wherein the charging parameters are determined based on one or more status parameters of the lithium-ion battery; or
   discharging the lithium-ion battery with a load with the two or more oscillation currents according to one or more discharging parameters, wherein the discharging parameters are determined based on one or more status parameters of the lithium-ion battery,
   wherein:
      the two or more oscillation currents comprise a first oscillation current and a second oscillation current;
      the first oscillation current has a frequency range higher than a frequency range of the second oscillation current;
      the duration $T_2$ of the first oscillation current is adjusted according to a temperature of the lithium-ion battery (a first battery temperature), and determined by the following formula:

$T_2 = n/fg$, wherein:

n=0 if the first battery temperature ≥a first working temperature desired for the charging or discharging of the lithium-ion battery; and
         n=1+INT((the first working temperature−the first battery temperature)x') if the first battery temperature <the first working temperature, wherein 0.01≤x'≤20, and INT is the integer-valued function; and
      the lower limit $f_{cd}$ and upper limit $f_g$ of the frequency of the second oscillation current are determined by:
         plotting a line parallel to the horizontal axis and through an intersection of EIS at the first working temperature and the vertical axis in the EIS plots with a first state of charge (SOC) in a frequency range; wherein:
            the frequency $f_{cd}$ corresponds to the intersection of the EIS plot at the first battery temperature and the parallel line in the low frequency region; and
            the frequency $f_g$ corresponds to the intersection of the EIS plot at the first battery temperature and the parallel line in the high frequency region.

2. The method of claim 1, wherein the one or more status parameters selected from the group consisting of temperature, SOC, voltage, internal resistance, dimensional size, weight, type, appearance, structure, and material of the lithium-ion battery.

3. The method of claim 1, wherein the first oscillation current and the second oscillation current are alternatively applied during charging/discharging.

4. A system for charging or discharging a lithium-ion battery, comprising:
   a variable frequency triggering oscillation charging/discharging device, which forms an oscillation loop with the lithium-ion battery to generate two or more oscillation currents for charging or discharging the lithium-ion battery; and
   a control device that controls the variable frequency triggering oscillation charging/discharging device to supply two or more oscillation currents to the lithium-ion battery according to temperature and a State of Charge (SOC) of the lithium-ion battery of the lithium-ion battery, wherein:
   the variable frequency triggering oscillation charging/discharging device is to be coupled between a first charging device for charging or a load for discharging and the lithium-ion battery; and
   the two or more oscillation currents include a first oscillation current and a second oscillation current, and the first oscillation current has a frequency range higher than that of the second oscillation current, wherein:
      the duration $T_2$ of the first oscillation current is adjusted according to a temperature of the lithium-ion battery (a first battery temperature), and determined by the following formula:

$T_2 = n/fg$, wherein:

n=0 if the first battery temperature ≥a first working temperature desired for the charging or discharging of the lithium-ion battery; and
         n=1+INT((the first working temperature−the first battery temperature)x') if the first battery temperature <the first working temperature, wherein 0.01≤x'≤20, and INT is the integer-valued function; and
      the lower limit $f_{cd}$ and upper limit $f_g$ of the frequency of the second oscillation current are determined by:
         plotting a line parallel to the horizontal axis and through an intersection of EIS at the first working temperature and the vertical axis in the EIS plots with a first state of charge (SOC) in a frequency range; wherein:
            the frequency $f_{cd}$ corresponds to the intersection of the EIS plot at the first battery temperature and the parallel line in the low frequency region; and
            the frequency $f_g$ corresponds to the intersection of the EIS plot at the first battery temperature and the parallel line in the high frequency region.

5. The system of claim 4, wherein the variable frequency triggering oscillation charging/discharging device comprises:
   an energy storage and freewheeling unit connected to the first charging device and/or load in parallel;
   an oscillation unit connected to the lithium-ion battery in parallel to form the oscillation loop; and an oscillation trigger connected between the energy storage and freewheeling unit and the oscillation unit to trigger the oscillation loop to generate the two or more oscillation currents.

6. The system of claim 5, wherein the oscillation trigger comprises an anti-paralleled diode.

7. The system of claim 5, wherein the control device is a battery manage system (BMS) or a triggering controller.

8. The system of claim 4, wherein the variable frequency triggering oscillation charging/discharging device comprises:

an energy storage and freewheeling unit connected to the first charging device and/or load in parallel;

an oscillation unit connected to the energy storage and freewheeling unit in series and then connected to the lithium-ion batteries in series to form the oscillation loop; and an oscillation trigger connected to the oscillation unit in parallel to trigger the oscillation loop to generate the one or more oscillation currents.

9. The system of claim 8, wherein the oscillation trigger comprises an anti-paralleled diode.

10. The system of claim 8, wherein the control device is a battery manage system (BMS) or a triggering controller.

* * * * *